United States Patent
Barrow et al.

(10) Patent No.: US 12,113,589 B2
(45) Date of Patent: Oct. 8, 2024

(54) SYSTEM AND METHOD FOR HOUSING ANTENNAS

(71) Applicant: DEJERO LABS INC., Waterloo (CA)

(72) Inventors: Andrew Barrow, Brantford (CA); Thananjagen Kunaratnam, Waterloo (CA); Alaa F. Elagha, Waterloo (CA); Jonathon Oberholzer, Waterloo (CA); Anthony Todd Schneider, Waterloo (CA); Cameron Kenneth Smith, Oakville (CA)

(73) Assignee: DEJERO LABS INC., Waterloo (CA)

( * ) Notice: Subject to any disclaimer, the term of this patent is extended or adjusted under 35 U.S.C. 154(b) by 0 days.

(21) Appl. No.: 18/021,531

(22) PCT Filed: Nov. 8, 2021

(86) PCT No.: PCT/CA2021/051591
§ 371 (c)(1),
(2) Date: Feb. 15, 2023

(87) PCT Pub. No.: WO2022/094729
PCT Pub. Date: May 12, 2022

(65) Prior Publication Data
US 2023/0231597 A1    Jul. 20, 2023

Related U.S. Application Data

(60) Provisional application No. 63/110,772, filed on Nov. 6, 2020.

(51) Int. Cl.
*H04W 76/10* (2018.01)
*H01Q 1/22* (2006.01)
(Continued)

(52) U.S. Cl.
CPC ......... *H04B 7/0404* (2013.01); *H01Q 1/2291* (2013.01); *H01Q 1/241* (2013.01);
(Continued)

(58) Field of Classification Search
CPC .... H04B 7/0404; H04W 76/10; H04W 24/08; H01Q 1/2291; H01Q 1/241; H01Q 9/42; H01Q 21/205; H01Q 25/00
See application file for complete search history.

(56) References Cited

U.S. PATENT DOCUMENTS

| 1,947,256 A | 2/1934 | Friis |
| 10,616,904 B1 | 4/2020 | Mirkamali et al. |

(Continued)

FOREIGN PATENT DOCUMENTS

| CA | 2435099 A1 | 7/2002 |

OTHER PUBLICATIONS

Canadian Intellectual Property Office (CIPO), International Search Report & Written Opinion to PCT/CA2021/051591, Jan. 13, 2022.
(Continued)

*Primary Examiner* — Khawar Iqbal
(74) *Attorney, Agent, or Firm* — Norton Rose Fulbright Canada LLP

(57) ABSTRACT

A multiple radio and/or multi antenna chassis is described in some embodiments, along with methods of operation, and non-transitory computer readable media storing machine interpretable instructions to be executed on a processor to perform the methods of operation. Variants are described having regard to the use of one or more of the antennas for establishing bonded connections whereby one or more subsets of the antennas are coordinated to operate in concert to operate one or more connections for data packet transmission while reducing energy loss issues as between operating antennas. The approaches described herein can operate, for
(Continued)

example, with a plurality of wideband antennas to provide a multi modem communications device that can be coupled to a master/primary data communications device.

20 Claims, 28 Drawing Sheets

(51) Int. Cl.
    *H01Q 1/24*     (2006.01)
    *H01Q 9/42*     (2006.01)
    *H01Q 21/20*     (2006.01)
    *H01Q 25/00*     (2006.01)
    *H04B 7/0404*     (2017.01)
    *H04W 24/08*     (2009.01)

(52) U.S. Cl.
    CPC ............. *H01Q 9/42* (2013.01); *H01Q 21/205* (2013.01); *H01Q 25/00* (2013.01); *H04W 24/08* (2013.01); *H04W 76/10* (2018.02)

(56) References Cited

U.S. PATENT DOCUMENTS

| | | | | |
|---|---|---|---|---|
| 10,938,451 | B2 * | 3/2021 | Ramasamy | H04B 7/04 |
| 11,223,416 | B2 * | 1/2022 | Karlsson | H04B 7/0608 |
| 11,322,832 | B2 * | 5/2022 | Jong | H01Q 21/08 |
| 11,437,733 | B2 * | 9/2022 | Lee | H01Q 25/00 |
| 2011/0150118 | A1 | 6/2011 | Asplund et al. | |
| 2014/0075057 | A1 | 3/2014 | Sakr et al. | |
| 2015/0061958 | A1 | 3/2015 | Huang et al. | |
| 2019/0229413 | A1 * | 7/2019 | Jong | H01Q 1/422 |
| 2019/0363440 | A1 | 11/2019 | Samardzija et al. | |
| 2020/0091608 | A1 | 3/2020 | Alpman et al. | |
| 2020/0186237 | A1 * | 6/2020 | Karlsson | H04W 84/06 |
| 2020/0229078 | A1 * | 7/2020 | Shin | H04W 24/10 |
| 2020/0410812 | A1 * | 12/2020 | Jones | H04B 5/79 |
| 2021/0143890 | A1 * | 5/2021 | Legg | H04W 76/15 |
| 2021/0195683 | A1 * | 6/2021 | Xin | H04W 80/12 |
| 2021/0257724 | A1 * | 8/2021 | Greenstein | H04B 1/3822 |
| 2021/0392709 | A1 * | 12/2021 | Legg | H04B 7/022 |
| 2021/0410268 | A1 * | 12/2021 | Moon | G06F 1/203 |
| 2022/0399932 | A1 * | 12/2022 | Anderson | H04W 92/20 |

OTHER PUBLICATIONS

Canadian Intellectual Property Office (CIPO), Examiner's Requisition to CA 3,178,295, Mar. 6, 2024.

European Patent Office (EPO), Partial Supplementary European Search Report issued to EP 21887971, Mar. 22, 2024.

European Patent Office (EPO), Partial Supplementary European Search Report issued in EP 21887971 dated Jun. 12, 2024.

* cited by examiner

SYSTEM AND METHOD FOR HOUSING ANTENNAS

RELATED APPLICATIONS

This application is a non-provisional of, and claims all benefit, including priority to, U.S. Application No. 63/110,772, entitled SYSTEM AND METHOD FOR HOUSING ANTENNAS, filed on Nov. 6, 2020, incorporated herein by reference in its entirety.

This application is related to "A SYSTEM AND METHOD FOR TRANSMISSION OF DATA FROM A WIRELESS MOBILE DEVICE OVER A MULTIPATH WIRELESS ROUTER" filed as U.S. application Ser. No. 14/114,984 on 16 Apr. 2013; "SYSTEM AND METHOD FOR PROVIDING DATA SERVICES ON VEHICLES", filed as U.S. application Ser. No. 14/680,476 on 7 Apr. 2015 and "SYSTEM AND METHOD TO ADAPT COMMUNICATIONS RESPONSIVE TO ACTIONABLE INTELLIGENCE", filed as PCT Application No. PCT/CA2019/051039, all of which are incorporated herein by reference in their entireties.

This application is also related to U.S. provisional application 63/139,286 and U.S. 63/183,952, filed on 19 Jan. 2021 and 4 May 2021, both entitled "Systems and Methods for Push-based Communications", both of which are incorporated herein by reference in their entireties.

FIELD

Embodiments of the present disclosure generally relate to the field of antennas, and more specifically, embodiments relate to devices, systems and methods for a multi-antenna chassis.

INTRODUCTION

Antenna design and antenna chassis design is technically challenging. There are performance considerations which require careful balancing of technical requirements. Antennas may be mounted on moving objects, or have geo-spatial constraints.

The specific frequency bands in which an antenna operates is another important design consideration as spectral characteristics change as wavelengths change. There may be different attenuation profiles associated with different wavelengths. The wave dispersal pattern can also be modified, for example, by selecting different antenna geometries.

Furthermore, multiple antennas can be utilized together. The antennas can attempt to exploit multipath propagation, but a challenge lies in deleterious signal effects in situations where a multiple Tx/Rx radio problem exists when the radios are operating simultaneously, and each radio can have multiple antennas. The technical challenge can arise in respect of (1) multiple co-located transmit antennas driven by different radios and (2) co-locating transmit and receive antennas can cause problems (interference and loading).

SUMMARY

A multiple radio/multiple-antenna (or multiple-radio, multiple-antenna chassis) chassis is described in some embodiments, along with methods of operation, and non-transitory computer readable media storing machine interpretable instructions to be executed on a processor to perform the methods of operation (e.g., software for controlling the operation of the chassis or controlling how data packets are transmitted).

Several variations of the multiple-antenna chassis are described in different embodiments. Additional variants are described having regard to the use of one or more of the antennas for establishing bonded connections whereby one or more subsets of the antennas are coordinated to operate in concert to operate as a single bonded connection for data packet transmission. The approaches described herein can operate, for example, with a plurality of wideband or multiband antennas.

The chassis is provided as a part of a multi modem communications device that is configured for providing electronic communication across a plurality of radios. In particular, the multi modem communications device includes a central housing chassis (e.g., a metallic chassis) that is adapted to provide an electrical counterpoise for the electronic communication, the central housing chassis comprising material that provides radio frequency shielding. A number of variations are described herein in relation to different geometries for the central housing chassis, including both static and dynamic geometries where the central housing chassis can be modified, or the antennas themselves have variable geometry that can be modified, etc., to reduce effects associated with line-of-sight wireless or RF transmission and reception between corresponding antennas between corresponding antennas.

The device has a plurality of antennas, each coupled to the central housing chassis, each corresponding to a modem of a plurality of modems provided by the multi modem communications device, and each operating on similar frequency bands, and each of the antennas that correspond to a modem of the plurality of modems are positioned or otherwise disposed thereon (e.g., mounted, coupled or connected) on the central housing chassis or configured on the central housing chassis to minimize line of sight RF paths between other antennas being used for the modem of the plurality of modems. The antennas, for example, can be physically connected or coupled to their corresponding modem such that certain sets of antennas work with certain modems. For example, antennas 1 and 6, opposite from one another and having opposite folding configurations, can be coupled to a network interface providing modem 1 as an available connection from the device, and so on. Antennas can be selected for corresponding to a particular modem that are spaced from one another, such as on geometrically opposite locations to reduce potential line-of-sight. There can be 6 antennas, for example, coupled to three modems, and opposite antenna pairs can be used.

The multiple-antenna chassis, in some embodiments, can be a static chassis shape. In other embodiments, the shape, geometry, or extensible elements of the chassis can be modified based on usage scenario. In some embodiments, the system is adapted to provide multiple MIMO Radio Systems that are integrated into a single device. The antennas themselves can also be re-configured (e.g., folded, bent, rotated, re-oriented) and this, in a first embodiment, can be conducted separately or, in a second embodiment, be controlled in conjunction with the changing of the chassis configuration as well. Different variations for folding are possible, and for example, adjacent antennas (relative to their placement around a housing, can have mirror image folding, etc.).

In embodiments where homogeneous MIMO antennas are used, loading/cross coupling caused by co-location of multiple MIMO radio systems must be addressed, while optimizing transmit and receive performance. Each of the MIMO radio systems can connect to different operators (that may be on similar or the same operating frequencies) for bonding/blending purposes. A challenge is that a desire for a small sized device and resulting co-location of the antennas (e.g., a small-sized device that houses multiple radios, each with multiple (MIMO) antennas—there is a 'compounding' of complexity) and this can cause loading/cross coupling. The connection of the MIMO antenna to the modem/radio can be fixed, and for example, MIMO antennas within same MIMO radio system can be operated together. If separate MIMO radio systems are on the same operator/carrier, for example, they can be configured to operate under management of the controller.

The antennas can operate on cellular frequencies, for example. In an example embodiment, the plurality of modems operate on cellular frequency bands and can be configured to use various cellular subscriber identity modules (SIMs), or eSIMs that connect to one or more carrier networks. Other frequencies are also contemplated.

The multiple-antenna chassis is adapted in view of signal propagation challenges that occur when multiple antennas are utilized, for example, where there are multiple co-located antennas, each with their own modems/operators (carriers). In particular, these challenges can be summarized as the energy loss problem, the simple antenna differentiation problem, and the MIMO correlation problem. The chassis is adapted, for example, to minimize the interference between antennas that are working on adjacent/similar frequencies either because of either the physical geometry of the system or because of reorientation/modified geometry of the antenna. Interference can arise for example, in respect of different operators/carriers that operate on adjacent frequencies.

In some embodiments, the chassis can be manufactured using radio frequency (RF) shielding material and the antennas can be affixed to allow them to have maximum surface area/signal strength, but the lines of sight with the other antennas affixed to the chassis may be reduced or removed entirely by way of structural features. This can be accomplished, for example, by using a simple polyhedron wherein the antenna surface's size is dependent on i) the distance between the antenna and the chassis and ii) the angle between the chassis edges. For example, concave surfaces can be used to provide an aperture or cavity in which a longer antenna can be affixed.

The antennas may be positioned in the center of the surface, or off-center (and may be pointed in various directions). The shape of the antennas could also be optimized in order to maximize its surface area, such as by using folded antenna frames (or, in some embodiments, control the folding of the antennas using actuators, such as servomotors). The system could also direct signals through the antennas that have the best transmission capability in accordance with one or more measurement criterion, such as RSSI or reported link strength from a base station. This aspect overcomes the directionality challenges that arise from shielding the antenna. The system could monitor the transmission capabilities of specific antennas and ensure signals are sent through the appropriate antenna(s) (e.g., best performing set of antennas). Further, the system could reorient itself in order to maximize the transmission capabilities of the antenna.

The energy loss problem occurs when using many substantially similar or identical antennas, which when geospatially arranged, lose energy to (through absorption by) nearby antennas due to the inability of one antenna to be more or less selective of different frequencies relative to each another due to their similarity. The antennas must typically be similar or identical as the system can be used globally, and in some embodiments, has adaptations to be flexible enough to operate on any local carrier(s) whose bands of operation are unknown at manufacture time. Single radios may also operate across multiple bands (e.g. carrier aggregation), all of which may differ based on available local carriers or frequencies.

Even if a given antenna is operating on one band while a nearby antenna operates on another, each antenna loses some incoming and outgoing energy in its band of operation to its neighbour, since all the antennas absorb energy on all bands of interest. Nearby antennas can absorb and 'waste' some local RF energy, weakening the interaction between any given antenna and the far-field counterparts which form the communications channel. Energy loss is a function of distance—the nearer the neighbouring antenna, the greater the loss.

The system typically uses wide-band antennas to operate on all possible global carriers' bands and carrier aggregation schemes which may be unknown at manufacture time. Wide-band antennas tend to be relatively "simple" in shape (e.g. simple geometric polygons) vs. multi-band antennas which may have many complex sub-shapes and branches. Complex antenna shapes provide more opportunity to differentiate or permute the antenna geometry (which can reduce cross-coupling or energy loss to nearby antennas) while maintaining equivalent performance as an antenna. The "antenna differentiation problem" arises because the preferred wide-band antennas can be more challenging to geometrically differentiate or permute and the approaches described herein may be useful in providing practical approaches for reducing coupling between nearby wide-band antennas.

The MIMO correlation problem arises when sets of co-located antennas are used as MIMO elements (where multiple spatial paths between transmitter and receiver allow more data to be carried on a single frequency—for transmit and/or receive), and the approach requires minimized correlation between antenna elements. These challenges are more significant for smaller mobile devices as they require portability. Larger, non-mobile items in a transmission system (e.g. cell towers) solve these interference problems by moving antennas farther apart, which is not an option with the size constraint present in mobile devices.

Accordingly, there is a need for a system or device which addresses concerns relating to near-field interference (e.g., from co-located antennas) while allowing flexibility in improving far field performance, particularly in the context of mobile data transmission, where the location of a device or set of devices relative to the available communication infrastructure can vary (as can the characteristics of the data transmission) and the device may be size constrained.

A multi-antenna chassis having mounting points, surfaces, or apertures, each corresponding to a corresponding antenna or a plurality of antennas is described. The mounting points, surfaces, or apertures are positioned such that each of the antennas are not within or have reduced line-of-sight with one another. The chassis is a three-dimensional shape having a number of surfaces that can, for example, serve as the mounting points or apertures.

The chassis, in an embodiment, is a conductive shape (e.g., a 3-dimensional polygon) or a shape having conductive regions, with RF shielding properties and features to mount all antennas, where the chassis shape is chosen so that the chassis blocks or reduces RF paths (e.g., line-of-sight)

between antenna elements (or selected antenna elements, such as those that operate together). While in some embodiments, line-of-sight is fully removed, in other embodiments, line-of-sight is reduced. In a further embodiment, line-of-sight between specific antennas is reduced or removed (e.g., between sets or subsets that operate together to form a bonded connection).

The chassis (which may contain other electronics, such as heat sinks, equipment apertures, or, electrical connections) can be defined as a "kernel", around which the co-located energy-absorbing antennas can be arranged or positioned, such that optimizing size/shape/placement of antennas relative to the kernel can minimize cross-talk (e.g., coupling, or cross coupling) and signal absorption/energy-loss by non-active antennas in "near field" as the horizon created by the kernel shape blocks line of sight. The chassis is adapted to optimize signal characteristics, while seeking to minimize energy loss to the local co-located antennas.

The geometry and signal characteristics can be adapted for various trade-offs, such as to optimize the transmit and receiver power for each of the modems/radios in the device (that are connected to one or more antennas). For example, while one could minimize the cross-talk between co-located antennas at the cost of having very low signal receive power (for example), this would not be useful. Various shapes, topologies, arrangements are described herein which provide different spectral characteristics useful for different situations.

In one embodiment, the polygonal chassis is used as a ground plane for the antennas.

In another embodiment, the chassis is split into electrically isolated regions. If split, conductive regions may optionally overlap in space to maintain RF shielding and line-of-sight blocking while still electrically isolating regions of chassis. The antenna shape may be altered (e.g., by folding) to minimize line-of-sight RF path (and therefore coupling) to other antenna elements with minimal far-field effects (e.g., by reducing coupling between local antenna elements while not reducing ability to receive intentional energy from a far endpoint of the communication channel) or improved far field properties. Folding of antennas may allow for smaller system envelopes by further reducing line-of-sight between co-located antennas. In some embodiments, a wideband antenna is utilized that has discrete geometric zones (e.g., as established by "fold lines") that would be useful as sub-elements after folding.

The chassis shape itself may also be altered to further reduce coupling to local antenna elements. Antenna folding may minimize required chassis size for given antenna size e.g., folding last 20 mm of antenna into vertical dimension.

In one embodiment, the chassis may be used as an enclosure for radios or other system electronics.

In another embodiment, the chassis may be used as a radiator for system cooling.

The chassis shape may also be altered in concert with, or separately from, antenna shape to minimize coupling between local antenna elements with minimal far-field effects or to improve far-field performance. The approach is adapted to reduce/degrade local coupling without significantly degrading far-field coupling (e.g., maintaining a best possible or satisfactory far-field performance).

This approach may be extended to complex folded antennas and many-sided polygons.

In one embodiment, monopole antennas are used, with the metal central portion as the counterpoise. Antennas may share counterpoise to allow for minimal size. For any given size or shape of antennas, there can be a minimal size/shape of centrepiece/kernel.

This approach is useful in high frequency communications, e.g., cellular communications, where line of sight is an issue and where the central kernel material is important for shielding, and where multiple antennas are required on a device (e.g. due to different networks being used simultaneously, such as in a device which performs bonded transmission).

There are trade offs to consider which allow for different embodiments. For example, there are the opposing design parameters of envelope/form-factor (to make the overall device as small as possible), kernel (electronics) large as possible (to fit electronics or other devices within a unit), effective antennas (often function of size—larger may generally mean better low frequency performance), cross-talk/coupling between antennas reduced (important when more antennas are used). The designs are adapted to (1) reduce (e.g., minimize) near-field interference/loading while (2) optimizing (e.g., maximizing) far-field performance (e.g., transmit and/or receive), for a least amount of energy.

Additional technical parameters exist which include energy use, reliability/redundancy/speed/distance of far field transmitting/receiving characteristics of the device, allowing for flexibility in the types of data being transmitted. Not all technical parameters oppose each other (e.g., minimizing "crosstalk" would allow more energy to be transmitted, which would improve far field receive performance) reducing cross-talk might allow for less energy to be spent transmitting), but there are linkages between some of the mentioned parameters to indicate that the proposed approaches may have multiple benefits depending on the overall communication requirements of the system—approaches described herein can be utilized to increase reliability or increase throughput or reduce energy use (create more efficient links via reduced loss).

A proposed technical solution is a device having physical characteristics that are selected based on a function of kernel geometry and antenna geometry. There may be other optimal kernel size/shape based on frequency or antennas design (e.g., different shapes/types of antennas could be combined). The chassis can utilize antennas in various configurations (e.g., mirroring antennas or mounting them in geometrically-opposed fashion) in concert with the optimizing of the geometry of the chassis/antennas combination. The antennas can have multiple feed points, with optimization of overall signal based on which other antenna and feed points are being used, thus using a system level knowledge of the available feed points to optimally shape the direction of communication (e.g., transmission or reception).

In another embodiment, the kernel shape of the chassis includes convex/concave surfaces to further allow for shielding, and additionally allow for greater directionality of the transmission as well. Consider that if two mobile antennas are undesirably coupled together (e.g., having cross talk or loading effects on one another) and both signals are degraded, the result may be worse for the system than adding shielding between these antennas (which makes them more directional). The directionality improvement provided by the shielding may offer a performance improvement as compared to non-directional antennas interfering with each other.

The use of geometric shielding could also apply to multiple devices working in concert (e.g., either mounted in different places on a vehicle, on a building, or simply co-located (e.g. two police vehicles in close proximity)). The proximity may change over time as the entities move, and the state of being co-located may change. In practice, co-located antennas can be very close (centimetres apart).

In one embodiment, one can create "virtual shielding" where the "kernel" (e.g., a vehicle, building or tank), may not be optimally shaped, but the system can choose combinations of antennas that take advantage of the shape. The choice may be made by a real-time performance optimization by, for example, measuring the transmit and receive signal strength (e.g., RSSI and RSCP) for each antenna and optimizing the antenna's selected for each radio and the prevailing communication conditions, by historic performance, by knowledge of the shape of the kernel, or by a combination of two or more methods.

Devices could share information in respect of a given transmission, and use each other's modems and antennas (or at least use the choices of the nearby device re: antennas and shielding), to inform a device's own decisions, even if not sharing a given transmission. A controller could, for example, be configured to perform the measurements and optimize. For example, multiple multi-antenna chassis can be configured for discovering of one another, such that upon discovery, handshakes can be performed to allow for different levels of integration. In another embodiment, they could be connected to a centralized blending appliance/controller, as provided in a "remote modem box" variant of the multi modem device described herein. As described in various embodiments herein, eSIMs could be used as they would allow flexible use of carriers (operators) across remote modem boxes that may be on opposite sides of a vehicle or a building.

Different levels of integration (which can inform decisions on how and when to transmit) can be used in assessing what combination of devices and antennas can be used in a given instance. Not all antennas on the chassis are necessarily used for the same purpose or transmission, for example, a media broadcast van may have multiple receiving points it is transmitting to, and may be transmitting entirely different feeds (e.g., antennas 1, 4, 6, 8 are used for a sports channel, and 2, 3, 5, 7 are being used for breaking news). In an embodiment, on the device, some antennas that are used for cellular and some antennas that are use for Wi-Fi. In a variant embodiment, the antennas are selectable/switchable so that the system is able to interchange cellular and Wi-Fi antennas to, for example optimize a particular communication characteristic.

In some embodiments, each device acts as a 'smart' transceiver chassis comprised of radios, antennas and a data aggregator (e.g., (1) USB-over-IP or (2) a client/agent that allows access to the modems over TCP/IP). If each smart transceiver, for example, contains 3 radios, 3×N antennas, and one data aggregator, a transceiver system requiring 6 or 9 radios may be built-up out of 2 or 3 smart transceivers. The central transceiver controller could also be configured to co-ordinate sharing of info between the smart transceivers according to previous statements.

Accordingly, each remote smart-transceiver could be uniform in manufacture and the central system could assign communication channels or bands to multiple remote, smart transceivers such that desirable communication characteristics are optimized (e.g., desirable communication maximized and undesirable minimized).

Furthermore, there are other benefits, such as uniformity of manufacture but also uniformity of certification of the sub-devices—since only the 3-modem N-antenna smart transceiver needs to have regulatory and related certifications.

Similarly, as noted in some of the related applications, different antennas can be utilized in relation to different types of communications if being used together (e.g., bonded connections), for example, with some antennas being used for error control (e.g., re-sending dropped packets), while others may be used for bulk data transfer. Various bonding approaches can be utilized in conjunction with subsets of antennas, such as sending a re-requested packet over a "best connection", and coordinated approaches for establishing QoS for a gateway device (e.g., some connections have low latency, so the system is configured to send packets that require low latency over these connections).

The specific assignments thereof can be allocated statically or dynamically to achieve desired channel characteristics of the aggregated link, such as latency, throughput/bandwidth, etc. The incoming flows can be mapped based on the flow rules (QoS) that have been provided by the user so they can best utilize the underlying (and real-time varying) connectivity to meet the needs of all incoming flows.

In one embodiment, knowledge of devices present in the area via absorption of signal from them ("there appear to be other devices in the area"), or from other attempts at cross device contact (e.g. appears to be other WiFi networks in the area) can be used to optimize antenna performance. In the case of the remote modem box mode, connection to a shared central transceiver controller can be used to optimize antenna performance.

In another embodiment, knowledge of type/nature of transmission (continuous or bursty, strength of transmission) via statistical analysis (on the transmitting device), can be used to better choose combinations of antennas.

In yet another embodiment, systemic knowledge of available devices that are part of the same "network" of devices may be used to improve performance for all devices that are co-located. In this context, the term network can be assessed at various levels. For example, network could mean at the level of "cell network" (e.g., devices may not be related, there may be information indicating that there is a shared network operator). In another context, this could mean belonging to same company, even if the devices are using different transmission networks (e.g., carrier one vs. carrier two).

The devices are not limited to mapping to a single layer (e.g., OSI network model abstraction layer), but in some embodiments, it is possible that the devices reside on different layers. A network of devices can be organized in a distributed manner, or centrally organized. The system can be configured to combine information from many different such networks (e.g., the system has information about other devices on the same cell network, and information about other devices belonging to the same "network of devices" belonging to a company, military unit, etc.).

In one embodiment, there exists the ability to share info with other devices (e.g., negotiate/inform on upcoming transmissions to better manage interference) by synchronizing transmissions in a way that reduces cross-talk between devices, modems and antennas.

In another embodiment, there exists the ability to share transmission capabilities (actually using short range communication to transmit to other devices (or receive if the antennas on the other device are better suited or located)), which would then use certain antennas to transmit to the ultimate location.

In yet another embodiment, the system includes computer circuitry which is configured to monitor (e.g., sense) signal communication characteristics, and responsive to the characteristics, determine the movement of one or more devices (which may themselves be on persons or vehicles) to create an optimal environment for transmitting by controlling the movement (or virtual movement) of devices or antennas (e.g., via servomotors, electronically steered antenna or switched selection of antennas).

The chassis may have different geometries, and in accordance with different embodiments, the chassis may be shaped as a regular polyhedron or a portion thereof (e.g., cut across a plane). Polyhedrons can include tetrahedrons, dodecahedrons, iso-decahedrons, among others. Other polyhedrons can include toroidal polyhedrons, etc. The specific type of polyhedron can be dependent on the number of antennas, the placement of the antennas, the shape of the antennas, and the operating parameters of the antennas. As the chassis can, in some embodiments, be utilized for other purposes, such as housing electronics, acting as a heat sink, among others, this may also dictate the type of geometric shape being utilized.

The shapes, in some embodiments, include flange/shaped elements on chassis to block line of sight (e.g., a lip). As noted earlier, the surfaces themselves may be flat surfaces in some embodiments, but may also be convex/concave surfaces whose convexity or concavity assists in separating line of sight between antennas mounted thereon the chassis while optimizing far-field transmit and receive performance. The materials utilized to construct the chassis may also be selected based on specific absorption and/or transmission characteristics. The specific positioning of the antennas on the faces (e.g., surfaces) of the chassis may be centered, or in some embodiments, off center, depending on other blocking features (e.g., flanges) or available lines of sight. Additional antenna affixing elements are contemplated (e.g., antennas disposed within a pocket, protruded from each surface).

In some embodiments, an adaptive chassis is described having adjustable and re-configurable faces or apertures in which antennas can be mounted or otherwise coupled. The adaptive chassis can be a polyhedron or portion thereof having a plurality of faces. The chassis can include one or more actuators, such as servomotors, which engage one or more joints or sections of the chassis which can, for example, articulate to modify the geometry of the chassis, or the positioning/geometry of the antennas. In another example, alternate approaches are utilized to modify the geometry of the chassis, such as materials whose shape are modified upon the provisioning of a stimulus (e.g., shape-memory alloys). Alternative approaches include the use of hydraulic, or pneumatic mechanisms.

The articulation can include the changing of the concavity of a surface (e.g., increasing the concavity for taller antennas), extension or retraction of flanges, expansion/contraction of the chassis, or directionality modifications of the direction of the antennas themselves within the aperture (e.g., modifying the face such that the direction of the antennas are pointed away from one another). The actuators, for example, can include controllers that modify linear position or rotary motion, and can include various types of motors or other motion control devices. Where multiple chassis are used together, in a further embodiment, the modification of the shapes of the chassis can be conducted in tandem (e.g., in concert). A change in concavity can, for example, correspond with a change in antenna geometry. Surface modifications can modify directionality to reduce coupling while optimizing an ability to communicate in respect of a far-field connection.

The articulation, for example, can also occur in response to signal response characteristics from a counterparty antenna for the multi-pathed signals from each of the antennas.

Use cases for the antenna chassis or housing can include mounting on or proximate to vehicles such as cars, airplanes, etc., or placement at fixed sites, such as buildings. There may be one or more chassis and corresponding antennas working together, and in some embodiments, the antennas and chassis are adapted for cooperative operation such that the master data communications device interoperates with the multi modem communications device to establish wide area data communications using the plurality of antennas and the plurality of modems to connect to cellular networks.

Practical use cases and embodiments can include the multi modem communications device operating in different modes, such as a remote modem box mode, and/or a blended connection controller mode, and in some cases, the multi modem communications device has on-board circuitry to switch between the different modes for different sensed network situations (e.g., active network blending control) is set to only use blending control only when a large amount of connectivity resources are required (e.g., streaming video), and otherwise switched to remote modem box mode to save power.

In the remote modem box mode, the multi modem communications device is controlled by the master data communications device and the wide area data connections are mapped as virtual modem connections available to the master data communications device.

In the blended control mode, the multi modem communications device is further configured to control blending of connections of the wide area data connections to communicate data packets to or from the master data communications device (e.g., using on-board blending circuitry on the multi modem communications device).

In an example usage scenario, the multi modem communications device is a portable, remote device that is connected to a master data communications device that drives communications through the connections of the multi modem communications device. The multi modem communications device can be positioned advantageously relative to the master data communications device to provide a diversity of available network connections for wide area network connections, such as connecting to various cellular carriers, etc. The master data communications device, can advantageously utilize the new wide area network connections if they are better than, for example, existing wide area network connections of the master data communications device, or, in other embodiments, blend and/or combine various network connections to establish improved connection pathways.

Multiple multi modem communications devices can be used together to pool available virtual or actual wide area network connections.

In a first example, the multi modem communications devices can be positioned on different faces of a building or on different floors, and coupled to a master data communications device through, for example, a WiFi or a wired link. The master data communications device may be positioned in a spectrally disadvantageous location, such as a basement data center (e.g., a video editing data center of a media production company positioned inside a hardened bunker), and have difficulty otherwise obtaining strong cellular coverage. As the multi modem communications devices are positioned on various windows, etc., they are able to relay their stronger cellular connections to provide improved networking capabilities to the master data communications device.

In a second example, the multi modem communications devices can be positioned on different sections or segments of a vehicle such that different communications characteristics are experienced by each of the different multi modem communications devices, and these in turn can be used to provide additional communication capabilities to master communications devices, such as infotainment systems and/or on-board electronic devices. This can be especially useful, for example, where the vehicle is very long, such as being positioned on various segments of train cars.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
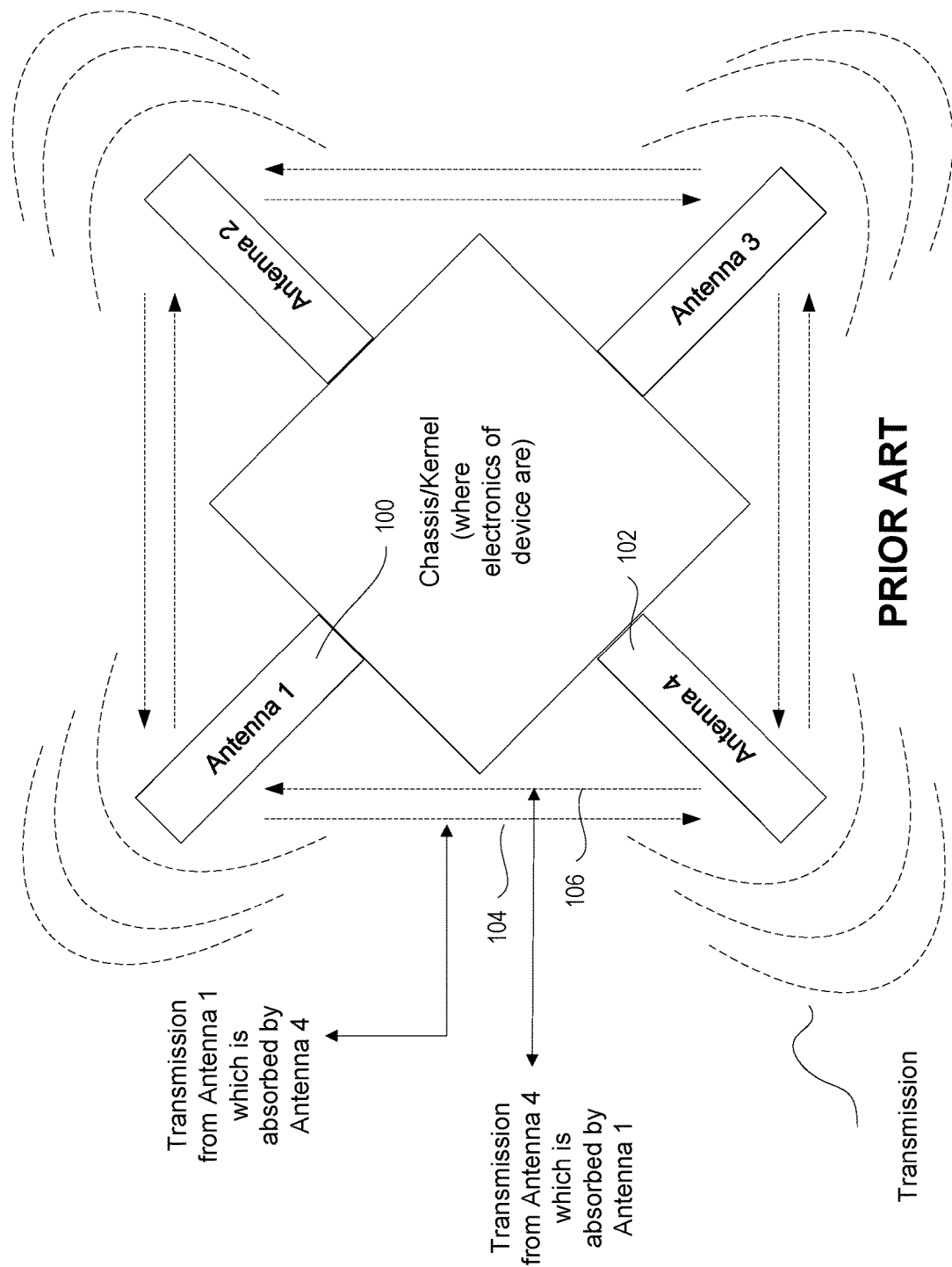
FIG. 1 is a 2D rendering of a chassis/antennas combination which demonstrates an enclosure with antennas extending beyond its border, leading to crosstalk between the antennas.

A multiple-antenna chassis (e.g., a multiple radio, multiple antenna chassis) is described in some embodiments, along with methods of operation, and non-transitory computer readable media storing machine interpretable instructions to be executed on a processor to perform the methods of operation. Several variations of the multiple-antenna chassis are described in different embodiments.

This multiple antenna chassis serves as the housing a multi modem communications device that provides electronic communication across the plurality of coupled radios, and can be used practically in situations where existing signal communications capabilities are sub-optimal or below what is required, and additional communications capabilities are required. Other usage situations are possible. The chassis can be a central metallic object, for example, such as a mounting point for antennas housing other types of electronics and components, such as heatsinks. In another embodiment, the chassis instead can be an irregular object, such as the chassis of a car. To operate as a chassis for the approaches described herein, it is important that the chassis provide radio frequency shielding to address some of the power absorption issues described herein (e.g., intentional or not).

The chassis has a plurality of mounted antennas that serve a number of on-board modems, and the chassis acts as an electrical counterpoise for the antennas such that groups of antennas serving (e.g., electrically coupled to or connected to) a particular modem are adapted for improved wireless communications performance. The chassis can also provide cooling functionality (e.g., heatsinks) and can have other on-board controller circuitry and/or user interface components (e.g., membrane keys). The antenna groups are adapted for reduced line of sight, for example, through where the antennas are positioned relative to the chassis, or through geometries of the antennas (e.g., mirror image folding, alternating folding). Further variants are also described in variant embodiments where the antennas themselves can be dynamically repositioned and/or re-folded. The folding is conducted to minimize interference between adjacent antennas. The antennas are coupled to corresponding modems. While some examples described herein show two antennas being connected to a modem, other numbers are contemplated as well, such as a 5G modem having four antennas would be coupled to four antennas.

The multi modem communications device can be used in a variety of different usage scenarios to replace or augment network connections to a wide area network (WAN), such as coupling via local area networking (LAN) to an existing master communications device using a wired, a WiFi (e.g., high throughput) or a USB over IP connection so that virtual connections exposed through the modems (e.g., cellular networks where the modems each utilize different subscriber identity modules (SIMs) or eSIMs, for example) can be utilized by the master communications device. This is useful where the master communications device is located in a location that has poor signal qualities, when the master communications device needs more/better throughput in a particular situation (e.g., disaster recovery, spike in demand, failover).

Measured performance characteristics can be used to decide which modems to use and which connections to use in various situations. This can be used, for example, to establish a good starting point for connection blending, by testing performance in order to assign modems on operators/carriers that provide a best performance (e.g., based on optimizing a performance or a communication characteristic, or a set of performance or communication characteristics). After the assignment of modems on operators is conducted, the blending can begin, and variations in operator/carrier performance can be handled using smart blending technology.

Connections can be bonded together to form aggregated connections utilizing multiple pathways at once for a given transmission, and other approaches can be used to blend communication pathways such that the performance characteristics (e.g., as measured by a performance parameter or a set of performance parameters) are optimized. For example, there can be per flow blending, etc.

The multi modem communications device can be provided as a portable remote modem box whereby connections are exposed to the master communications device and the master communications device can control how and which connections are used.

The multi modem communications device can also (or alternatively) be provided as a blending capable portable blending appliance having on-board connection blending circuitry to perform network blending, and network management on the device itself. In another variation, the multi modem communications device can include blending capabilities through a blending circuit but this functionality can be turned on or turned off dynamically such that the multi modem communications device can switch between being a remote modem box and a portable blending appliance. The blending capable appliance, in another variant embodiment, may connect with remote modem box connections and also blend those connections as well (e.g., a blending capable multi modem communications device connected to a multi modem communications device configured as a remote modem box).

While there are many possible use cases, two use cases in particular are contemplated and described in further detail. A first use case is described where one or more of the multi modem communications devices are coupled to a stationary installation, such as a device located in a data center of a building, and the multi modem communications devices are positioned on various faces or different floors of the building such that additional virtual connections are exposed to the device in the data center of the building so that enhanced communications are possible. In a second use case, one or more of the multi modem communications devices are coupled to a mobile installation that, for example moves along a path and different geospatial locales such that the performance parameters change periodically and thus, in some embodiments, assignments of modems to carriers/operators may need to be updated from time to time.

The multiple-antenna chassis is adapted in view of signal propagation challenges that occur when multiple antennas (e.g., multiple co-located antennas) are utilized. Antennas can include different types of antennas such as antennas that are adapted for transmission, receiving, or combined antennas, which are adapted for both transmit and receive functions. An example antenna can include a SISO (a single-input, single-output antenna), although other antenna types are possible. Multiple-input and multiple-output, or MIMO is a method for multiplying the capacity of a radio link using multiple transmission and receiving antennas to exploit multipath propagation. Homogeneous MIMO is an approach for MIMO antennas where all of the antennas (or antenna elements) are the same. As noted above, approaches are described in relation to challenges relating to multiple radios (operating simultaneously) that can have multiple antennas.

In particular, these challenges can be summarized as the energy loss problem, the simple antenna differentiation problem, and the MIMO correlation problem. The chassis is adapted, for example, to minimize the interference between co-located antennas that are working on similar frequencies either because of the physical geometry of the system or because of reorientation/modified geometry of the antenna. Antennas are adapted for electronic communications and can transmit, receive, etc. using various transceivers. The antennas may have specific shapes and configurations, such as folding, polarizations, lengths, etc., depending on a particular desired beam pattern and/or spectral characteristics for electronic communications (e.g., loop antennas, dipoles, slot antennas, fractal antennas, beam-forming enabled antennas).

An energy loss problem arises from the use of a plurality of antennas (e.g., wide-band antennas, or multi-band antennas). LTE, LTE-Advanced, 5G, or future generation cellular communications systems are capable of operating across a large number of possible frequency bands, and carrier aggregation allows service providers to aggregate multiple different bands to form one channel on one radio, and these frequency bands to be aggregated may be different from region to region depending which bands are available for use. Cellular radios are available that operate worldwide on 40 or more frequency bands.

For an antenna to support all the possible bands that a radio might use (so that the same antenna design may be used worldwide) and also so that the antenna supports the arbitrary grouping of available bands to be used together in carrier aggregation, a wide-band type of antenna, that is capable of transmitting/receiving across the continuous range of frequencies covering all bands supported by the system, can be preferred. When a system uses multiple radios (modems) per system, all radios operating on bands within the same set of possible bands, and with each radio using multiple wide-band antennas, the ability of each wide-band antenna to radiate/absorb all frequencies of interest has detrimental effects on system performance.

Because every antenna in the system still absorbs all the frequencies of interest within the bands of operation of the system, and by design the antennas do not select for a given frequency of interest while rejecting some other frequency (inside their continuous band of operation), a fraction of the RF field strength near a given antenna in the system is absorbed by the other antennas (e.g., nearby antennas or co-located antennas) in the system. The absorbed energy may be lost in the neighbouring antennas or carried into the neighbouring antennas' radios. This has the effect that some of the RF energy used to form a communication channel by a given modem/antenna is always lost to the neighbouring antennas where it does not contribute to the communication channel. For example, a 3-radio system where each radio has 2 antennas (e.g., a system of 6 identical antennas), each antenna loses approximately 30% of its energy into the other antennas in the system (this loss can occur both ways, during transmit or receive).

As described herein, approaches are proposed that are adapted to reduce energy losses to neighbouring antennas in a single or multi-radio system comprised of a plurality of radio and/or wide-band antennas. These approaches are useful, for example, where communication resources are constrained or mission-critical. The situations can include rural/remote area/war-zone broadcasting, major sports event broadcasting, among others, and the approaches described herein are described in various embodiments wherein combinations of line-of-sight reduction and diverse connectivity path aggregation (e.g., bonding)/control are utilized together to improve communication characteristics in concert to deliver enhanced reliability, coverage, or overall aggregated bandwidth. As described herein, the physical systems can be used as parts of mobile transmitter systems.

The simple antenna differentiation problem arises because wide-band antennas tend to be geometrically simple in design, e.g., simple polygons, there are limited opportunities for geometric permutation. Conversely, if an antenna is geometrically complex in design, there may be ways to geometrically permute the design of the antenna so that each permutation has equivalent performance of an antenna from the perspective of a distant endpoint in a communications channel, but has reduced energy losses to neighbouring antennas in the local system. From the perspective, of the far endpoint, the different shapes are equivalent as antennas, but nearby antennas are less likely to couple energy between one another.

Approaches to geometric permutation of wide-band antennas and approaches to increasing the possibilities for geometric permutation by considering the co-permutation of the antenna-chassis or antenna-counterpoise system together are described in various embodiments herein. Variant approaches to isolation of neighbouring antennas that may be required when opportunities for geometric permutation of the antenna design is limited (as in polygonal wide-band antennas) are also described in various embodiments.

Any reduction in RF energy lost to neighbouring local antennas should improve MIMO performance. This can occur for both transmit and receive.

To further illustrate data communications challenges, LTE, LTE-A and 5G radios/modems may be configured to use multiple antennas per radio/modem. Various approaches can be adapted to use these multiple antennas to send/receive more data per communications channel subject to real-world constraints. Examples include multipath propagation, and spatial multiplexing. For these systems to work, however, there must be a degree of isolation between a given radio's multiple antennas. For multipath propagation, a given transmitted signal must be received differently by multiple receiving antennas. For spatial diversity, multiple datastreams are transmitted on multiple transmit antennas using orthogonal coding. Multiple receive antennas each receive a different combination of the transmitted datastreams (differing amplitudes and phases) which may be uncorrelated in the receiver.

These approaches are more effective when there is better isolation (e.g. less coupling) between the multiple antennas used by each radio. Any correlation in signals received across multiple MIMO antennas should be as a result of the particular MIMO scheme employed and nota function of the local MIMO antennas only. Radios also specify a minimum isolation requirement (e.g., 10 dB) between connected MIMO antennas.

The solutions described in some embodiments herein are useful in respect of the wide-band antenna plurality energy loss problem and the simple antenna differentiation problem, and may also contribute improved MIMO performance on top of the reduction in RF energy lost per channel.

In some embodiments, the chassis can be manufactured using radio frequency (RF) shielding material and the antennas can be affixed to allow them to have maximum surface area/signal strength, but the lines of sight with the other antennas affixed to the chassis are reduced or removed entirely by way of structural features. This can be accomplished, for example, by using a simple polyhedron wherein the antenna surface's size is dependent on i) the distance between the antenna and the chassis and ii) the angle between the chassis edges. For example, concave surfaces can be used to provide an aperture or cavity in which a longer antenna can be affixed. The antennas may be positioned in the center of the surface, or off-center (and may be pointed in various directions). The shape of the antenna could also be optimized in order to maximize its surface area such as by using folded antenna frames. The system could also direct signals through the antenna which have the best communication (e.g., transmission and/or receiving) capability. This aspect overcomes the directionality challenges that arises from shielding the antenna. The system could monitor the communication capabilities of specific antenna and ensure signals are propagated through the appropriate antenna. Further, the system could reorient itself in order to maximize the transmission capabilities of the antenna.

The energy loss problem is pertinent when using identical (or sufficiently similar) antennas, which when co-located, lose energy through absorption by nearby antennas due to the wide-band antenna's non-selective nature. Even if a given antenna is operating on one band while a nearby antenna operates on another, each antenna loses some incoming and outgoing energy in its band of operation to its neighbour, since all the antennas absorb energy on all bands of interest. Nearby antennas absorb and 'waste' some local RF energy, weakening the interaction between any given antenna and the far-field counterparts which form the communications channel. Energy loss is a function of distance—the nearer the neighbouring antenna, the greater the loss.

The simple antenna differentiation problem occurs in antennas with simple shapes (e.g., typical wide-band antennas). It is relatively more difficult to isolate these nearby wide-band antennas. For geometrically complex antennas, it is possible to modify the shape of the antenna (e.g. mirroring) to increase isolation between nearby antennas. Wideband antennas may be geometrically simpler in shape than multi-band antennas. As a result there may be greater difficulty in isolating nearby wide-band antennas vs. multi-band antennas as simpler geometric shapes have less potential for modification. For example, a multi-band antenna may be shaped similar to a tree-branch whereas a wide-band antenna be shaped similar to a square (or a 3D equivalent). There are many more permutations of the tree-branch geometry but no permutations of a square shape, which limits the shapes available to the wide-band antenna as transforming the wide-band antenna into a complementary shape that increases isolation is much more complex and in some cases impossible.

The MIMO correlation problem arises when sets of antennas are used as MIMO elements (where multiple spatial paths between transmitter and receiver allow more data to be communicated on a single frequency), and the approach requires reduction of correlation (e.g., improved isolation) between antenna elements. This issue can arise both ways, both in transmission and reception. MIMO antennas themselves need to be able to see 'different' signals arriving at them, and use variations in the observed level of signal correlation at different antennas in order to effectively recover all communicated data. If the signal received at one MIMO antenna is always correlated to that received at another due to shortcomings in the system, the MIMO antennas' ability to recover all communicated data is reduced.

These challenges are more significant for mobile devices which aim to be small and portable. Larger, non-mobile items in a transmission system (e.g. cell towers) solve these interference problems by moving antennas farther apart, which is not an option with the size constraint imposed on mobile devices.

FIG. 1 displays an alternate design, which shows how multiple antennas on a device can interfere with one another and create energy loss by having nearby antennas pick up signals meant for a far-field antenna. Note that the chassis/kernel and antennas may be contained within a large enclosure for a particular device, or the antennas may be external to a chassis/kernel which forms the enclosure.

In FIG. 1 illustrates the wide-band energy loss problem. Antenna 100 is transmitting signal to its far-field counterpart forming a communication channel. Antenna 100 is within the line of sight of antenna 102. Some of antenna 100 transmitted or received signal power will be lost to antenna 102 through line of sight to 104. Likewise antenna 102 will lose some RF energy through line of sight to 106. Similar losses occur between all antennas that are within line of sight with each other. As described in improved embodiments in the present disclosure, the losses described can be reduced if line-of-sight can be reduced. It is noted that line-of-sight is not the only cause of signal challenges and there may be other causes.

Accordingly, there is a need for a system or device which addresses concerns relating to near-field losses or loading while allowing flexibility in improving far field performance, particularly in the context of mobile or nomadic data transmission, where the location of a device or set of devices relative to the available communication infrastructure can vary (as can the characteristics of the data transmission).

Figure 2A:
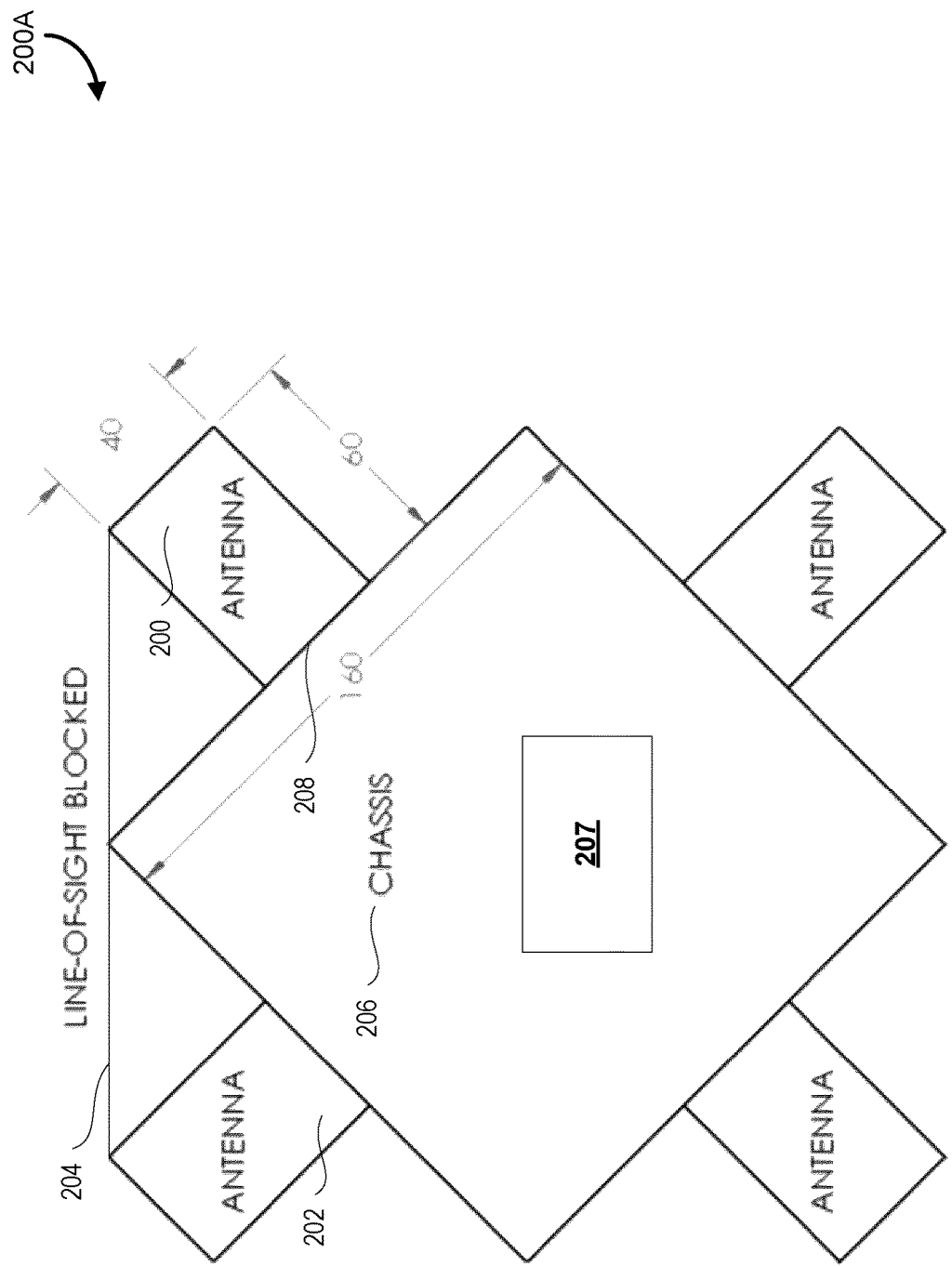
FIG. 2A is a 2D rendering of a chassis/antennas combination which demonstrates the line of sight blocking which helps to avoid crosstalk, and which uses chassis for basic grounding and shielding, according to some embodiments.

This effect can be addressed by design shown in the diagram 200A in FIG. 2A, where a multiple-antenna chassis is described in an example embodiment. Referring to FIG. 2A, the spatial orientation and arrangement of chassis 206, antenna 200, and antenna 202 is such that line of sight 204 is blocked by chassis 206. In FIG. 2A, the antennas are shown having a height and a width, and are represented by rectangles.

However, different types of antennas 200, 202 with different geometries are possible and power/signal propagation characteristics differ as a result of their different geometries. For example, the "line of sight" is not always a straight line from an end of an antenna, but rather, the line of sight may take into consideration signal propagation/reflection, directionality, polarity, beam patterns, among others. In some embodiments, the geometries are adapted to reduce overlapping beam propagation pathways, which may be different than line of sight as in view of waves bending around corners or other structural features (especially if the waves have high amplitudes), based on the field patterns emitted by the antenna.

Line of sight between nearby local antennas can contribute to poor signal isolation between those antennas (where one can absorb energy via the wideband problem), while overlapping propagation pathways may cause inadvertent correlation of two ideally uncorrelated signals, which would degrade spatial MIMO performance.

Corresponding methods of operation, and non-transitory computer readable media storing machine interpretable instructions to be executed on a processor to perform the methods of operation are contemplated. The chassis 206 where the processor and storage are located can be a housing where antennas can be coupled to (e.g., directly connected, affixed, mounted), providing a kernel apparatus where additional electronic devices can be modularly attached or removed depending on a particular usage scenario.

Types of antennas 200, 202 can include monopole antennas, whip antennas, dipole antennas, fractal antennas, patch antennas, log periodic antennas, bow tie antennas, aperture antennas, slot antennas, microstrip antennas, flat-plate reflector antennas, flat antennas, parabolic antennas, among others. Each of these different types of antennas have different communication characteristics, for example, having different directionality, polarity, radiation patterns. For example, some antennas radiate waves in directions horizontally, while others can be more focused or omnidirectional. Power delivery of the waves may not necessarily be uniform in all directions (e.g., directivity). Multiple antennas (e.g., in MIMO configuration) can be useful and help in certain situations, such as where it is useful to exploit multipath propagation. However, as noted above, antennas operating together may have deleterious effects on the performance of one another if they are in line of sight or in close proximity to one another or operating on overlapping, same, or adjacent frequency bands (wide-band antennas are particularly problematic).

The structural characteristics (e.g., of the chassis, the antennas, the direction/location of the antennas), as noted in various embodiments below, are adapted to improve signal quality when multiple antennas are operating simultaneously on the chassis. The chassis may be an enclosure for other objects, such as electronics, or may incorporate one or more heat sinks. In some embodiments, the chassis 206 may be hollow to allow for internal mounting of devices, such as circuit boards, routing controllers, etc., or to include sections for storage. For example, in an embodiment, the antennas can include a number of homogenous MIMO antennas that can be switched to different MIMO capable radios as controlled by various routing controllers.

The physical geometry can be controlled during manufacture, or in some embodiments, actively controlled to some extent through the actuation of controllable elements, such as bearings, slides, servomotors, among others. By controlling the geometry of the chassis 206 and antennas 200, 202, coupling between the antennas 200, 202 can be minimized or eliminated.

A multi-antenna chassis 206 having mounting points 208 or apertures each corresponding to a corresponding antenna or a plurality of antennas is described in some embodiments. The mounting points 208 or apertures are positioned such that each of the antennas are not within line-of-sight of one another. The chassis 206 is a three-dimensional shape having a number of surfaces for the mounting points 208 or apertures. Other considerations for positioning include constraints relating to the operation of the device. For example, in an embodiment, there may be one antenna on each face so that the system can receive signals from all directions. In another embodiment, there are antennas on a set of faces while other faces are not used or not available.

The chassis 206 can be a conductive 3-dimensional polygon with RF shielding properties and features to mount all antennas, where the chassis shape is adapted so the chassis blocks the line-of-sight RF path between antenna elements. The chassis 206 (which may contain electronics) can be thought of as a "kernel", around which the neighbouring energy-absorbing antennas can be arranged, such that optimizing size/shape/placement of antennas relative to the kernel can minimize coupling and signal absorption/energy-loss by non-active antennas in the "near field" as the horizon created by the kernel shape blocks line of sight. Other potential benefits include optimizing for far-field communication, as the kernel shape and/or antenna positioning or orientation may improve spectral characteristics of the communication. The polygonal chassis 206 can be used as a counterpoise for the antennas, in some embodiments. In an example, the chassis 206 may be used as an enclosure for radios or other system electronics, or also as a radiator for system cooling.

In some embodiments, the chassis shape may also be altered in concert with, or separately from, antenna shape to minimize coupling between local antenna elements with minimal far-field effects. This approach may be extrapolated to complex folded antennas and many-sided polygons.

Antennas 200, 202 can include feed lines or transmission lines, for connecting the antenna to a corresponding transmitter or receiver. As noted in some embodiments, a routing controller circuit 207 may control the operation of the antennas in relation to the antennas being utilized together to provide a communication by coordinating their operation (e.g., operating in concert). For example, different MIMO antennas can be switched to different MIMO capable radios, or choosing all the antennas for a given radio due to factors such as tower location or to spatially separate from another interfering band within the system.

For example, not all antennas 200, 202 on the chassis 206 are necessarily used for the same purpose or the same communication channel, for example, a media broadcast van may have multiple receiving points it is transmitting to, and may be transmitting entirely different feeds (e.g., antennas 1, 4, 6, 8 are used for a sports channel, and 2, 3, 5, 7 are being used for breaking news). These antenna groupings can be antennas that are bonded together and operated such that corresponding antennas belonging to a particular bonded subgroup do not have line of sight with one another (although they may have line of sight with other antennas of another subgroup). For example, a chassis may have two subgroups which each do not have line of sight with one another (e.g., alternating up and down oriented antennas).

Similarly, as noted in some of the related applications, different antennas can be utilized in relation to different types of communications if being used together (e.g., bonded connections), for example, with some antennas being used for error control, while others may be used for bulk data transfer. In the context of a single video feed, different sets of antennas can be used for different parts of the feed, for example, some can be used for providing a score overlay or advertisements on part of the video, while others can be used to broadcast a sports game in progress. Different antenna and different sets of antennas can be used on a per-flow routing basis, for example.

Figure 2B:
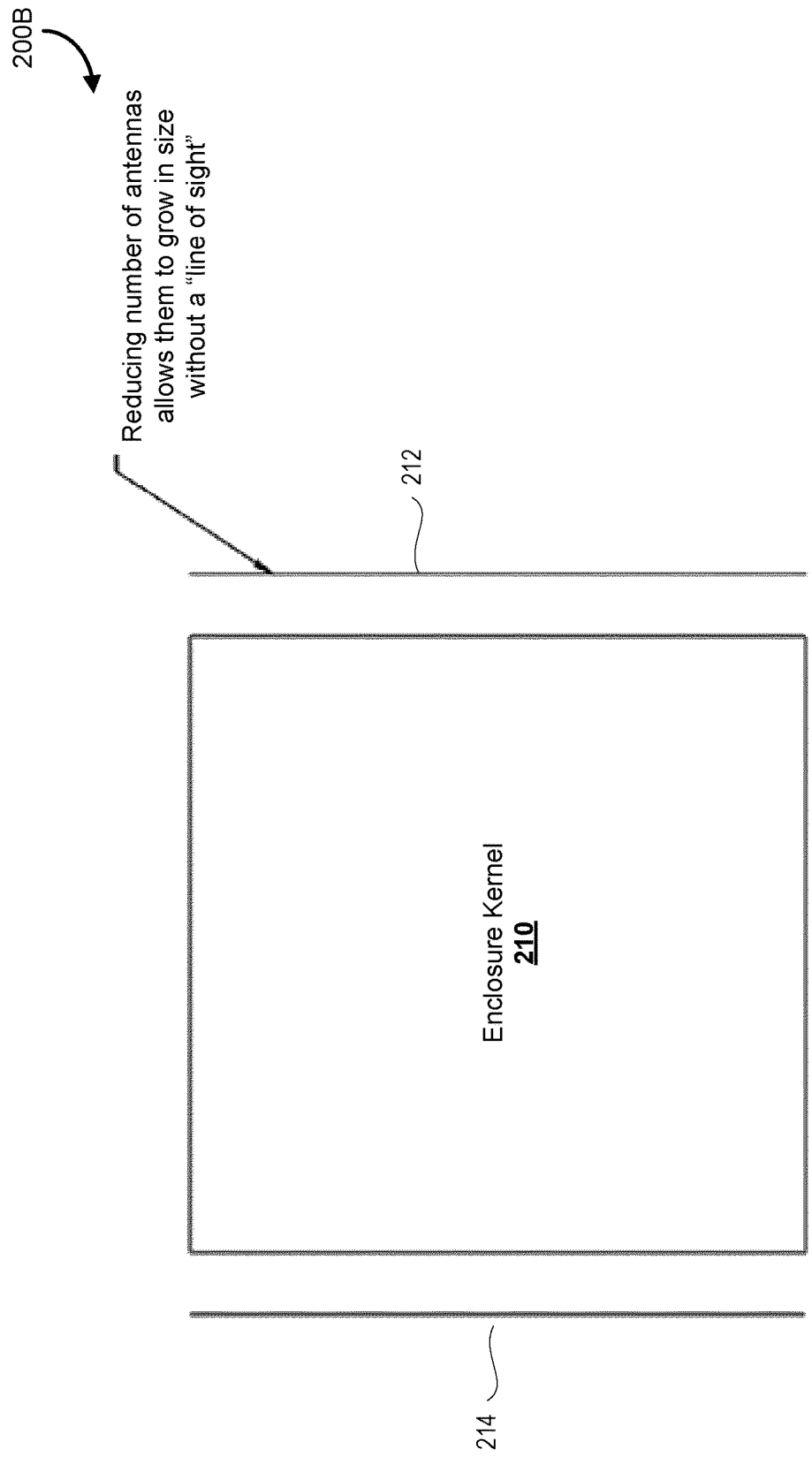
FIG. 2B is a 2D rendering showing one embodiment in which the number of antennas are reduced in order to maximize their size, while still avoiding crosstalk, according to some embodiments.

Another example is shown in diagram 200B in FIG. 2B. where by reducing the number of antennas, it is possible to allow larger antennas while still creating a line of sight. Antennas 212 and 214 are positioned on opposite surfaces of chassis (enclosure kernel) 210. In this embodiment, the surface of antennas 212 and 214 can extend to the size of chassis 210 surface area without establishing a line of sight between antennas 212 and 214. It is important to note that while the chassis shown is a central kernel, there are other variations possible where the chassis instead is a large metallic object, such as the body of a vehicle.

Folding of antennas may allow for smaller system envelopes by further reducing line-of-sight between antennas. Antenna folding, for example, can include antenna control mechanisms or structural features (e.g., hinges) which allow for portions of the antennas to be manipulated (e.g., bent in various directions, folded against itself, among others). The folding allows for potentially improved shape, and in the context of multi antennas operating in concert with one another mounted to the chassis, an ability to modify the height associated with each individually antenna to help reduce potential line of sight interference with one another. For example, folding may aid in reducing the amount of height each antenna protrudes relative to the surface upon which it is mounted.

Folding of antennas can be a very useful tool in solving some of the problems described herein, and further variations are possible. Although antenna design can be expensive, in some embodiments, a complementary wide-band antenna is adapted such that 'folding' (e.g., integration with a chassis described herein) is made as easy as possible. In some cases, antenna folding is also used for achieving specific physical dimension profiles (e.g., to have the multi modem communication device as flat as possible, or to have a certain boxy profile to reduce an overall footprint, depending on the available space that it will be placed in).

Variant folding antennas can be adapted, for example, by designing the antenna with discrete geometric 'zones' that would become useful as sub-elements of the antenna after folding; designing the antenna with 'fold lines' between those zones; or pre-computing or designing such that antenna tuning is changed as minimally as possible when folding on those lines. Accordingly, in this example, a more complex design may be undertaken once, yielding an antenna design that requires less work to integrate, tune, and finalize when integrating into a system such as that described in various embodiments herein.

Figure 2C:
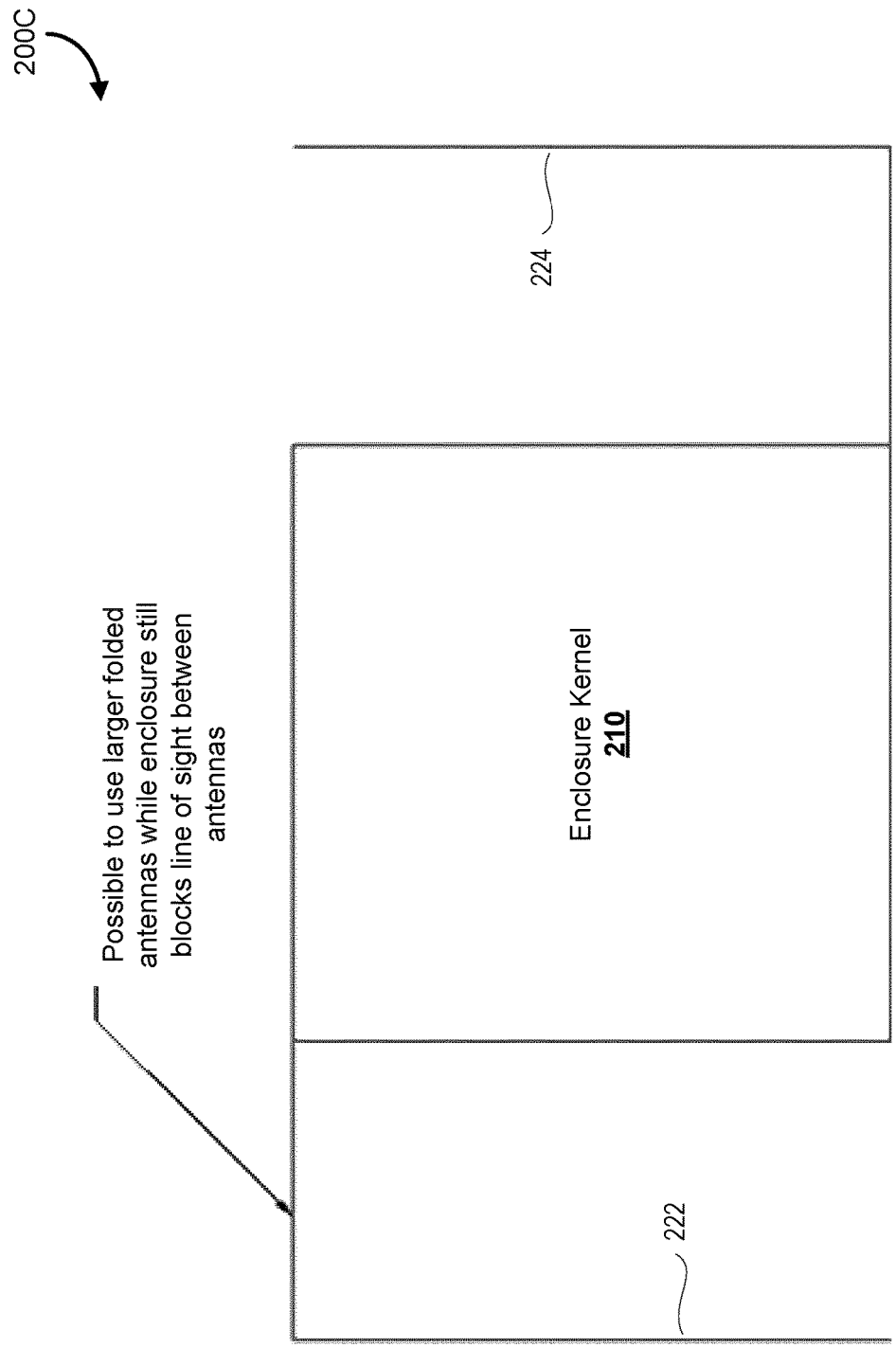
FIG. 2C is a 2D rendering of a chassis/antennas combination which displays the idea of folding an antenna within a prescribed chassis envelope in order to increase the size of the antenna without adding coupling, according to some embodiments.

FIG. 2C includes a diagram 200C that expands on the approach by introducing shape to the antenna (in this case also flipping the antenna such that it has a mirrored orientation relative to the other antenna), according to some embodiments. Antenna 222 extends out of chassis 220 and is folded towards chassis 220 in a way wherein chassis 220 still obstructs the line of sight between antennas 222 and 224. Folding antenna 222 increases the maximum surface area, which could allow for improved signal propagation, an expansion or a reduction of the operating frequency range.

The chassis shape itself may also be altered to further reduce coupling to local antenna elements. Antenna folding may minimize required chassis size for given antenna size e.g., folding last 20 mm of antenna into vertical dimension.

Figure 2D:
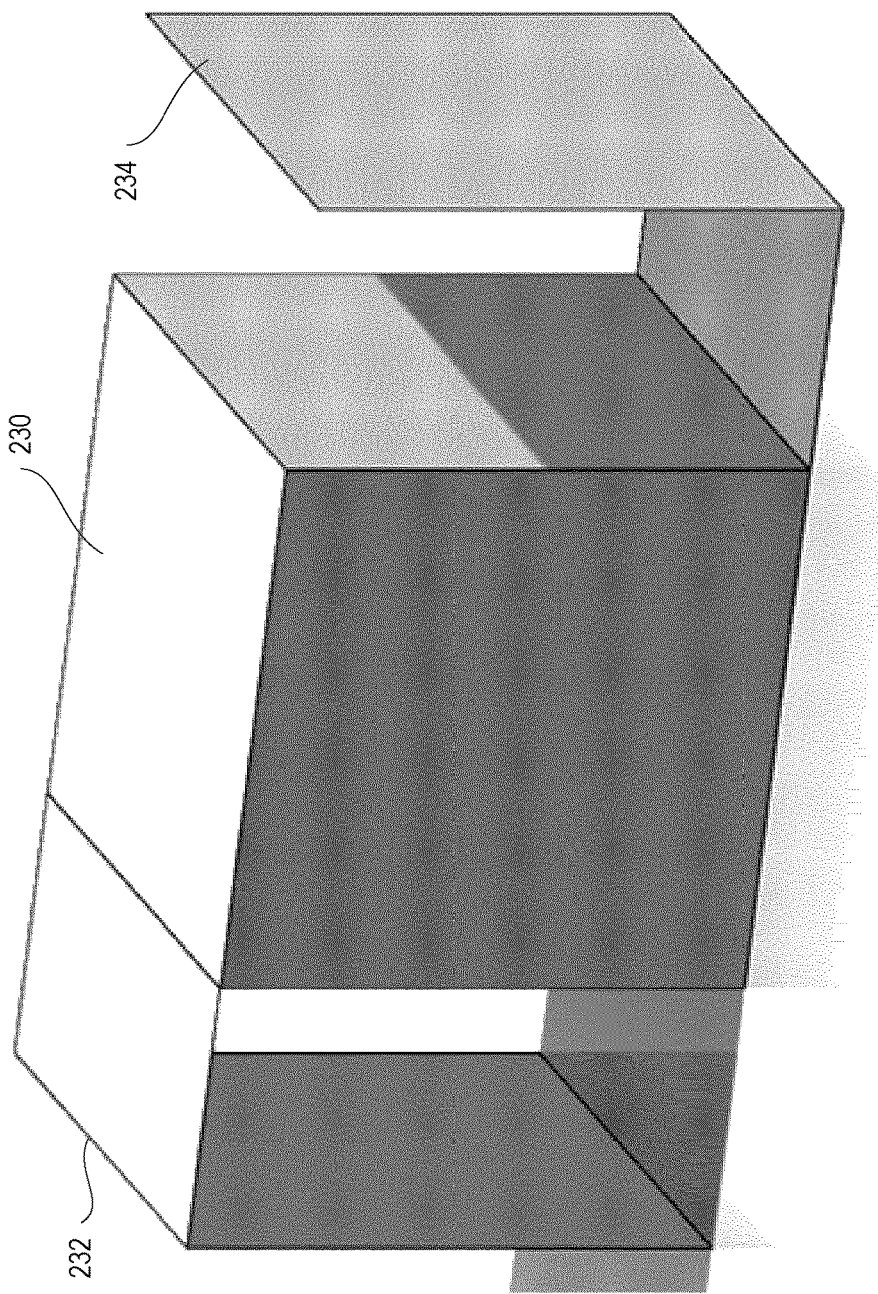
FIG. 2D is a 3D rendering of the chassis/antennas combination described in FIG. 2B which shows a variant in which the antennas are bent or otherwise shaped.

FIG. 2D is a diagram 200D that shows an embodiment of the chassis in a 3D rendering. Antenna 232 extends out of chassis 230 and is folded such that the antenna is parallel to chassis 230 in a way wherein chassis 230 still obstructs the line of sight between antennas 232 and 234. Folding antenna 232 allows for a longer antenna to be affixed without adding substantially to the height (e.g., distance from the surface of the kernel). Distance from the surface of the kernel is useful in that it may help in establishing antenna "loft" away from the core of the kernel, which could act as an electrical counterpoise, for example.

Figure 2E:
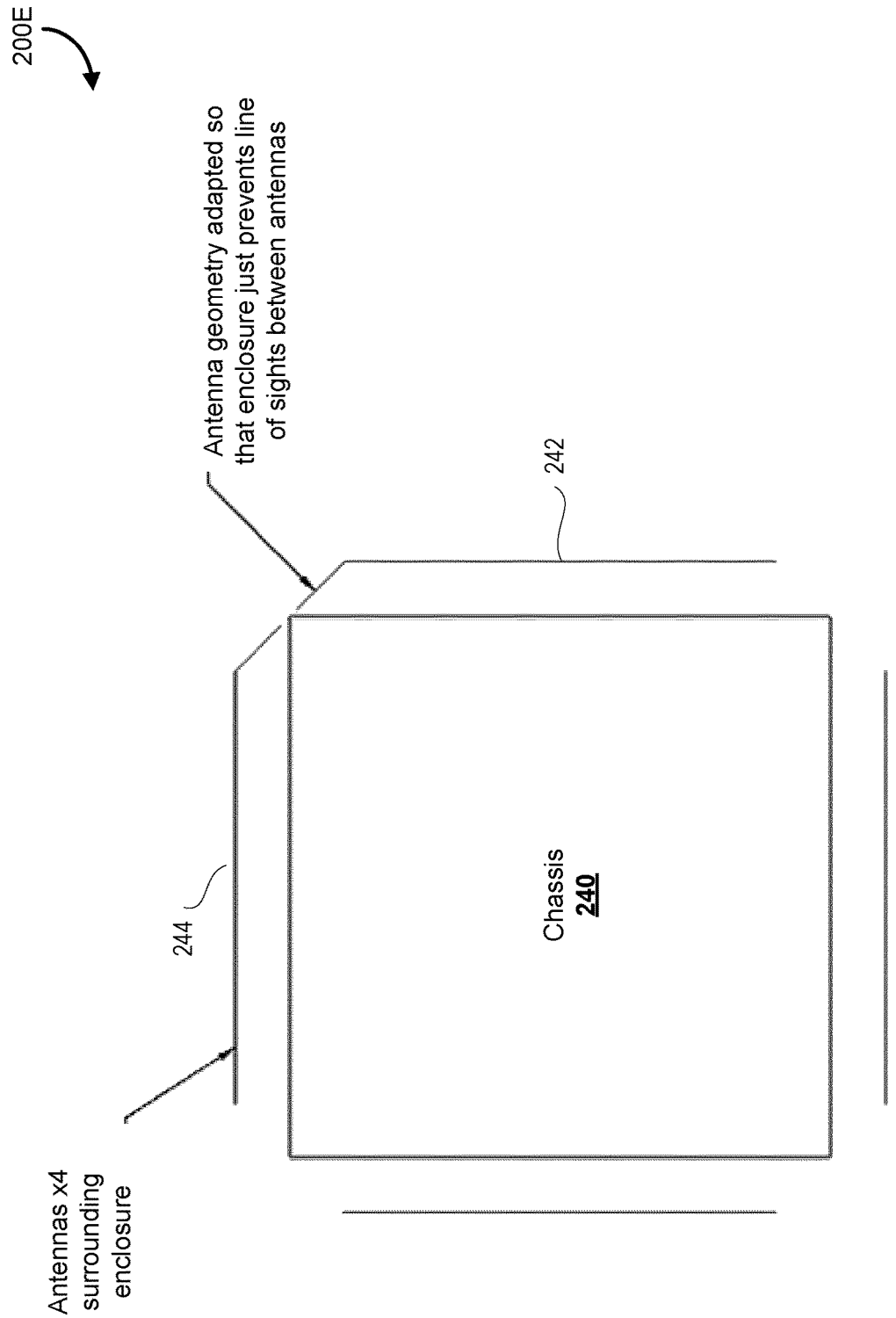
FIG. 2E is a 2D rendering of an embodiment showing how the size of an antenna might be restricted in order to allow for a maximal number of antennas to be employed relative to the size and shape of the enclosure, according to some embodiments.

In some cases, including devices which require many different antennas (such as bonded transmission devices), a trade off may be required, wherein the size of the antennas is made smaller to reduce cross-talk, as shown in FIG. 2E.

Figure 2F:
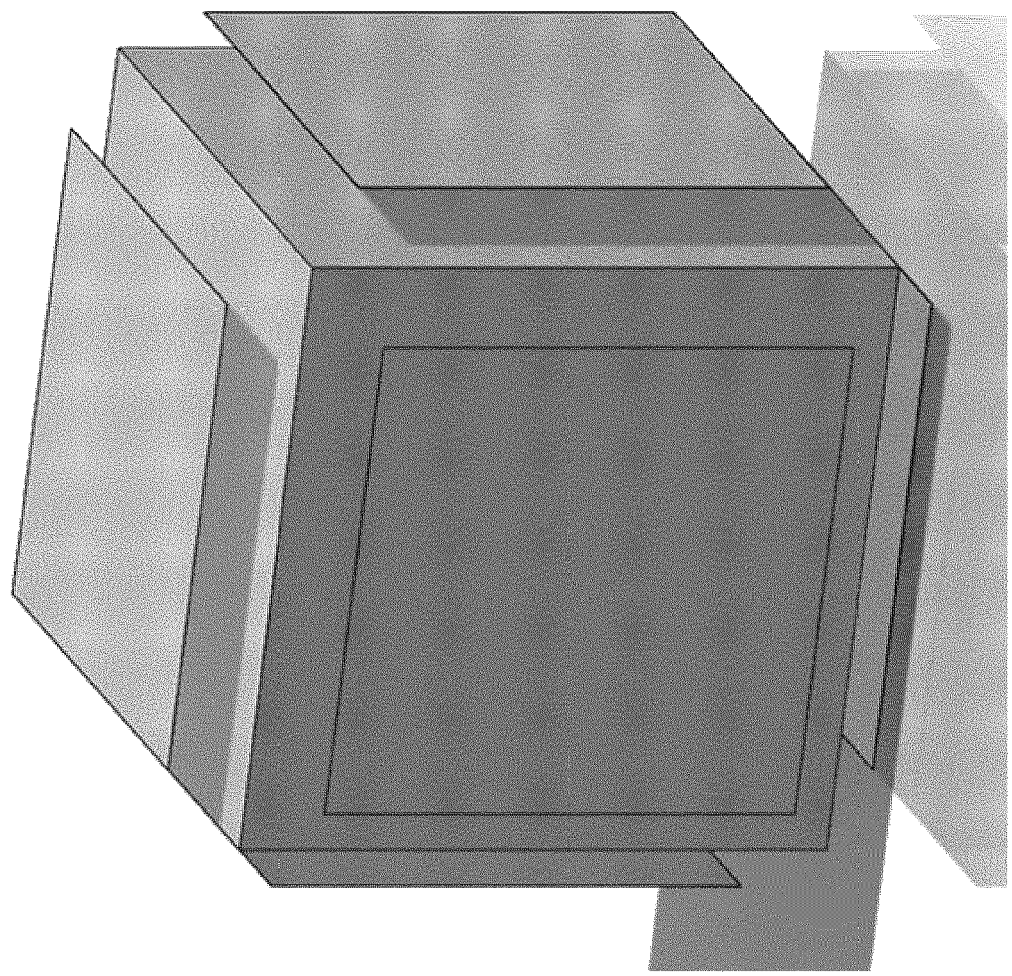
FIG. 2F is a 3D rendering of the embodiment described in FIG. 2E, according to some embodiments.

Referring to FIG. 2E, a diagram 200E is shown with chassis 240 has an antenna affixed to each of the chassis 240's four sides. Antennas 242 and 244 extend out from chassis 240's corner along a plane through which chassis 240 obstructs the line of sight between antenna 242 and 244. By obstructing the line of sight, antennas 242 and 244 lose little signal energy from absorption from by one another. Antennas 242 and 244 can be folded towards the body of chassis 240 for spatial properties. A 3D rendering of such a solution is shown in diagram 200F of FIG. 2F.

Figure 2G:
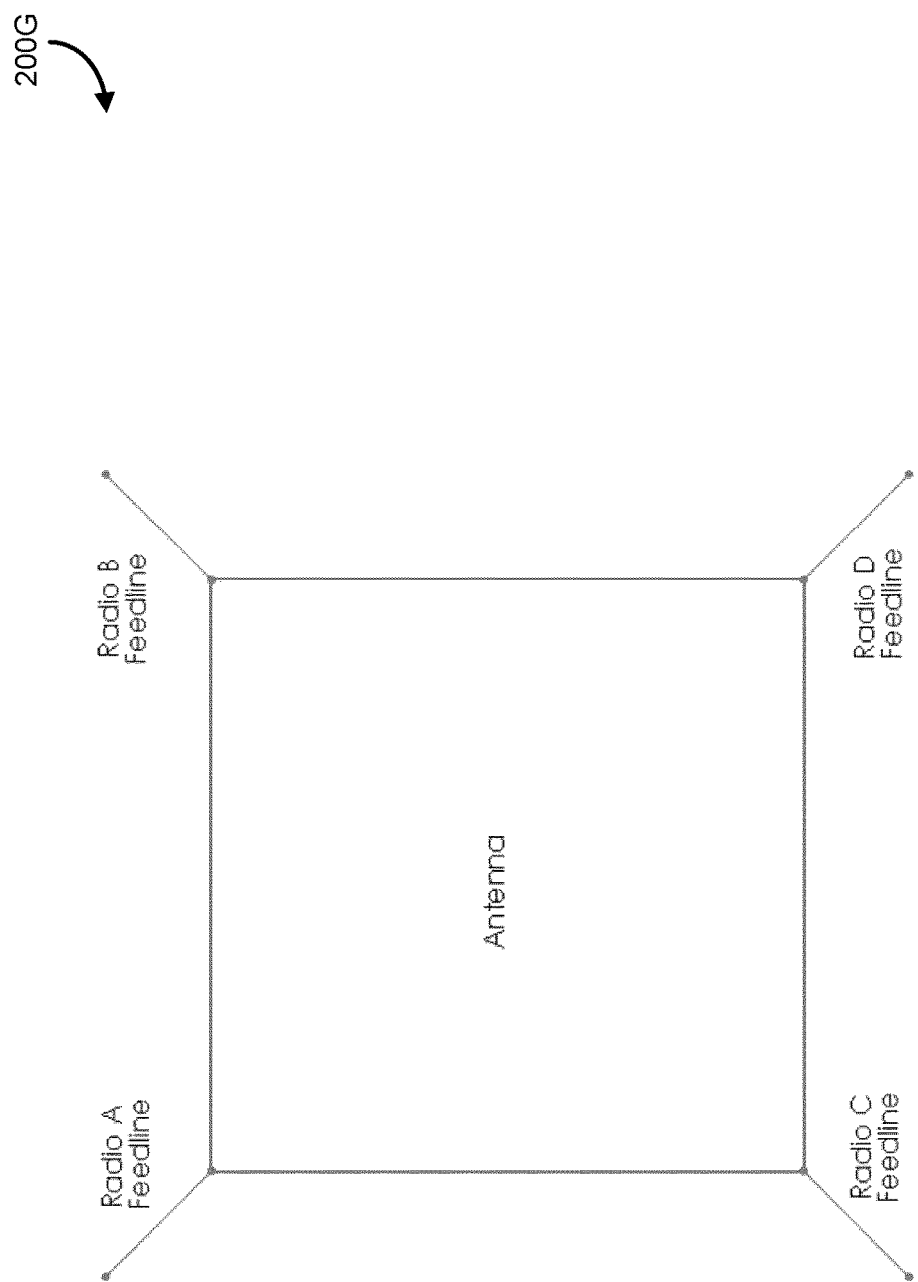
FIG. 2G is a 2D rendering of an antenna that can have multiple feedlines (e.g., radio feedlines), according to some embodiments.

FIG. 2G is a diagram 200G showing potential modifications in respect of a particular antenna, where multiple feedlines (Radio A, B, C, and D) can be utilized. In some embodiments, the orientation and directionality of feedlines can be modified to reduce or remove coupling effects as between specific antennas.

Figure 2H:
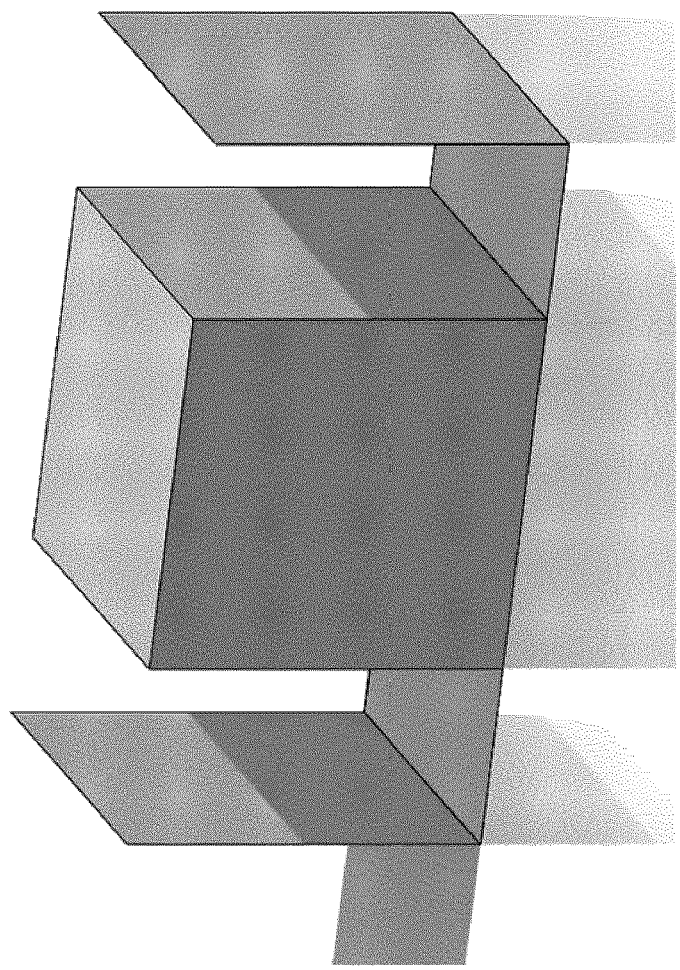
FIG. 2H is a 3D rendering similar to FIG. 2D, except where the orientations of the antennas are flipped to provide an additional dimension for modification, according to some embodiments.

FIG. 2H is a 3D rendering 200H similar to FIG. 2D, except where the orientations of the antennas are flipped to provide an additional dimension for modification, according to some embodiments.

Figure 2I:
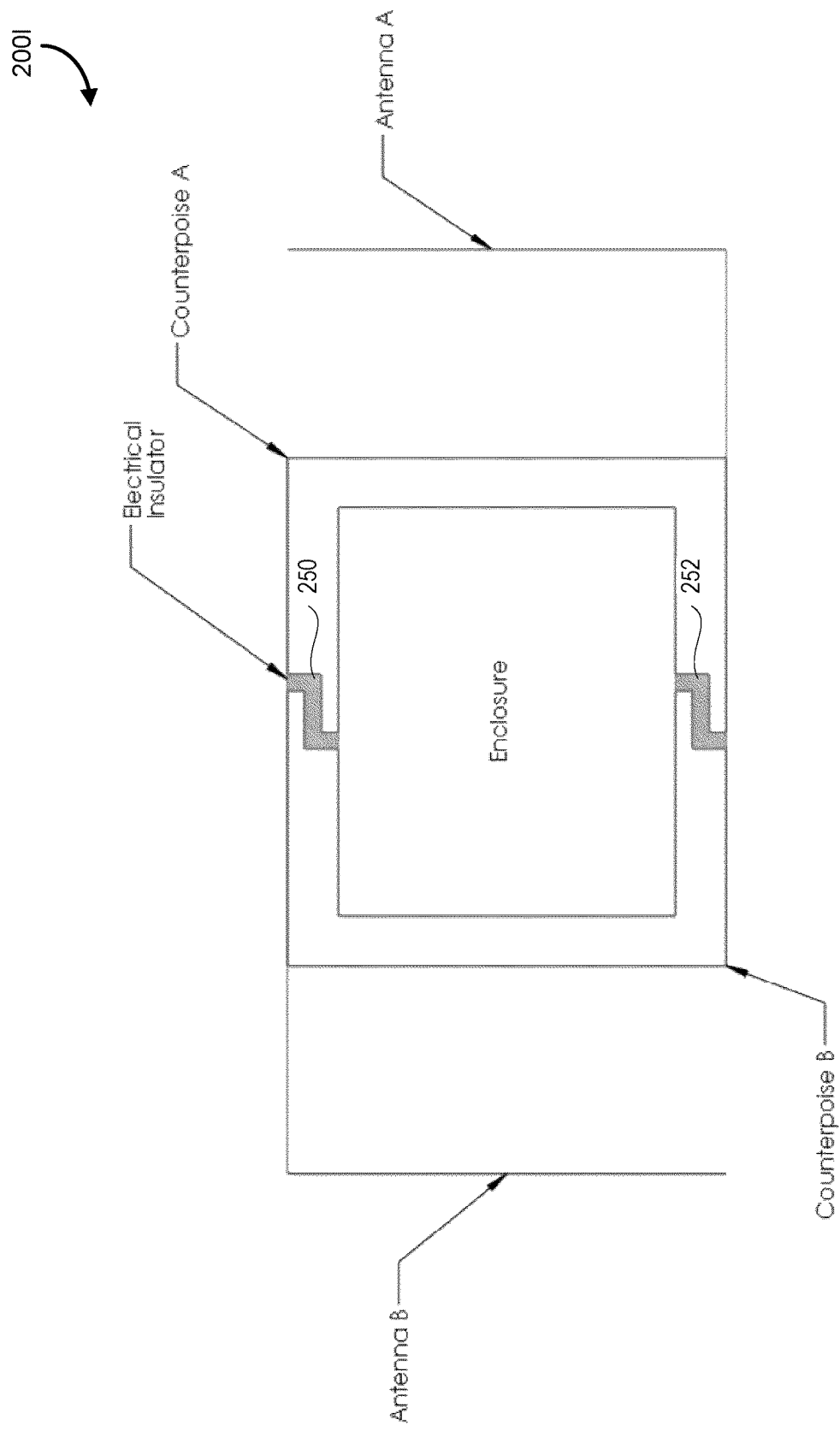
FIG. 2I is a 2D rendering of a variant having electrical insulators between the chassis regions associated with antennas A and B respectively, according to some embodiments.

FIG. 2I is a 2D rendering 200I of a variant embodiment having electrical insulators 250, 252 between antennas A and B, according to some embodiments.

In an example situation, sharing a ground plane (e.g., counter-poise) can cause signal to leak between antennas in a multi-antenna system.

A solution to this problem can include splitting the chassis into electrically isolated regions. If split, conductive regions may optionally overlap in space to maintain RF shielding and line-of-sight blocking while still electrically isolating regions of chassis. The antenna shape may be altered (e.g., by folding) to minimize line-of-sight RF path (and therefore coupling) to other antenna elements with minimal far-field effects.

In this example embodiment, antennas share a structure mechanically but not electrically, and in a further embodiment, the parts of the chassis that are separated may be specifically adapted, e.g., insulated joints, such as insulated slip-joints, so that there is no 'gap' in the RF shielding property of the chassis. In this example, no line of sight through an insulated joint means no leakage of signal from antennas on opposite sides of enclosure and no leakage of RF noise from electronics within the 'enclosure' created by the counterpoise fragments.

Figure 3A:
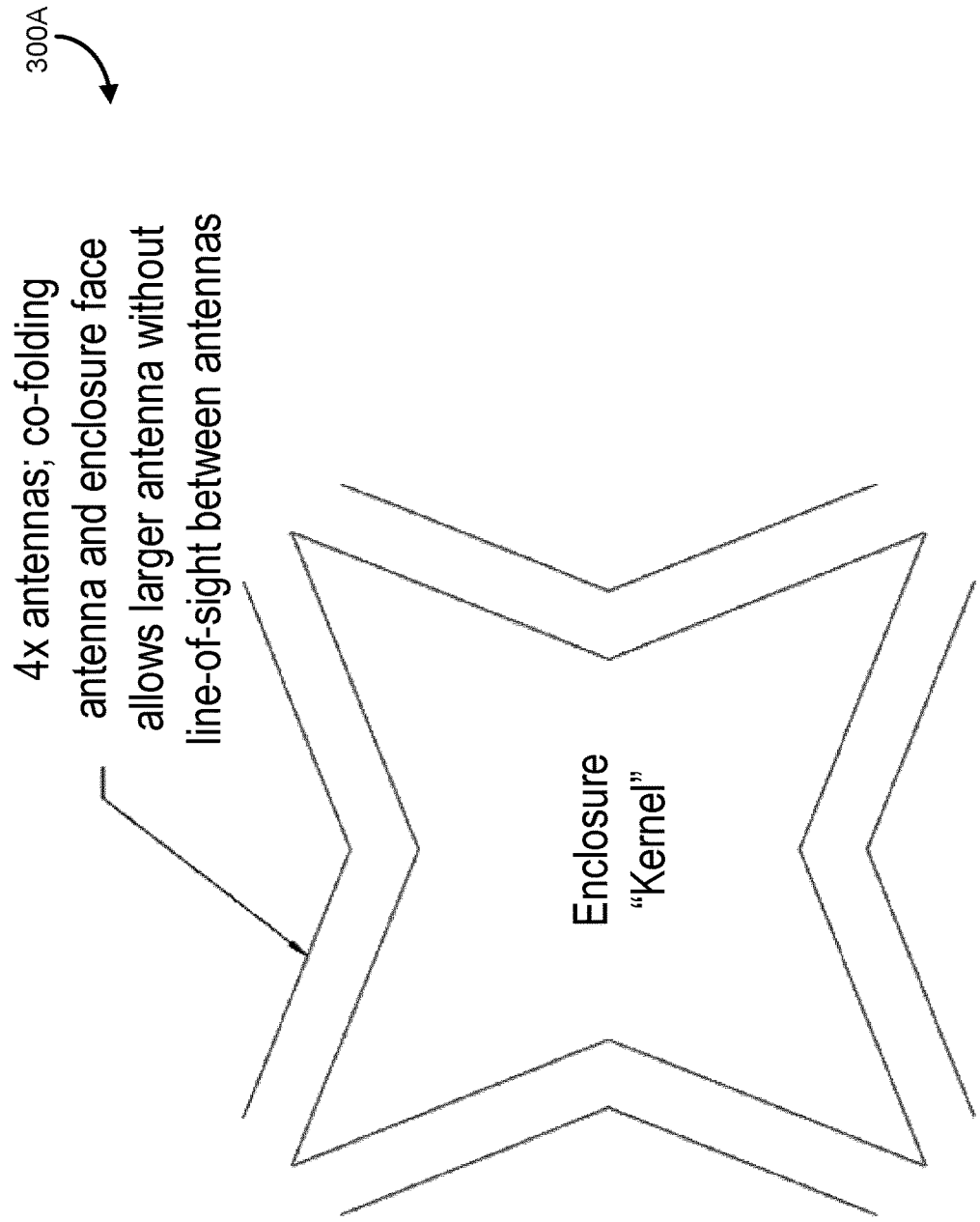
FIG. 3A is a 2D rendering showing an embodiment in which both the enclosure and antennas are folded in order to allow for maximum number and size of antenna, according to some embodiments.

FIG. 3A is a diagram 300A that shows the additional feature of co-folding the antenna and chassis in a complementary approach. In one embodiment, monopole antennas are used, with the metal central portion as the counter-poise. Antennas may share a counter-poise in order to allow for minimal size. For any given size or shape of antennas, there can be a minimal size/shape of centrepiece/kernel.

Note that in FIG. 3A, both the antennas and the surfaces of the chassis are shaped together (e.g., in this case, they are both folded in a concave manner, but other variations are possible).

Figure 3B:
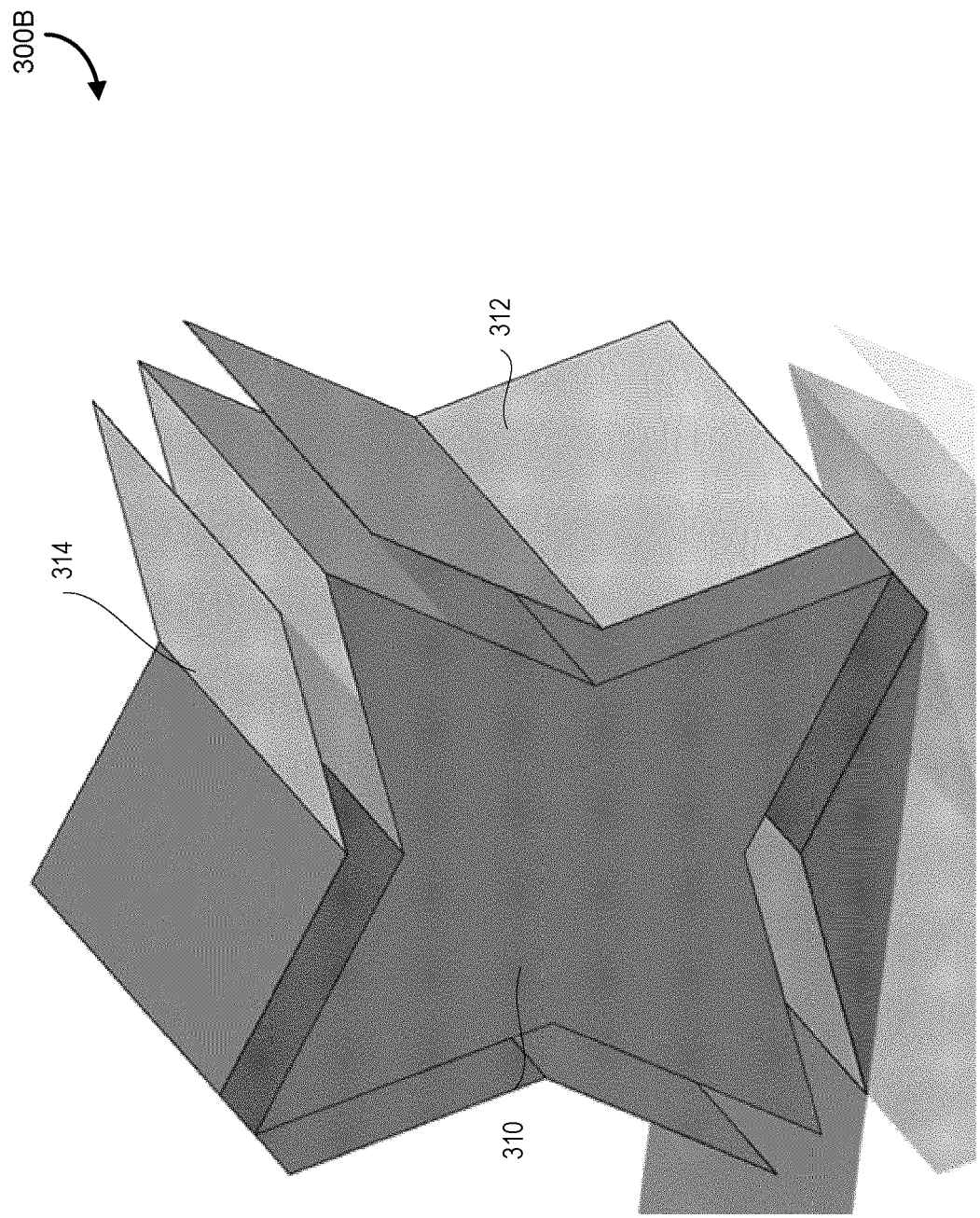
FIG. 3B is a 3D rendering of the embodiment described in FIG. 3A, according to some embodiments.

FIG. 3B shows a 3D embodiment 300B of the chassis. Chassis 310 has a shape that introduces concavity along the surfaces of the chassis. Antenna 312 is folded with a structure parallel to the inner surface of chassis 310. Antenna 312 is positioned within the concavity (e.g., a cavity, an aperture) of chassis 310. This embodiment increases the surface area or length of antenna 312 while still obstructing the line of sight between antenna and its neighbouring antennas such as antenna 314.

The depth of the cavity can be modified, for example, based on a known height of the antenna. In a variant embodiment, the depth of the cavity can be dynamically modified, for example, by actuating different structure elements to move up or down, or rotate, etc., such that the shape of the chassis is modified. In a further variant, the chassis 310 can be coupled with one or more signal quality monitoring sensors which are coupled to the shape modification mechanisms such that the concavity or depths of the cavities can be dynamically adjusted in real time or near-real time in response to monitored signal effects.

Figure 3C:
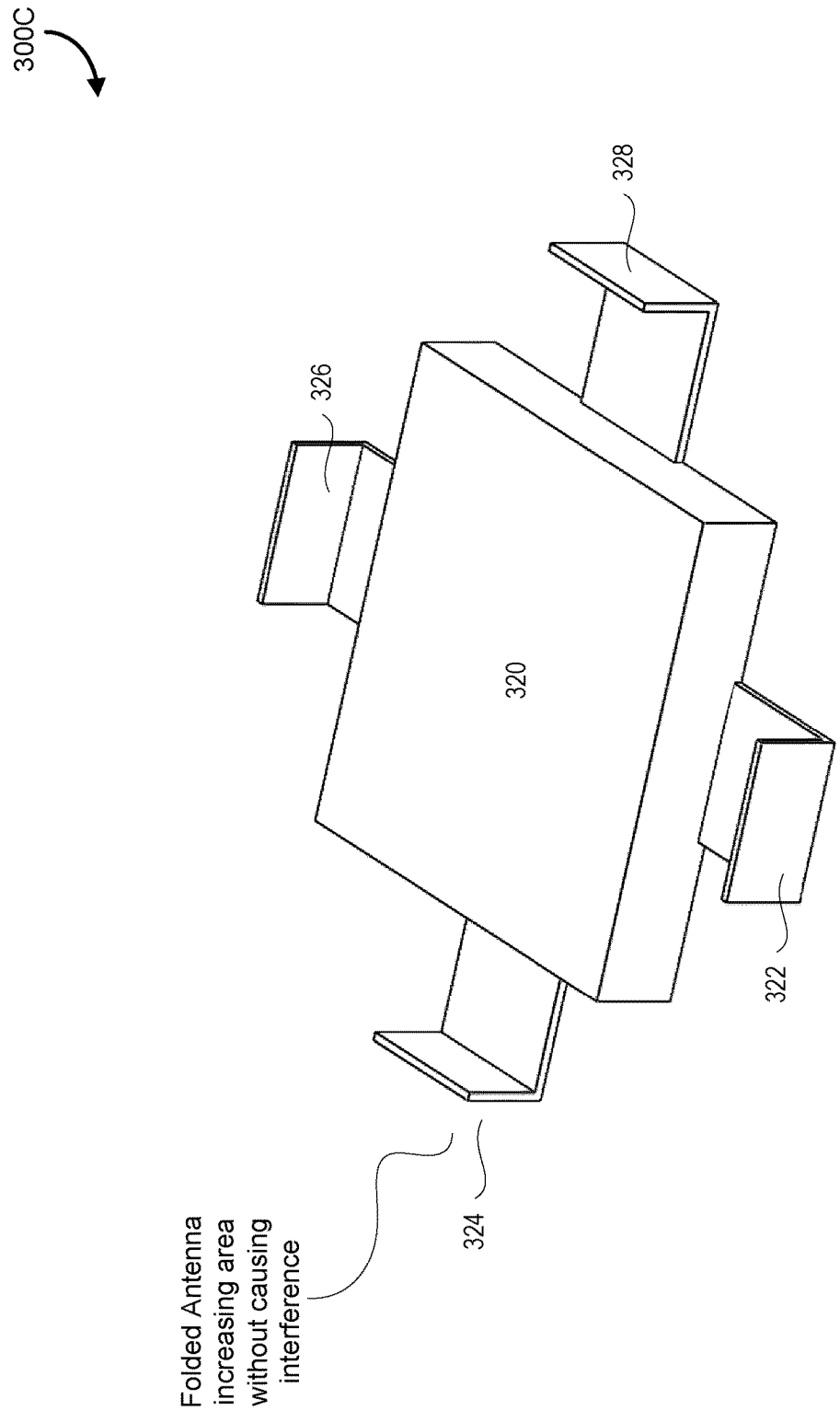
FIG. 3C is an additional 3D embodiment, according to some embodiments.

FIG. 3C shows an additional 3D rendering 300C, displaying folded antennas. Antenna 322 extends outwardly from chassis 320 and is folded towards the chassis. Antenna 322 has its line of sight to antenna 324 obstructed by chassis 320 because antennas 322 and 324 do not extend all the way to the chassis edge that antennas 322 and 324 share. Antenna 322 has its line of sight to antenna 326 obstructed by chassis 322 because chassis 320 obstructs the line of sight. Similar features apply to antenna 328 in respect of antenna 324.

Figure 3D:
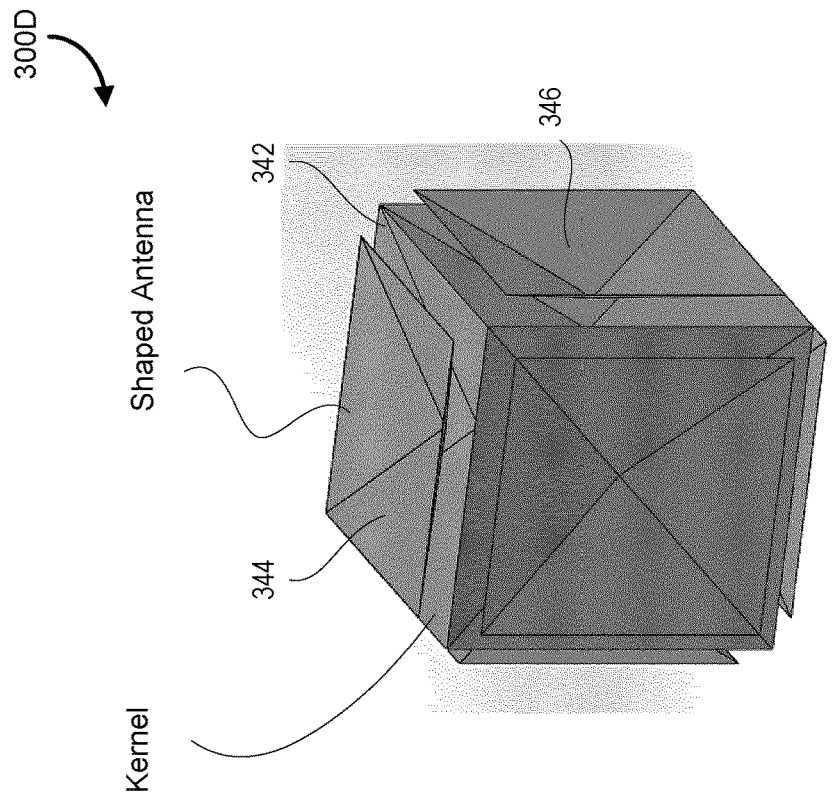
FIG. 3D is an additional 3D embodiment showing a concave kernel and corresponding antennas, according to some embodiments.
Figure 3D:
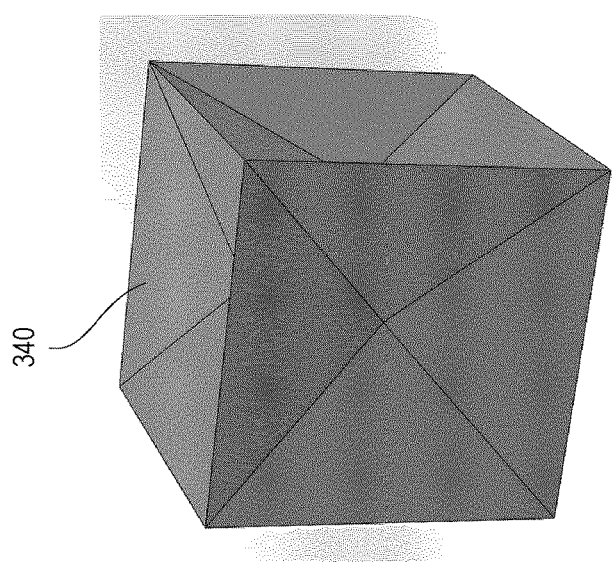

FIG. 3D shows an example 300D of an enclosure using a convex shape to provide for antennas on all sides of the device. FIG. 3D an embodiment wherein the line of sight obstructing approach implemented in FIG. 3B is applied to every side of the chassis. Chassis 340 has a shape that introduces concavity along the surfaces of the chassis.

Antenna 344 is folded with a structure parallel to the inner surface of chassis 340. Antenna 342 is positioned within the concavity of chassis 342. This embodiment increases the surface area of antenna 342 while still obstructing the line of sight between antenna 342 and its neighbouring antennas such as antenna 346. In some embodiments, chassis 340 can take the shape of more sophisticated polyhedrons. Antennas 342 and 344 can be shaped as multiply-folded planes which create signal directionality which prevents a line of sight between antennas 342 and 344. Other polyhedrons are possible, as they provide surfaces for mounting or affixing antennas. Not all surfaces necessarily have antennas. Furthermore, the polyhedrons may be regular or irregular polyhedrons, and may also include shapes such as toroids, etc., where there may be an internal cavity or internally facing surfaces. The polyhedrons of chassis 340, in some embodiments, are adapted for mounting or affixing to other objects, such as vehicles (e.g., cars, airplanes), but can also include applications such as where the chassis 340 is mounted on a pole for carrying on a backpack, etc.

Figure 3E:
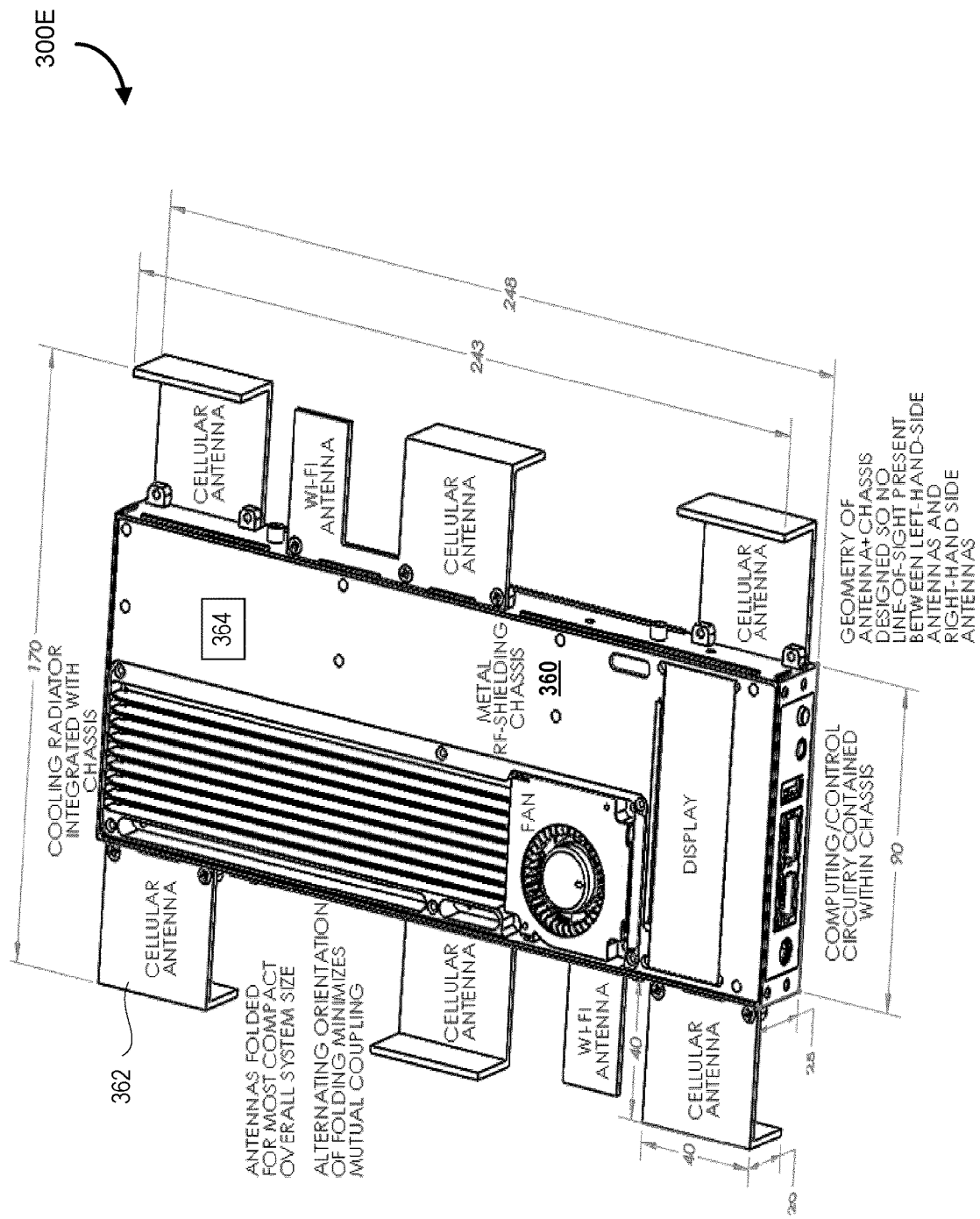
FIG. 3E is an example drawing of an embodiment device having alternating antennas that are folded in respect of a chassis height dimension according to some embodiments.

FIG. 3E is an example chassis 360, according to some embodiments, having a set of example dimensions. The example dimensions and angles shown are provided as non-limiting examples.

In this example embodiment, a number of antennas are shown extending from a central chassis, which can include onboard components, such as cooling radiators, wired connection ports, batteries, electronics, radios, among others. Antenna 362 is an example wide-band antenna coupled to the chassis 360, and in the example of FIG. 3E, there are six shown having alternating orientation to reduce coupling. The antenna 362 can be shaped such that it can match a chassis 360 height dimension to remove a line of sight that can be established between certain sets of antennas (in this example, the left and right side antennas do not have line of sight to one another).

In FIG. 3E, the example chassis is shown having a number of cellular antennas that can operate along with one or more Wi-Fi antennas. The number of antennas are shown as an example, and there can be less or more antennas.

In the specific example, three modems/radios (more could be used) for cellular and a Wi-Fi modem/radio (more Wi-Fi radios could be used too) are integrated into a hardware platform that can support remote modem box approaches, blending appliance approaches or both (under software control) use cases. In this example, two antennas are used per modem (to support MIMO)—more antennas per radio could be used—e.g., to support 4×4 MIMO, but in other embodiments, there may be more than two antennas for each modem. For example, three antennas per modems, four antennas per modems, etc. There can also be a varying number of modems (e.g., not just 3 modems, but 2 modems, 4 modems, 5 modems).

The modems may be assigned different carriers based on tracked performance. Performance may be probed, for example, by sending one or more test packets on different antennas and obtaining measurements of various communications characteristics, such as latency (e.g., propagation speed), throughput (e.g., sending packets of different sizes to test a level of contention/congestion), packet loss (e.g., measured over sending multiple test packets). Based on the positioning and orientation of various carrier towers in conjunction with different spectral environments based on where the antennas corresponding to the modem (e.g., connected to the modem) are located and which direction they are facing (which could change multipath propagation characteristics, or lead to different spectral characteristics due to signal obstructions), different modems will have different performance levels.

In an embodiment, test packets are sent using different carriers assigned on the modems such that, for example, each of the carriers can be assessed against each of the modem. In this example, the performance parameter could be a RSSI value that could then be used to rank the carrier performance for a particular modem such that when/if the modem is being used, it will be assigned a particular carrier.

For example, for a given modem, a ledger can store the values (Carrier A, −40 dB; Carrier B, −62 dB, Carrier C, −91 dB). For the stationary examples described herein, it may suffice to conduct the assessment during an initial set up only, or only periodically between large periods of time (e.g., yearly). For the mobile examples described herein, the assessment may be conducted more frequently over a period of time (e.g., t=0, Carrier A, −40 dB; Carrier B, −62 dB, Carrier C, −91 dB; t=1, Carrier A, −48 dB; Carrier B, −45 dB, Carrier C, −72 dB), and so on, and the assignment of carrier may switch over time. In some embodiments, different geometries of antenna and chassis can also be tested where dynamic adjustments of the chassis/antennas (e.g., through servomotor control) are possible, extending or retracting antennas, changing folding angles, etc.

In the blending appliance approach, the multi modem communications device utilizes onboard blending controller circuit 364 to automatically conduct blending operations as between assignment of roles, responsibilities, and/or packets to various connections established by modems of the device shown in FIG. 3E, and/or to other existing connections of a master/primary device that is driving the device of FIG. 3E. In further embodiments, the controller circuit 364 can also couple and/or connect the usage of connections of other multi modem communications devices that are being used together (e.g., 4 devices coupled to different faces of a building). In the blending approach, performance parameters can be used to establish a good starting point for network blending, by getting modems on operators on carriers that provide the best performance. After this, there will be variation in operator/carrier performance that can be addressed using smart blending technology. Different blending techniques and/or rules can be used to utilize the connections once an initial carrier selection is conducted for the modems in use (e.g., after the modems are calibrated).

In the remote modem box approach, the modems of the device of FIG. 3E are exposed as connection options (e.g., virtual connections) that can be added, for example to the set of available connection points for the master/primary device or another multi modem communications device (e.g., multi modem communications devices daisy chained together or otherwise coupled together).

The onboard blending controller circuit 364 can include a microprocessor, computer memory, and non-transitory computer readable media for data storage. The onboard blending controller circuit 364 can also be configured using logic gates or a field programmable gate array, and in some embodiments, is configured to implement connection blending logic. For example, the connection blending logic may include different logical rules for how to rank, combine, or otherwise control the flow of data packets and/or assignment of carriers to different modems, connections, or antennas, through, for example, establishing network interface assignments, among others. Other logical rules can include the use of blending logic, error control approaches, probe data packets, flow control, among others. For example, modems having specific characteristics, such as a lowest latency, can be assigned time-sensitive tasks such as error control, and other modems, such as slower modems, can be assigned bulk data transfer. Blending logic can also be used to classify and assign packets on a per flow or a flow type basis.

The onboard blending controller circuit 364 can be coupled with a network characteristic monitoring device to obtain periodically or on demand, network characteristics associated with the various modems, connections, or antennas. These characteristics, such as an RSSI, can be stored on an on-board ledger stored in memory and used for the connection blending logic. In a simplified example, the connections having the best RSSI values can be utilized for communications, etc. Other more complex approaches are possible.

The on-board ledger can be stored, for example, as a database table, an array of data values, etc. In some embodiments where multiple multi modem communications devices are used together (e.g., as separate RMBs), the blending controller circuit 364 can be configured to maintain a virtual ranked list of individual modems or RMBs, such as a mix and match of modems between the multiple similar/identical RMB's where Carrier A happens to do better in RMB 1, and Carrier B in RMB 2, or that the ranked list could also be at the RMB level (in totality, considering overall connectivity available per RMB, sending to RMB 1, is better than RMB 2, which is better than RMB 3), which may be relevant in some scenarios where the master communications device, based on its own limitations, may have to send the entire payload to a single RMB (e.g., where the master device (or nearby device which the master is directing to send content to the RMB) that can only maintain connection with one RMB at a time). There may be cases in which the master device must, through onboard blending controller circuit 364, establish an exclusive connection among the RMBs presented to it, rather than to individual modems across multiple RMBs.

Figure 3F:
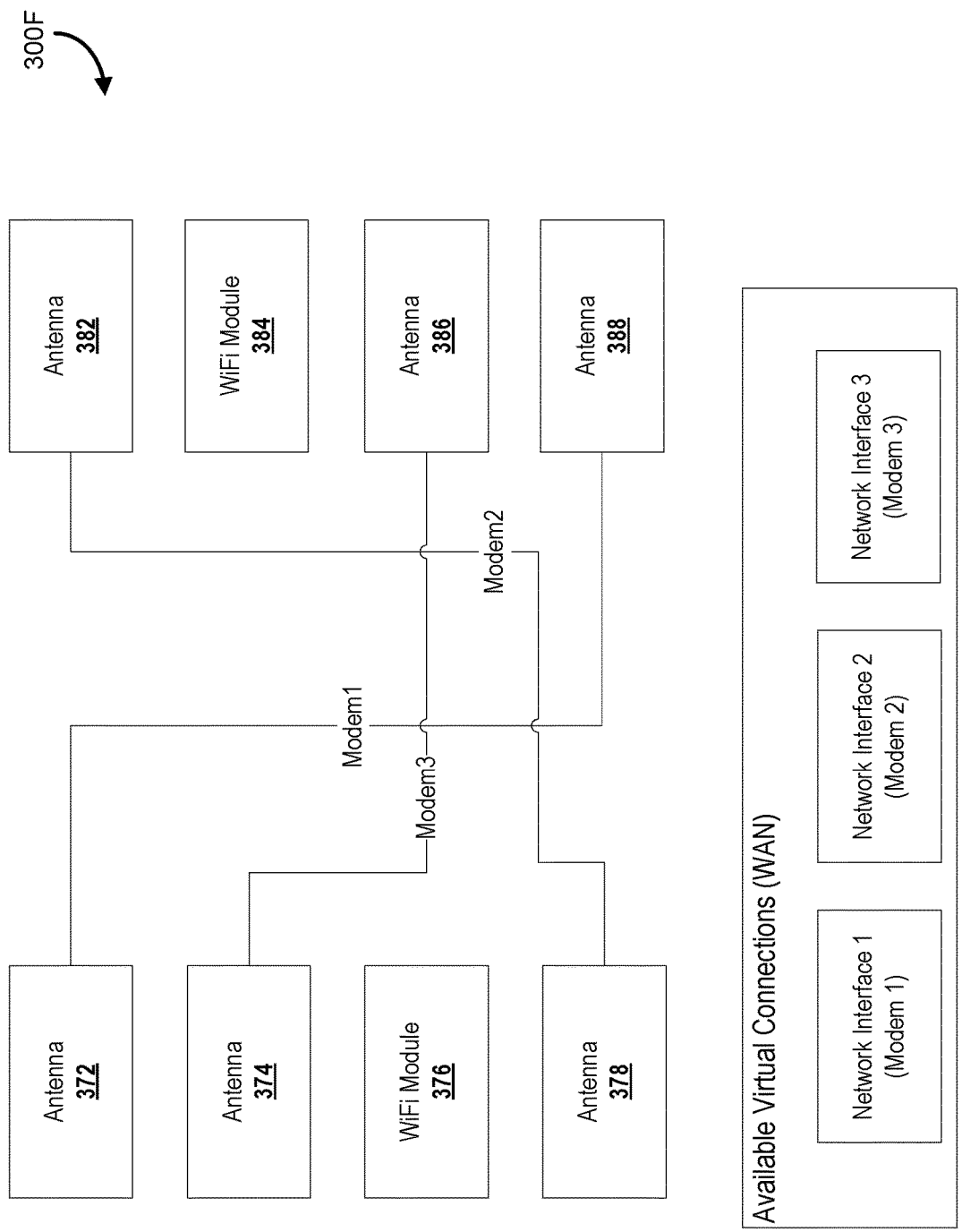
FIG. 3F is a block schematic drawing showing components of FIG. 3E, according to some embodiments.

The communications approach for each modem can be adapted to use geospatially separate M IMO antennas as much as possible. In the non-limiting mapping example shown in block schematic 300F of FIG. 3F, the two opposite corners would be connected to a first modem (e.g., establishing connects such that they are corresponding to the first modem), the other two would be a coupled to a second modem, and a third modem can be established using the two remaining antennas. In FIG. 3F, the antennas are labelled as antennas 372, 374, 378, 382, 386, and 388, and correspond to the antennas of FIG. 3E. WiFi modules 376 and 384 are shown, and provide a local area network connection. Modems can be established through using sets/pairs of antennas (but not necessarily pairs, sets are also contemplated—e.g., 3 or 4 antennas per modems is possible). In a variant embodiment, dynamic wiring or connections may be provided such that assignment of specific antennas to specific modems can be adjusted (e.g., through a user interface that controls gating through the circuits or connection paths).

Each of the modems can be coupled to a corresponding network interface (shown as network interfaces 1, 2, and 3) such that virtual WAN connections can be exposed to a device coupled to the multi modem communications device. The word "virtual" means that the device (e.g., a master device) may observe these connections simply as connections that are available to it, without regard to where the connections are actually connecting through. For example, if the master device is a video broadcast device that is residing within a underground data center in a server rack with very poor cellular connectivity, it can observe "virtual" WAN connections when coupled to the multi modem communications device(s) that it can simply utilize as if they were native connections on the master device itself. This is useful in retrofit situations where the multi modem communications devices are being connected to rectify poor signal environments and placements of the master device.

The modems/antennas can, for example, be adapted to operate on a specific set of frequency bands, such as bands from 600 MHz to 6000 MHz. In a more specific example, the modems/antennas operate using bands associated with LTE Advanced (or other types of communications approaches, such as 5G, or later 3GPP standards) that can cover different jurisdictions or geospatial locales. The modems/antennas can operate on different bands, or combinations/permutations of bands. In some embodiments, the modems/antennas are adapted to swap between different bands and operate in different modes depending on the specific requirements of a particular locale. Other frequencies are possible as well, including special defence cellular bands, proprietary radio bands, satellite bands, millimeter wave spectrums, among others.

In another embodiment, different pairs of antennas are utilized in the device of FIG. 3E that have subtle differences in transmission characteristics. In another embodiment, the pairs of antennas are matched.

The device of FIG. 3E can further include additional features such as covers, overlays, membrane buttons (e.g., up down, enter), user interfaces, etc., that can be used to modify the configuration of the device of FIG. 3E. The device of FIG. 3E can operate in different operating modes, such as in a first operating mode—the "blending mode", and a second mode, the "remote modem box mode".

Figure 3G:
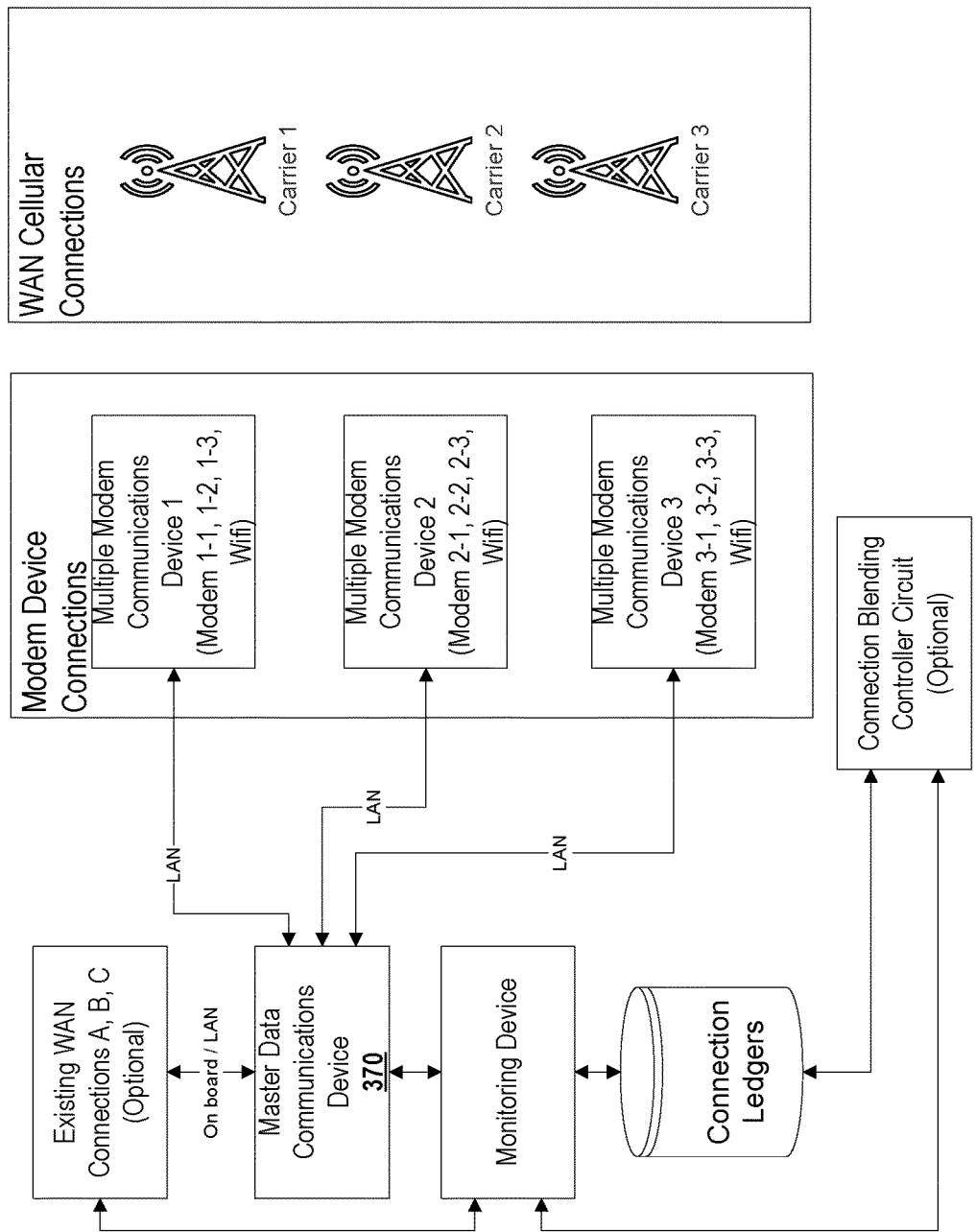
FIG. 3G is a block schematic drawing showing the device of FIG. 3E coupled in the context of a system for data communications, according to some embodiments.

As shown in FIG. 3G, the device of FIG. 3E can connect to a master/primary device to augment the communications capabilities of the master device through, for example, the Wi-Fi antennas, or a wired connection, such as an Ethernet connection, etc.

The device of FIG. 3G, over a local network connection, effectively provides virtual copies of its modems (and possibly other network devices such as Wi-fi or Ethernet) to the other device (e.g., in a remote modem box mode) and to another device, and the blending occurs on this other device.

In the blending mode, the blending occurs using the multi modem device where the "real" local (not virtualized) modems' wireless data connections are blended, possibly also with available Wi-fi connections or other connections present on one of the Ethernet ports (e.g., satellite). To provide blending capabilities, a controller (e.g., on the multi modem device of FIG. 3E or on the master device) circuit (or system on a chip) can be used to intelligently combine the virtual modems with other connections (e.g., existing connections on the master device or virtual connections from other multi modem communications devices).

Combination modes are also possible and contemplated in an variant embodiment. The device is configured to perform the blending may blend its local real modems with virtualized copies from another multi modem communications device in RMB mode. The device could also blend the aggregated connection from a second device 370 which is in blending mode. Mixes of these two modes are thus possible—e.g., it might also be possible for one device 370 to present two virtual modems to an external device for external blending, while simultaneously blending an upstream Ethernet device (e.g. satellite) with its third modem, and providing the blended connection and the two virtual modems over the same downstream Ethernet connection. In other words, when describing 'blending mode', the can be denoted as modems not specifically virtual, and modes are contemplated that that are a combination of both RMB and blended approaches.

The device of FIG. 3E, in the modem approach providing the remote modem box mode, can simply replace the modem connections of the other device such that the other device utilizes the virtual connections as if the virtual connections were the native connections of the other device.

Both of these approaches are useful as they can satisfy a technical need that arises in present situations where primary devices are being installed in locations without good cell connectivity—such as a server room—and IT professionals installing equipment connecting from a connectivity perspective, may not appreciate the radio requirements for certain types of communications pathways. IT professionals sometimes may even put device systems inside of a rack box, which could act as a Faraday cage, yielding poor signal connections for a particular component. Accordingly, the device of FIG. 3E, or multiple devices similar to those of FIG. 3E, can be used to augment existing equipment or retrofit, through installation on a window, on different faces of a building (e.g., one each on a North face, a South face, an East face, and a West face), on different sections of a vehicle (e.g., one on the front and one on the back, or dispersed across different train segments), among others.

Specifically, in the remote modem box use case, the master/primary device 370 then simply operates as usual but with individual connections extended from the device of FIG. 3E—the multi modem communication device can be considered a "dongle" that provides modems and antennas to another (possibly physically remote) system. The dongle would include the antenna sets configured to reduce line-of-sight in respect of one another.

Multiple connections are shown in FIG. 3G, where there may be three multiple modem connections devices operating alongside one another. The virtual connections provide additional WAN connections, and these connections can be blended, in further embodiments. In a further variation, the devices of FIG. 3E can be utilized or connected with vehicles or public transportation, to provide improved connectivity for devices requiring a high level of connectivity or bandwidth, such as on-demand infotainment systems where individuals seek to dynamically connect and watch content without having a requirement of having a central server having media pre-downloaded, etc. as required in many traditional infotainment systems (e.g., airplane systems).

The device of FIG. 3E provides a small, portable, lightweight device while meeting the wireless performance targets (TRP, TIS, adjacent antenna mutual coupling) required for good performance (and also by regulatory authorities). Techniques outlined in various embodiments herein are adapted to minimize mutual coupling and loading while also locating the antennas to provide the best MIMO performance (that is, minimize the signal correlation between antennas attached to the same radio). Coupling is minimized by locating the antennas around a metal "kernel", which blocks RF, to eliminate or minimize RF line-of-sight between antennas as per design targets The antennas are spaced as closely as possible while meeting the wireless performance targets. Mutual coupling is further minimized by locating mirror image folded antennas adjacent to each other.

The antennas are folded to reduce the planar dimension(s) and keep the overall device as small as possible. There are any number of options, even straight an option, and in some embodiments, folding is employed to keep the device form factor compact.

Pairs of MIMO antennas used by a single modem are selected to have the largest physical separation in order to further reduce signal correlation caused by mutual coupling. Antennas at opposite corners of the device are paired, for example. Example antenna dimensions are shown in FIG. 3E.

Antenna folding enables a larger (longer) antenna that provides improved performance at low frequencies without exceeding desired product dimensions. Additionally, the center core is used as a counterpoise—functionally the "ground" of the antenna system. Antenna radiating elements must be separated from their corresponding ground to operate efficiently (in other words, antennas laying flat and in contact with the chassis do not work efficiently or at all). For this reason the folds are some distance from the core—in the embodiment in FIG. 3E approximately the last ⅓ of the antenna is folded into the vertical dimension.

Folding a portion of the antennas into the vertical dimension the vertical dimension of the "kernel" to be expanded, which advantageously provides space for the integration of the modems (radios), a multicore processor (CPU), memory (SRAM and non-volatile storage) and a number of key subsystem components (power supply and management, communications interfaces—USB and Ethernet) as well as an internal rechargeable battery and Power over-Ethernet module.

A user interface (OLED display and membrane push buttons) can be integrated into the top "lid". User connections are provided on one of the ends (Ethernet, USB) as well as a power switch and audio I/O. The other end provides access to SIMs needed by the cellular modems/radios. The "kernel" can be advantageously made from metal or another similar material that provides RF shielding and that offers good thermal conductivity. This enables the "kernel" to act as a heatsink for the modems and compute subsystem.

FIG. 3E shows heatsink fins designed to improve thermal dissipation and a fan, that is used in combination with the heatsink to provide active cooling which provides further-improved thermal dissipation.

The embodiment shown in FIG. 3E was arrived at by considering various product and system requirements outlined above; the antenna size and arrangement within the system was established alongside the overall device form factor given the requirements for portability, minimum chassis height required to house circuitry, cooling, and internal battery; there was a desire to cover the antennas with a minimum number of plastic covers; one face of the polygonal chassis is required for I/Os, another for the user interface, another for cooling vents, and another for servicing of the unit.

It should be noted that the antennas can be folded at different angles (not just the 90 degrees) shown. This may be advantageous if a larger antenna is needed (for improved low frequency performance) but the vertical height of the device needs to be maintained.

Antennas can also be located in other locations (e.g., on the ends, on the top (lid) or bottom) providing cross-coupling, loading and MIMO correlation design goals are met, and the user I/O and user interface are suitably redesigned.

As shown in FIG. 3G, there may be multiple, multiple modem communications devices interoperating together, and there are variations on how the devices could interoperate, as described in further example embodiments.

In a first embodiment embodiments, each of the modems of each of the multiple modem communications devices can be assessed for assignment of individual carriers to each modem (e.g., carrier A is best for modem 1-1, carrier B is best for modem 1-2). In a second embodiment, instead of assigning individual carriers to individual modems, instead carriers are assigned by individual multiple modem communication device (e.g., carrier A is best for device 1 and all of modems 1-1, 1-2, 1-3, carrier B is best for device 2 and all of modems 2-1, 2-2, 2-3), and so forth.

The devices can be connected together (e.g., in a daisy chain) or through a central master data communications device 370 (e.g., in a hub and spoke model) such that the devices can connect together to provide connections, providing a number of potential network connections that can be used individually or together. Network blending can be performed, for example by any of the devices individually, cooperatively by multiple devices (e.g., in a co-blending case or a tiered blending case where one of the devices is responsible for blending groups of connections), etc.

When the multi modem communications devices operate together, there are different approaches for combining the connections, and this may depend on the limitations of the master communications device seeking to use the multi modem communications devices. For example, in certain situations, the master communications device might be limited to only one connection to one multi modem communications device, even if a plurality are connected. In that situation, a ranked list of multi modem communications devices can be used to determine which is the best for connection (e.g., ranking all of them by their maximum signal strength given an interrogation of all possible carriers).

The multi modem communications device of FIG. 3E, whether operating alone or within a group of multiple such devices, may also be switched, in an example embodiment, between the mode where network aggregation or blending is occurring on the device itself (where one or more aggregated or blended network connections provide highly reliable internet connectivity to nearby computers or devices via Ethernet or Wi-Fi) to the mode where the device presents its individual multiple peripheral wireless connections (for example, via USB/IP protocol) within a connected Blending-Capable Client, where the network aggregation and management functions are performed within the Blending-Capable Client. This switching can be conducted, for example, through the setting of an actual pin in a physical general purpose input/output pin selector, or setting a data value in stored memory (e.g., isBlending=TRUE/FALSE).

In this example embodiment, being capable of switching is useful in that the device can be used more flexibly for different use cases. This switch may occur under automatic or user control for various of reasons, e.g., by user or administrator request, or by the network operator, because the Blending-Capable Client is in a low-power state, because of any change in operating conditions of the overall system or for any other reason. For example, the multi modem communications device may be operating to provide highly reliable internet connectivity to a Blending-Capable Client such as a portable video broadcast transmitter. Under some circumstances, the multi modem communications device itself may have adequate blending capacity and compute to handle the connectivity and/or computation needs of the video broadcast transmitter (for example, low-resolution video monitoring or remote control, or any other type of connectivity required).

Under other circumstances, for example if high-resolution video transmission is engaged via remote control, the multi modem communications device from FIG. 3E could switch to a "Remote Modem Box" mode where it presents its individual multiple peripheral wireless connections to the transmitter device, and the aggregation/blending functionality moves to the Blending-Capable Client (video transmitter device), for example because the high-resolution video transmission relies on a data compression algorithm that monitors and manages the individual network connections as part of the compression process.

After the video transmission is complete, the transmitter may go back into a lower-power mode and have the multi modem communications device resume network aggregation/blending internally to continue the remote control and monitoring functionality. This approach may assist in reducing power consumption, which is especially useful if the multi modem communications device is operating as a portable device on battery power, or power resources are limited (e.g., operating in a region without a stable electricity supply).

There are cases where it is advantageous for the multi modem communications device of FIG. 3E to automatically select the best remote communication endpoints (i.e. cellular base stations) prior to or during operation, in order to provide the best-performing aggregated/blended internet connection or best-performing individual peripheral connections to a Blending-Capable Client.

This is made possible by the fact that each multi modem communications device may, in a specific multi-SIM embodiment, be fitted with more SIM cards (each enabling a connection to a specific cellular network) than cellular connections it supports (e.g. 6 SIM cards fitted in a device with 3 modems, with the SIM card used by each modem selectable under software control), or that multiple multi modem communications devices may be able to share SIM card information between connected units, or that the devices may support eSIMs which are not tied to a specific network and may be reconfigured remotely under software control (allowing greatest flexibility). In other words, the multi modem communications device may have the flexibility to connect as follows:

1. Select the SIM and modem combination and connect with the best-performing endpoints (cellular networks) for which it has a SIM card fitted.

2. If multiple multi modem communications device are networked and working in concert, for each to select the SIM and modem combination and connect with the best-performing endpoints (cellular networks) for which any of the networked devices has a SIM card.

3. If using eSIMs, to select the best eSIM profile, load it, and connect to any cellular network for which an eSIM profile can be loaded via software control.

The process for selecting which remote endpoint a given modem connects to may be based on maximizing one or more desired performance parameter(s) of interest, either individually for that modem, or for the whole system of one or more connected multi modem communications devices (whether operating in blending mode or in Remote Modem Box mode in concert with a Blending-Capable Client).

Possible performance parameters of interest to be maximized may include Received Signal Strength Indicator (RSSI—a measure of wireless signal strength reported by the modem), RCSP (received signal code power) or any other network quality metric reported by the modem, or any other network parameter that can be measured which may be desirable to the client to optimize, for example highest throughput, lowest latency, most predictable latency, highest reliability, highest uptime, lowest packet loss, lowest cost or any other desirable network characteristics or combination thereof.

When one or more multi modem communications devices are mounted on/in a building, some parameters of interest may be relatively constant over time, for example RSSI may be a function only of the location and orientation of the multi modem communications device and its distance from the remote endpoint (a cellular base station in a fixed location). In this case, it may be acceptable for modems to measure parameters of interest and select remote endpoints infrequently, for example once a week. These relatively constant performance parameters may additionally be measured as part of a site assessment during the installation procedure for the multi modem communications device, for example to help choose the best-performing installation for the device.

The performance parameters may also be recorded as a "baseline" to be used as a reference for re-evaluating system performance over time. For other parameters such as highest throughput, lowest latency, etc. these may be much more variable requiring near-continuous measurement and network selection by the modem to optimize.

An RSSI range can be measured in –dBs (or dBm), and Applicant notes that as a non-limiting example, a RSSI ranging between –40 and –50 dB could be defined as very good, and –90 to –100 dB can defined as not very good.

Figure 9A:
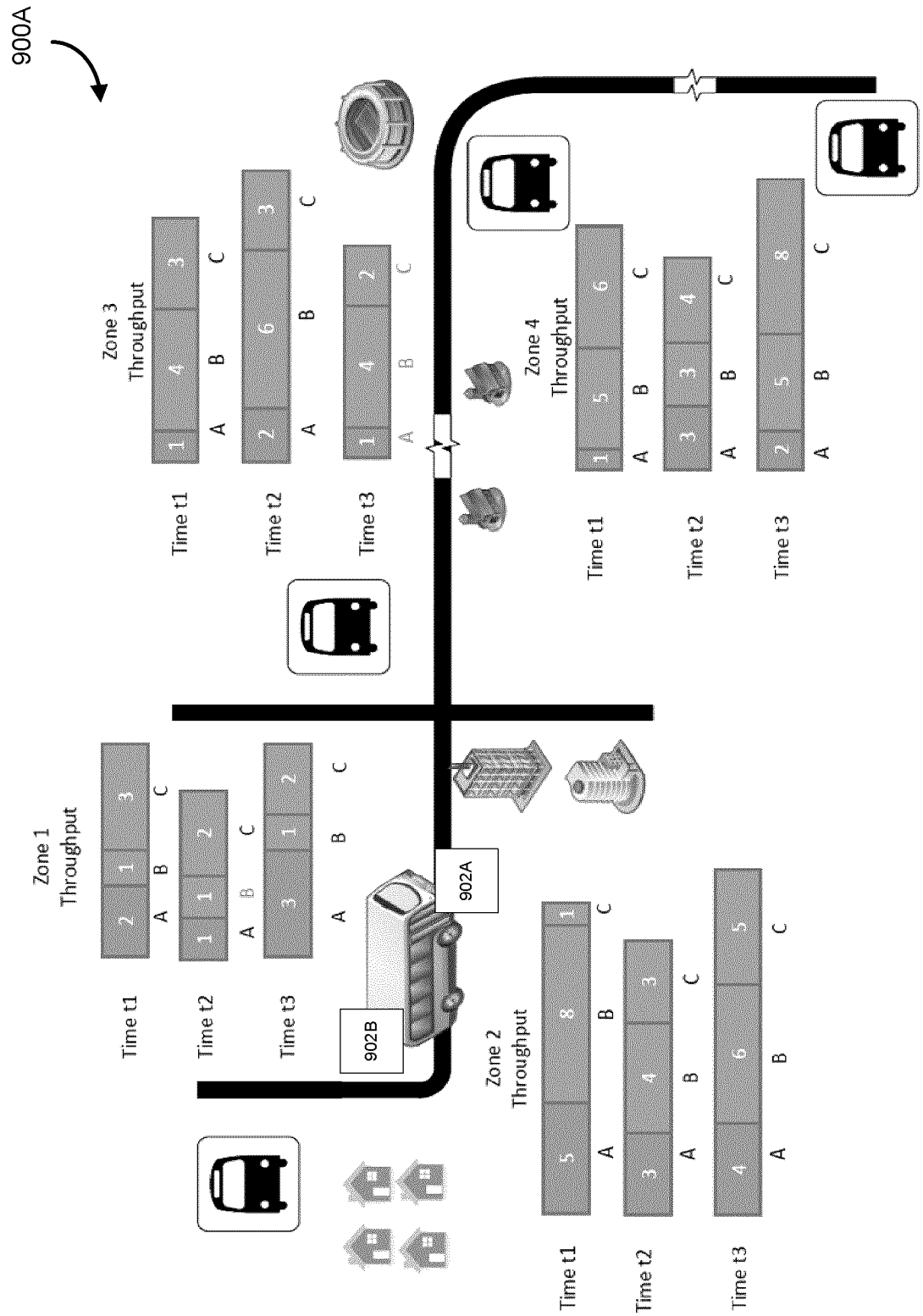
FIG. 9A is an illustration showing an example of multi modem communications devices operating on a vehicle, according to some embodiments.

When multi modem communications devices are mounted on/in a vehicle, there may be no performance parameters of interest that are stable over time due to the fact that the vehicle may be in motion and the positions, orientations, and distances of the multi modem communications device and the base stations may vary constantly (as shown in the example at FIG. 9A. In this case, the best remote endpoint (cellular base station) may need to be selected and re-assigned nearly constantly (in real time, or on a highly frequent basis, such as per minute or per 15 minutes).

The degree of variability in the performance parameter of interest to be optimized, and the loss in connectivity due to the overhead in switching a modem from one remote endpoint to another must be weighed against the potential gains from the optimization; in practice, better performance may arise from using a relatively stable and more general parameter (such as RSSI reported by the modem) and less-frequent selection of remote endpoints. Other values can be tracked such as throughput, in a variant example.

The process for selecting remote endpoints based on maximizing a performance parameter of interest in a system of multi modem communications devices could be conducted as follows:

1. The system has Modem #1 in the first device from the multi modem communications device use the first available SIM card or eSIM profile corresponding to an available remote endpoint (cellular base station) to connect to said remote endpoint.

2. When the connection is established and stabilized, the system measures the performance parameter of interest (e.g., RSSI) and records it in a ledger data structure.

3. The system releases the connection and has Modem #1 use the next available SIM card or eSIM profile corresponding to an available remote endpoint (cellular best) to connect to the next available remote endpoint.

4. When the connection is established and stabilized, the system measures the performance parameter of interest (e.g., RSSI) and records it in a ledger data structure.

This process is repeated until all available remote endpoints which are supported by available SIM cards or eSIMs have been connected to each modem and the performance parameter of interest measured and recorded. Performance parameters can vary greatly per carrier as carrier infrastructure and spectral connectivity environments vary from place to place (e.g., buildings in the way, the location of carrier infrastructure, the strength of carrier infrastructure, congestion/contention in the available channels).

Optionally, the system may have Modem #1 re-establish and "claim" the connection with the endpoint with the best performance parameter of interest, narrowing the search space for subsequent modems, or it may wait until the ledger is filled either for a given multi modem communications device before assigning the remote endpoints to modems across a single device such that the overall sum of measurements of the performance parameter of interest is maximized for the entire device, or it may wait until the ledger is filled for all connected multi modem communications devices before assigning the best-scoring remote endpoints to all modems across all connected multi modem communications devices such that the overall sum of measurements of the performance parameter of interest is maximized for the entire system of connected devices.

If there are already radios in an original master/primary device, the primary/master device can be configured to pick which ones are best as the original radios might still be working, and can be used. Accordingly, multi modem communications devices as described herein can be utilized as retrofits to the master/primary device to provide additional communications capabilities. For example, the retrofit can be utilized to provide additional communications capability by increasing an available pipe size provided through a bonded or aggregated set of network connections (e.g., allowing for communications through hundreds of megabits), or providing for backup or failover connections.

The selection approach described above may be extended to minimize impact of the selection process on the normal function of the multi modem communications device, for example by measuring the performance parameter of interest alongside normal function on a single modem, or by taking only one modem offline at a time to measure performance parameters of interest and reassign remote endpoints in a "round-robin" fashion, or to use recent measurements of the performance parameter of interest from other modems within the same system and assuming equivalency rather than taking the time to re-measure.

Figure 4A:
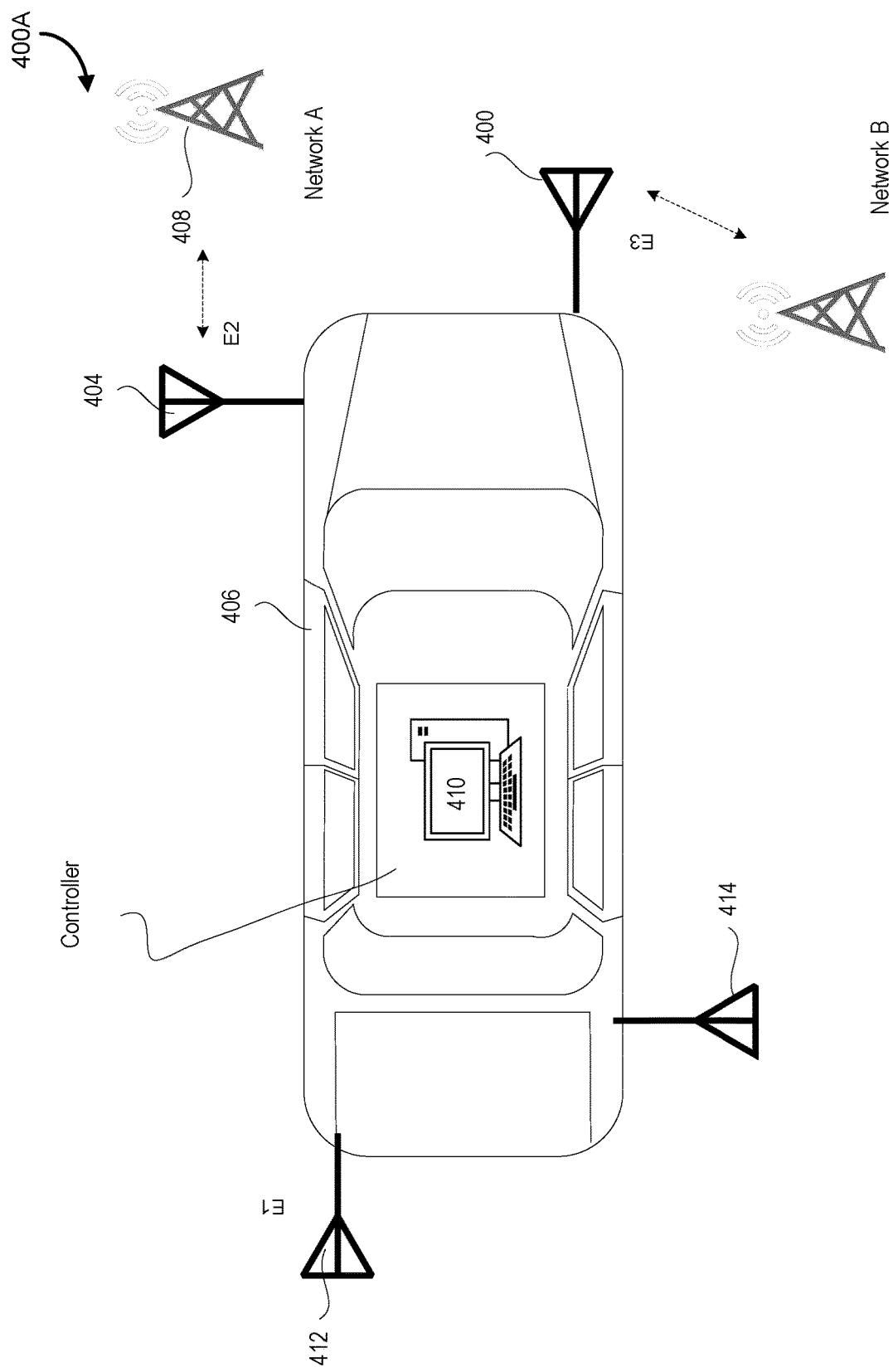
FIG. 4A is an example drawing of a vehicle having multiple antennas, and using the vehicle as the chassis, according to some embodiments.

FIG. 4A is a diagram 400A showing an embodiment with a vehicle, with antennas placed in different areas of the vehicle, taking advantage of the inherent shape of the object to which they are attached, controlled by a central controller which determines which antenna are to be used for which purposes. In this instance, the controller determines that it will transmit to Network A via antenna E2, and to Network B via antenna E3. This selection of antenna might change due to a irregular chassis design.

Referring to FIG. 4A, chassis 406 takes the form of a vehicle, but it can take other forms in other embodiments (e.g., it could be a building). Antennas 400, 404, 412, and 414 have been affixed to chassis 406 in locations which do not have line of sights to each other. Controller 410 dictates which of antenna 400, 404, 412, and 414 will transmit signals to which of network 408 and 402 based on some consideration.

In other embodiments, it is possible that the assignments may change over time as the device moves, or networks change. For example, this approach may be similar to the selection of modems/networks that are used in the base case for network bonding, but focused in relation to the antenna choices, which may be conducted in conjunction with network path selections.

The antenna E1 . . . EN may be shaped optimally for their application (e.g., if applied to a vehicle), or may be off the shelf antennas which are placed in a variety of places on the vehicle (or on the exterior of a building) to allow for optimal transmit and receive performance.

A controller may infer the shape of vehicle/chassis relative to the antennas by observing transmission behaviour. By way of machine learning, among other approaches, the controller may also suggest different placement of one or more antennas to improve transmission characteristics, either to a pre-defined optimal state, or to an optimal state as determined over time by actual usage of the vehicle in real-world situations. In one example, such as an armored military tank vehicle, the controller unit may need to fit in a set place due to space or protection concerns. Multiple controller units might be required for reasons of redundancy.

Figure 4B:
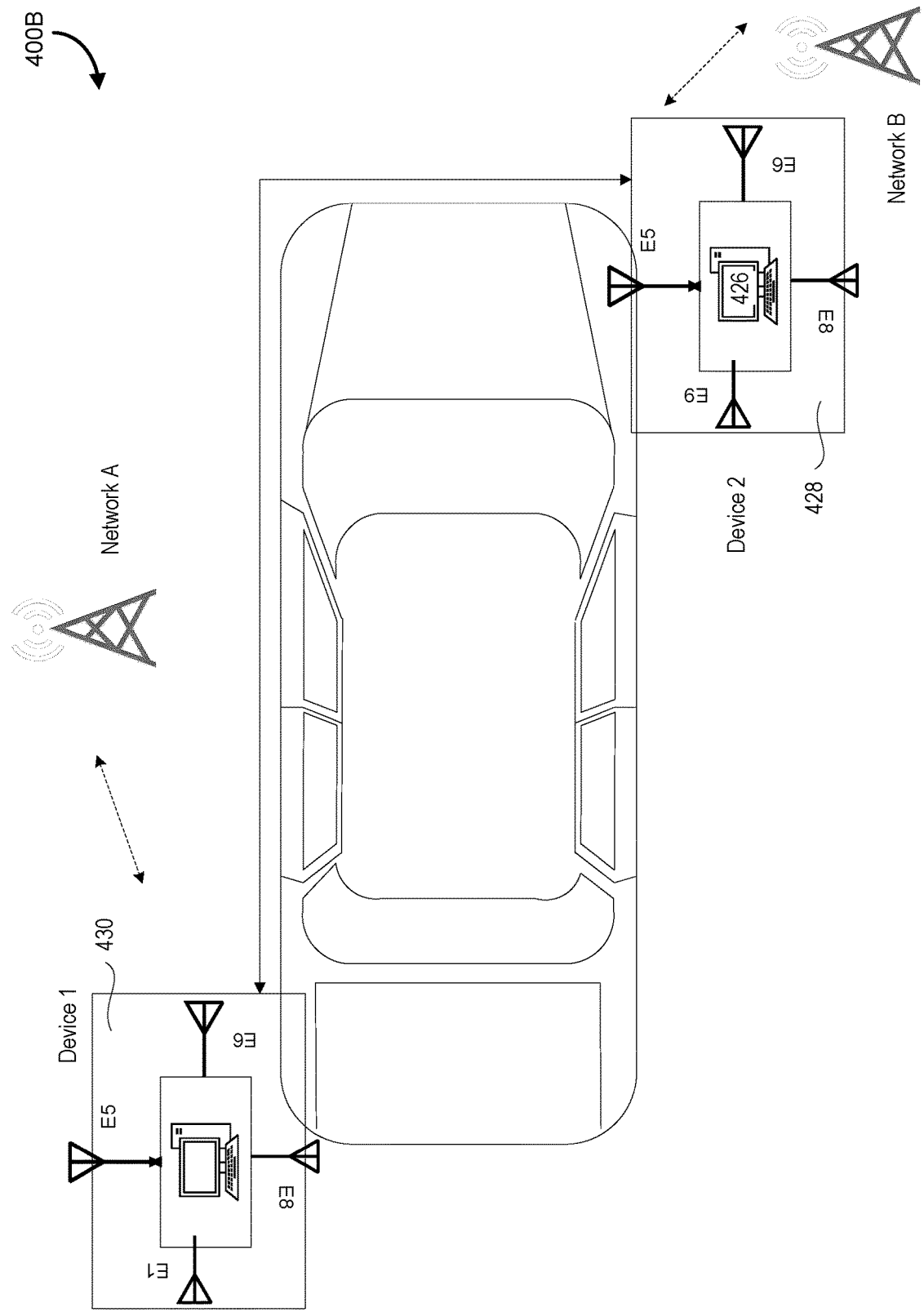
FIG. 4B is an example drawing of multiple units (chassis/compute and antennas in each unit), all communicating with one another, and using a local communication method (wireless or wired) to transmit using more than one unit, according to some embodiments.

FIG. 4B is a diagram 400B that provides an example of a vehicle with multiple devices 428 and 430 (wherein each contain both a controller along with transmission equipment (e.g. modems and antennas)). The system may use near field communications or other means (e.g., a wired connection) to transmit between the two or more devices, in order to perform the ultimate far-field communication with Network A or Network B and optimize transmit and receive performance.

Referring to FIG. 4B, the antennas are mounted on chassis which themselves are mounted on a vehicle. Each of Device 1 and 2 can be separate chassis 428 and 430. For instance, Device 2 may have a transmission that Device 2 wishes to send to Network A. Device 2 may have a computing system that is aware of Device 1 including the antenna placement and antenna configuration. To improve transmission and/or reception characteristics relative to sending the payload itself, instead, Device 2 may send a payload to Device 1 to transmit to Network A, while Device 2 sends another set of data to Network B using Device 2's modems and antennas. In an alternative embodiment, Device 1 and Device 2 may be connected to a centralized controller (similar to 410 in FIG. 4A). This centralized controller (located in the vehicle or building) manages Device 1 and Device 2 to improve transmission and reception.

Figure 5:
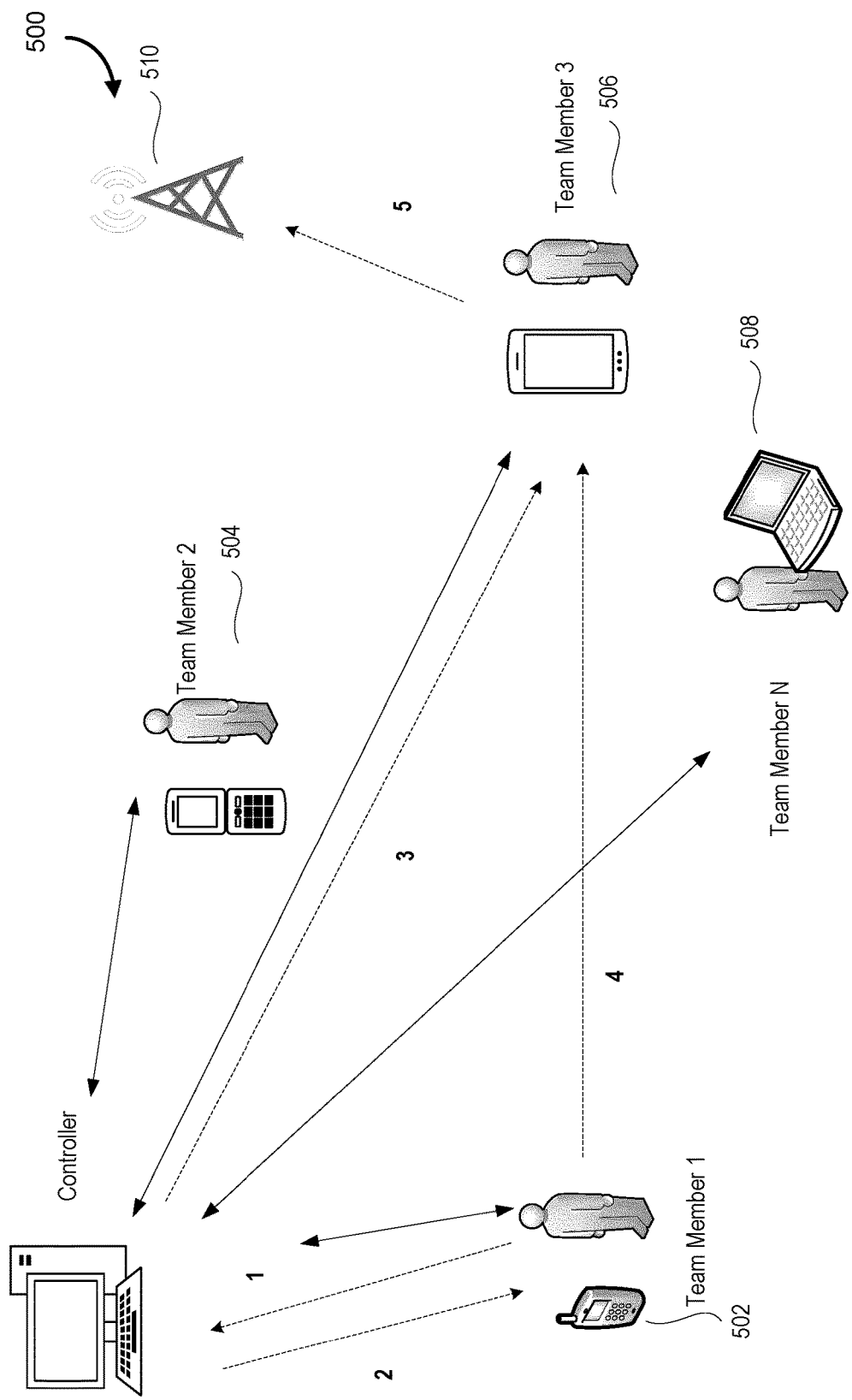
FIG. 5 is an example drawing showing multiple devices which may vary in distance from one another, with positioning possibly changing over time, which communicate with a central controller to determine the best path to a far field transmitter, according to some embodiments.

Two embodiments are possible in this example, a first "remote modem box" example whereby—Device 1 and Device 2 are boxes containing antennas and modems—and all blending/logic are in the centralized controller (this could use USB-over-IP or TCP/IP for communications between the centralized controller and the Devices); and a distributed blending example, whereby the centralized controller and Devices 1 and 2 implement the blending operation using a distributed approach FIG. 5 is a diagram 500 showing N soldiers/officers with units attached whose positions relative to each other may be constantly changing, leading to constant recalculation of the best combination of modems/antennas for optimized transmit and receive performance.

This example is provided to show a disaggregated/distributed version of the system, and does not necessarily need to be specific soldiers/officers.

This scenario does not necessarily require each unit to have multiple antennas in the unit, there may be multiple phones connected to a central hub (or master unit) and controller picks best antenna to optimize transmit and receive performance (e.g., soldier on the hill).

Referring to FIG. 5, the controller needs to transmit a signal to network 510. In one embodiment, devices 502, 504, 506, and 508 each transmit signals to network 510 and controller 500 receives information relevant to each device's communication performance. Controller 500 can determine the best of devices, selecting from 502, 504, 506, and 508 or some combination of these devices to transmit a signal to network 510 based on some consideration. In other embodiments, controller 500 will also send instructions to devices 502, 504, 506, and 508 to spatially rearrange the devices.

In this example, team member 1 inquires of the controller 500 what is a path for optimal (e.g., for throughput, reliability, or a combination thereof) transmit and receive performance to Network A (1).

The controller 500 responds (2) indicating that team member 3's device 506 is best suited (due to positioning of the antennas).

The Controller may send a control messages (3) to team member 3's device 506 alerting it that to allow/expect a communication from team member 1 to pass through (this may not be required as there may already exist a trust relationship between the two devices).

Team Member 1 then sends its data payload (4), to Team Member 3, which then sends the transmission to the network (5).

The system may also receive network transmissions through a similar path.

In some embodiments, once an initial connection is made, team member 1 would work directly through team member 3's device 506's antennas, until a timer runs out, and a performance trigger is met, after which it would re-check with the controller for the best available option. In some embodiments, there may be layered protocols, for example, where Team Member 3's device 506 might route the transmission on a lower level, with no application layer needing to interpret or otherwise process the data being passed along.

Note, the controller 500 may exist either locally, or on the device itself, or may be in the cloud (although having the controller too far away could introduce latency which will degrade performance). Multiple controllers may exist, and they may have their own hierarchy of rules to determine which controller is dominant. In some embodiments, the controllers are configured to differentiate between "best path" where all devices fully interoperate, and "best path given awareness of other devices" (which antennas to select on a given device, given co-location of other devices/antenna).

In another variation, the chassis and the antennas may be miniaturized, for example, as provided on a mobile device. Such a mobile device, for example, may have multiple antennas, such as multiple wideband antennas. The antennas may be coupled to different SIM cards (on different cellular networks) and communicate simultaneously, and it may be advantageous to utilize a chassis and/or antennas as described in various embodiments to aid in reducing various issues related to line of sight between the antennas. Where there are more than two antennas, as noted above, different subsets of antennas can be established based on line of sight to communication endpoint (differentiated from choosing antennas that 'see' their far endpoint vs. the line-of-sight defined as deleterious when placing antennas on a chassis above) and utilized, for example, as separate bonded connections, or for different types of data transmission or error control functionality. Antennas and chassis configuration may be automatically adapted, for example, through actuators operating to automatically fold (e.g., at various folding joints) or change a height of an antenna, among others on the mobile device.

Figure 6:
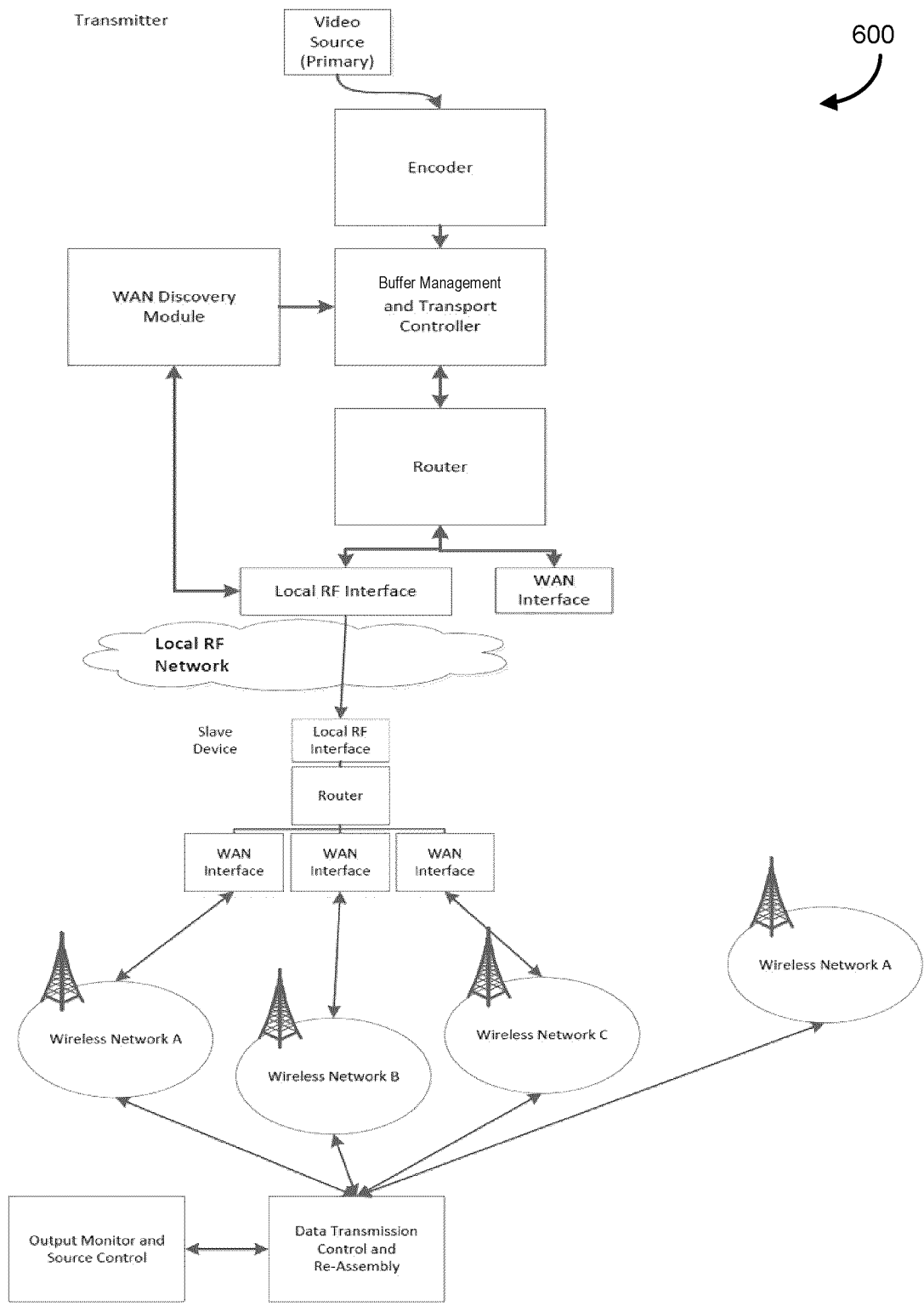
FIG. 6 is an example block schematic of a device having multiple WAN interfaces that are adapted to connect to multiple wireless networks, according to some embodiments. The device is a multiple-antenna chassis and/or associated controller devices adapted for controlling one or more antennas connected to the WAN interfaces for communicating data across the various wireless networks.

FIG. 6 is an example block schematic 600 of a device having multiple WAN interfaces that are adapted to connect to multiple wireless networks. As described herein the device can include a device as provided here in a multiple-antenna chassis and/or associated controller devices adapted for controlling one or more antennas connected to the WAN interfaces for communicating data across the various wireless networks.

Figure 7A:
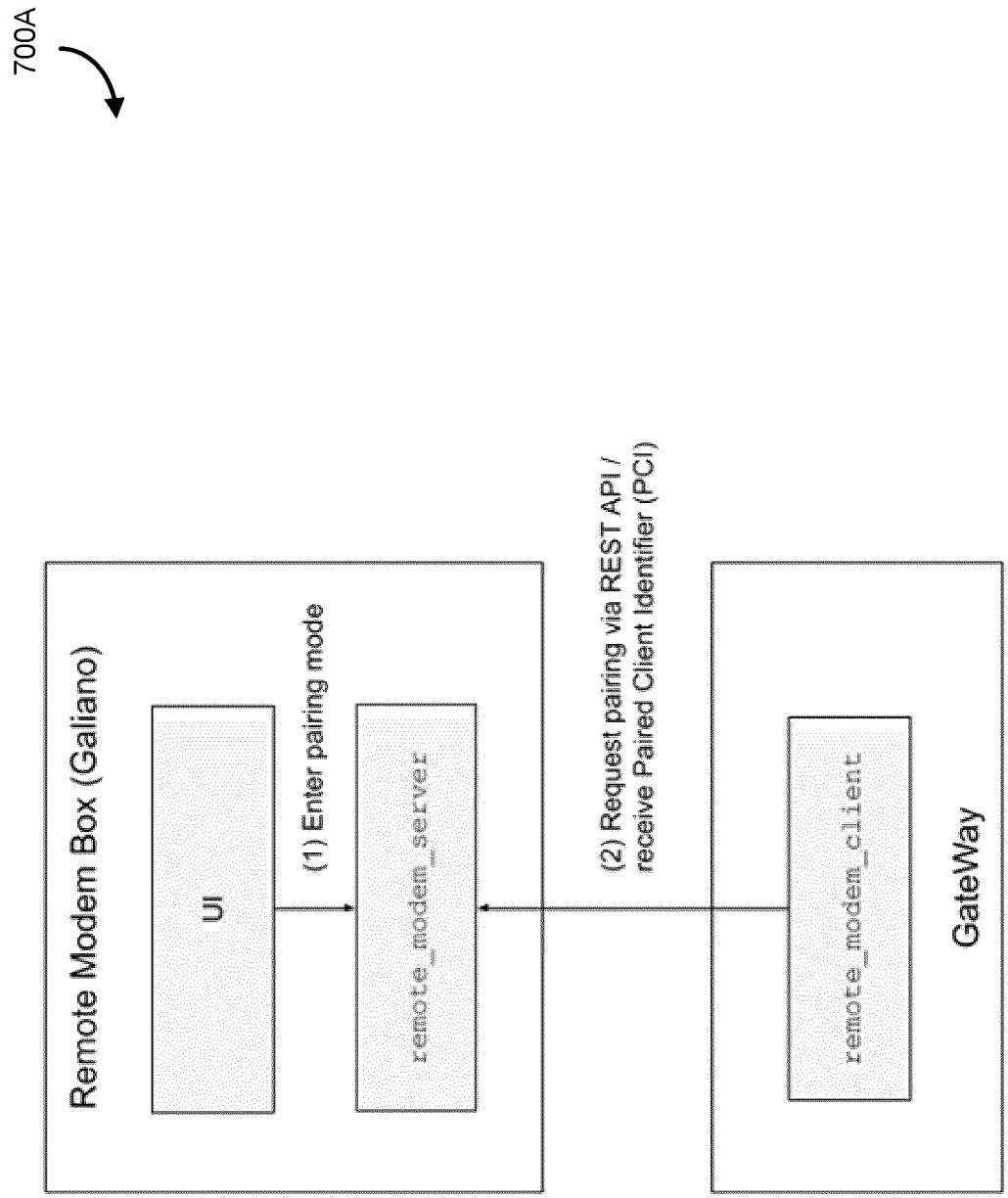
FIG. 7A is an example illustration showing an approach for pairing the multi modem communications device in a remote modem box (RMBs mode, according to some embodiments).

FIG. 7A is an example illustration 700A showing an approach for pairing the multi modem communications device in a remote modem box (RMBs mode), according to some embodiments.

In the remote modem box mode, the device from FIG. 3E can be portable, powered by internal battery or other means, providing a plurality of radios (each with a plurality of antennas), where the individual radios and antennas are made to appear as multiple peripheral (wireless) connections (for example via USB/IP protocol) within a connected (usually wired, via Power over Ethernet) Blending-Capable Client, where the network aggregation and management functions are performed within the Blending-Capable Client, to attain one or more aggregated wired or wireless network connections with overall characteristics required, such as higher throughput, lower latency, more predictable latency, higher reliability, higher uptime, lower packet loss, lower cost or other desirable network characteristics not present on available constituent networks.

Additionally, this configuration may allow the Blending-Capable Client (e.g., the master/primary device in this example) to access remote communication endpoints (e.g. cellular base stations) via the connected device from FIG. 3E which would not ordinarily be accessible to the Blending-Capable Client (for example because it is located such that connectivity to remote communication endpoints (e.g. cellular base stations) is poor or non-existent), or due to hardware limitations of the Blending-Capable Client (for example that it does not have provision for radios or antennas to be fitted) or for any other reason. Stated another way, the Portable Remote Modem Box can be located where RF performance is advantageous and is connected so as to provide the Blending-Capable Client device with the best possible wireless performance.

This example shows how two RMBs may be paired with one gateway device, which acts as a master/primary device, in this example. Once paired, an RMB should not be able to connect with another gateway device unless it is paired with that gateway device, at which point the pairing with the previous gateway device is deleted. At this stage, one can assume the gateway devices are "well-behaved", although authenticating gateway devices and preventing buggy or malicious clients from accessing an RMB's modems at the same time as another gateway device can be addressed in the future through a more involved pairing procedure (e.g., shared secret displayed on the RMB OLED UI). The gateway device and RMB are connected to each other on a trusted LAN, for example.

Figure 7B:
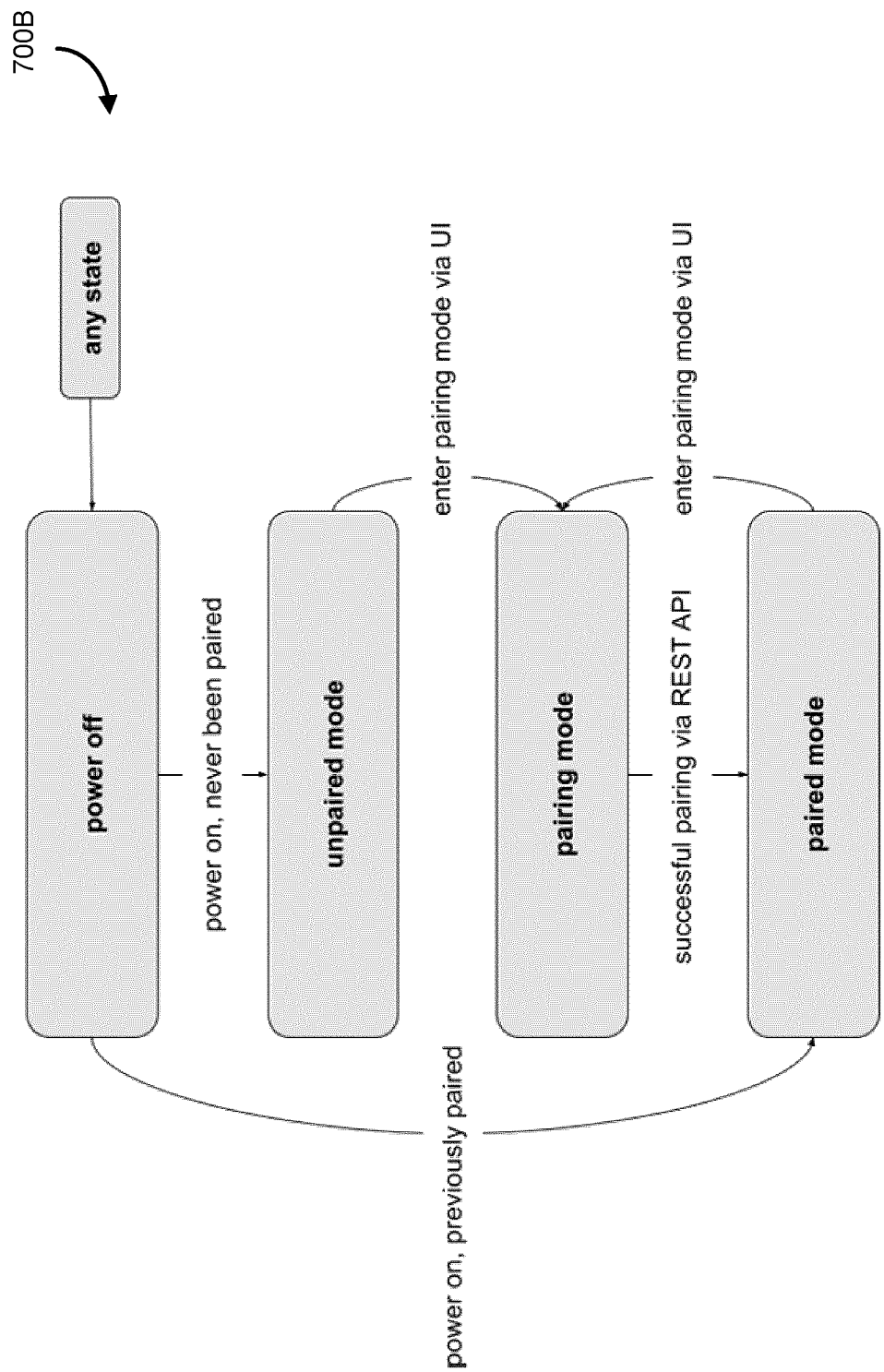
FIG. 7B is a state diagram showing an approach for pairing the multi modem communications device in a remote modem box (RMBs mode, according to some embodiments.

The pairing state machine implemented by remote_modem_server only has two states as shown in the state diagram 700B in FIG. 7B. The pairing state is persistent if the RMB is rebooted. In an embodiment, it can be configured such that only one gateway device may be paired to an RMB at a time. Gateway devices initiate pairing by sending a request to the remote_modem_server REST API. Pairing may involve the RMB generating a new "Paired Client Identifier" (PCI) and returning it to the gateway device and while entering pairing mode doesn't delete the existing pairing; however, when a new gateway device is paired, the previous PCI may be deleted such that accidentally entering pairing mode via the UI should avoid having unexpected disconnections.

Pairing an RMB with a gateway device involves configuring the gateway device with the RMB's IP address, which can be discovered using the OLED UI. Configuring the gateway device to use a different RMB can require configuring the gateway device with a different RMB IP address. No other form of "un-pairing" is required. To fulfill the requirement to support pairing a gateway device with two RMBs and up to six modems, two RMB IPs may be configured.

A "Blending-Capable Client" can be defined as any master/primary system or device separate (and possibly remote from the multi modem communications device, but which is connected to the multi modem communications device (typically by a wired connection but possibly by other means) and is capable of accessing the multi modem communications device's multiple wireless network connections individually for example, via the USB/IP protocol) and performing the network aggregation/blending locally (rather than on the multi modem communications device itself). The "Blending-Capable Client" may function as a networking device itself (e.g., an internet gateway device aggregating/blending multiple individual wireless connections from one or more multi modem communications devices) or may perform a different primary function altogether, such as an in-vehicle infotainment system, a wireless video transmitter, or a mobile situation command centre, but which is capable of aggregating/blending connections provided by multi modem communications devices in addition to its primary function(s).

There may exist various reasons why performing the network aggregation/blending function locally on the "Blending-Capable Client" is desirable, for example that more connections must be blended than are possible with the computing power available on a multi modem communications device, or that the aggregation/blending must occur on a more secure device than the multi modem communications device, or that the aggregation/blending must be tightly integrated within the primary function of the "Blending-Capable Client" (e.g., real-time video compression).

Conversely, in a standalone, portable blending appliance mode, instead, the multi modem communications device can also be portable, powered by internal battery or other means, and provides highly reliable internet connectivity via Ethernet or Wi-Fi to nearby computers or devices (clients), with network blending and management being performed on the multi modem communications device itself, whereby multiple wireless connections (provided by the plurality of cellular radios—each with a plurality of antennas) are aggregated (or blended) together, (optionally with satellite, Wi-Fi, or wired connection(s) also) and presented as one or more wired or wireless network connections to clients with overall characteristics as required, such as higher throughput, lower latency, more predictable latency, higher reliability, higher uptime, lower packet loss, lower cost or other desirable network characteristics not present on available constituent networks.

Figure 8A:
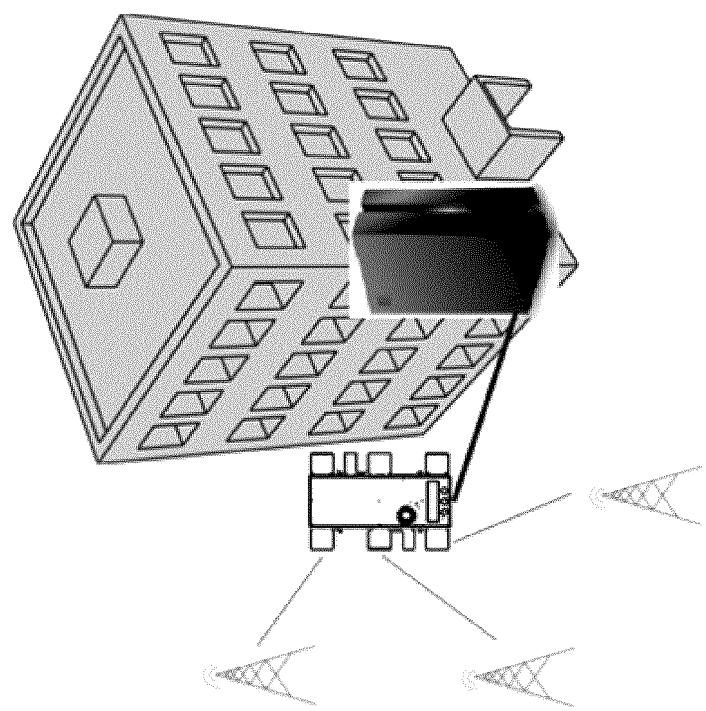
FIG. 8A is an example diagram of an example use case of a standalone remote modem box, that is operating on/in a building, according to some embodiments.

FIG. 8A is an example diagram 800A of an example use case of a standalone remote modem box, that is operating on/in a building.

The multi modem communications device is installed in a fixed location, for example inside the window of a building or on the exterior or roof of a building, powered by mains power, Power over Ethernet, internal battery, or other means, providing a plurality of radios (each with a plurality of antennas), where the individual radios and antennas are made to appear as multiple peripheral wireless connections (for example via USB/IP protocol) within a connected Blending-Capable Client, where the network aggregation and management functions are performed within the Blending-Capable Client, to attain one or more aggregated wired or wireless network connections with overall characteristics required by the operator, such as higher throughput, lower latency, more predictable latency, higher reliability, lower packet loss, lower cost or other desirable network characteristics not present on available constituent networks.

Additionally, this configuration may allow the Blending-Capable Client to access remote communication endpoints (e.g., cellular base stations) via the connected multi modem communications device which would not ordinarily be accessible to the Blending-Capable Client (for example because it is located in a server room in a basement or internal room where connectivity to remote communication endpoints (e.g. cellular base stations) is poor or non-existent), or limitations of the Blending-Capable Client (for example that it does not have provision for radios or antennas to be fitted) or for any other reason.

Figure 8B:
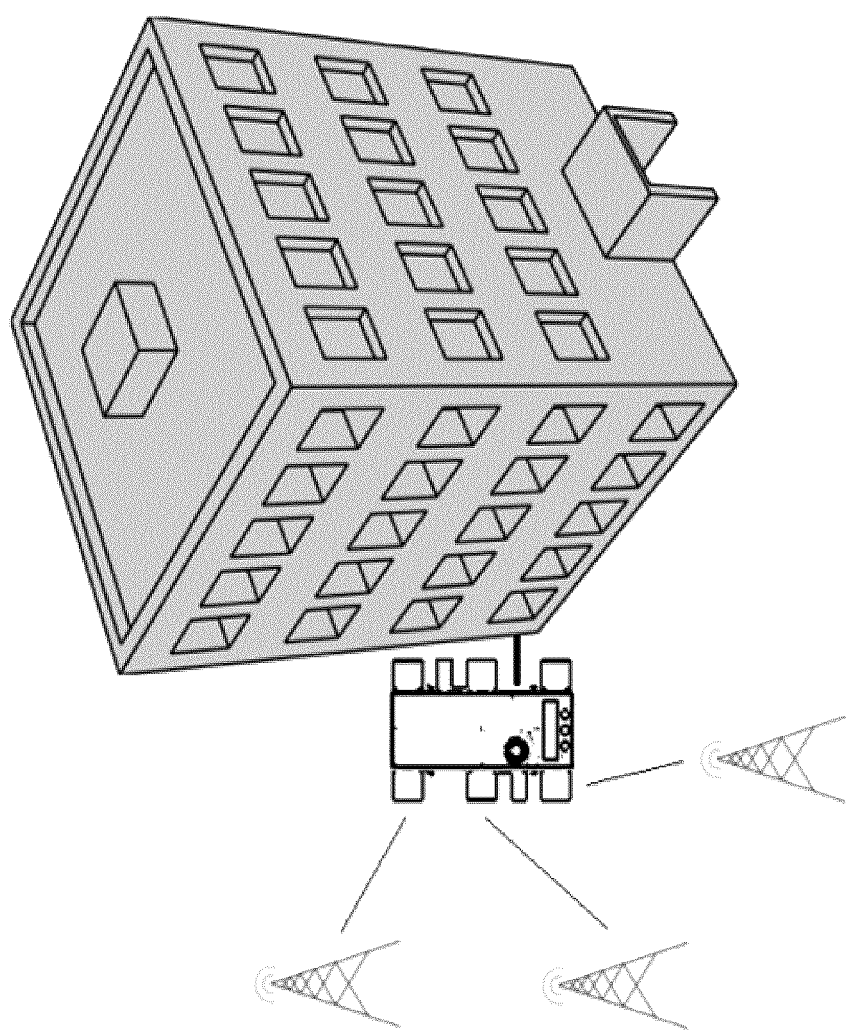
FIG. 8B is an example diagram of an example use case where a standalone, fixed blending appliance is shown operating on/in a building, according to some embodiments.

FIG. 8B is an example diagram 800B of an example use case where a standalone, fixed blending appliance is shown operating on/in a building. In this example, the multi modem communications device is installed in a fixed location, for example inside the window of a building or on the exterior or roof of a building, powered by mains power, Power over Ethernet, internal battery, or other means, and provides highly reliable internet connectivity via Ethernet or Wi-Fi to computers or devices inside the building or nearby, with network blending and management being performed on the multi modem communications device itself, whereby multiple wireless connections (provided by the plurality of cellular radios—each with a plurality of antennas) are aggregated (or blended) together, (optionally with satellite, Wi-Fi, or wired connection(s) also) and presented as one or more wired or wireless network connections with overall characteristics as required, such as higher throughput, lower latency, more predictable latency, higher reliability, lower packet loss, lower cost or other desirable network characteristics not present on available constituent networks.

Figure 8C:
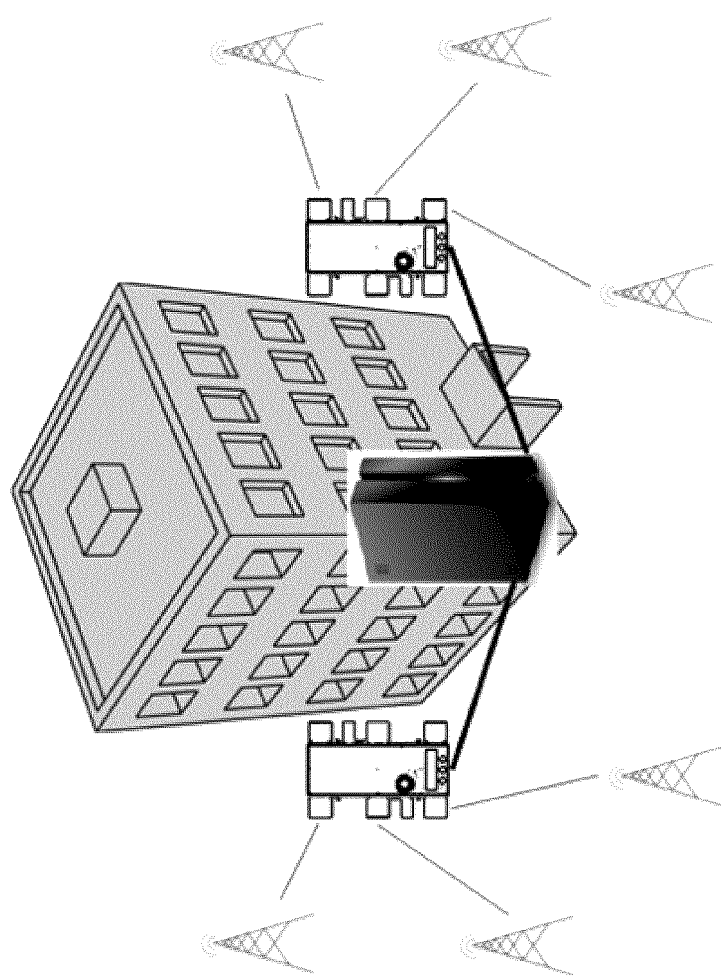
FIG. 8C is an example diagram showing multiple remote modem boxes, operating on/in building, according to some embodiments.

FIG. 8C is an example diagram 800C showing multiple remote modem boxes, operating on/in building.

In this example, multiple multi modem communications devices are installed on/in a building, for example inside the window of a building or on the exterior or roof of a building, or installed in two separate locations on/in the building such that each multi modem communications device may be preferentially located for best communication with a given set of remote endpoints (e.g. cellular base stations), and by locating the devices separately, a larger overall number of remote endpoints can be accessed and used by the system. Each multi modem communications device could be powered by main power, power-over-Ethernet, internal battery, or other means providing a plurality of radios (each with a plurality of antennas), where the individual radios and antennas are made to appear as multiple peripheral wireless connections (for example, via USB/IP protocol) within a connected Blending-Capable Client, where the network aggregation and management functions are performed within the Blending-Capable Client, to attain one or more aggregated wired or wireless network connections with overall characteristics required by the operator, such as higher throughput, lower latency, more predictable latency, higher reliability, higher uptime, lower packet loss, lower cost or other desirable network characteristics not present on available constituent networks.

Additionally, this configuration may allow the Blending-Capable Client to access remote communication endpoints (e.g., cellular base stations) via the connected multi modem communications device(s) which would not ordinarily be accessible to the Blending-Capable Client (for example because it is located in a server room in a basement or internal room where connectivity to remote communication endpoints (e.g., cellular base stations) is poor or non-existent), or limitations of the Blending-Capable Client (for example that it does not have provision for radios or antennas to be fitted) or any other reason.

The multi modem communications devices may also be co-ordinated to provide the best overall connectivity to the system (e.g. by being configured such that each multi modem communications device uses the best available remote communication endpoints (e.g. cellular base stations), for example because multi modem communications device(s) may be located on opposite sides of a building where each has good RF line-of-sight connectivity to different remote communication endpoints than the other device(s)), based on overall characteristics required, such as higher throughput, lower latency, more predictable latency, higher reliability, higher uptime, lower packet loss, lower cost or other desirable network characteristics.

FIG. 9A is an illustration 800A showing an example of multi modem communications devices operating on a vehicle, according to some embodiments. In this example, there may be a standalone blending appliance 802A, or it can interoperate with another blending appliance 802B, (similar to that shown in FIG. 4A).

In the standalone example, the multi modem communications device is installed in/on a vehicle, for example in the window of the vehicle or on the exterior of the vehicle or any other location, powered by an internal battery or via the vehicle power supply or other means, and provides highly reliable internet connectivity via Ethernet or Wi-Fi to nearby computers or devices (clients) either in or on the vehicle or nearby vehicle(s), with network blending and management being performed on the multi modem communications device itself, whereby multiple wireless connections (provided by the plurality of cellular radios—each with a plurality of antennas) are aggregated (or blended) together, (optionally with satellite, Wi-Fi, or wired connection(s) also) and presented as one or more wired or wireless network connections with overall characteristics as required, such as higher throughput, lower latency, more predictable latency, higher reliability, higher uptime, lower packet loss, lower cost or other desirable network characteristics not present on available constituent networks.

In the multiple blending device example, multiple multi modem communications devices 802A and 802B are installed on/in a vehicle, for example in the window of the vehicle or on the exterior of the vehicle or any other location, or installed in two separate locations on/in the vehicle such that each device may be preferentially located for best communication with a given set of remote endpoints (e.g. cellular base stations), and by locating the devices separately, a larger overall number of remote endpoints can be accessed and used by the combined system(s). Each device could be powered by an internal battery, vehicle power system, or other means providing highly reliable internet connectivity via Ethernet or Wi-Fi to nearby computers or devices (clients), with network blending and management being performed on the device itself, whereby multiple wireless connections (provided by the plurality of cellular radios—each with a plurality of antennas) are aggregated (or blended) together, (optionally with satellite, Wi-Fi, or wired connection(s) also) and presented as one or more wired or wireless network connections with overall characteristics as required by the operator, such as higher throughput, lower latency, more predictable latency, higher reliability, higher uptime, lower packet loss, lower cost or other desirable network characteristics not present on available constituent networks.

This aggregation or blending function could occur on one device, or could be distributed across all device(s) that may be present in the system; the devices may also co-ordinate to provide the best overall connectivity to the system (e.g. by configuring themselves so that each device chooses the best available remote communication endpoints (e.g. cellular base stations), for example because device(s) may be located on opposite sides of a vehicle where each has good RF line-of-sight connectivity to different remote communication endpoints than the other device(s)), based on overall characteristics required, such as higher throughput, lower latency, more predictable latency, higher reliability, higher uptime, lower packet loss, lower cost or other desirable network characteristics.

Due to the motion of the vehicle, it is expected that the performance parameters of each wireless network connection may change constantly (for example because RSSI would be affected by the device's position, orientation and distance relative to the remote endpoint. As such it is expected that this network selection may have to occur much more frequently than in the case of a fixed installation—possibly in real-time. These performance parameters can then be used to assign carriers to modems, for example, by interrogating different SIM combinations with different modems and obtaining RSSI readings.

Depending on a detected RSSI for the best mix of carrier assignments, for example, each of the multi modem communications devices can be assigned different functions, or a higher or a lower priority for communications (e.g., stronger RSSI is used for higher priority, lower RSSI is used for lower priority). For example, in an emergency communications vehicle example, more important, prioritized communications, such as emergency channels may be assigned on the higher priority channel, and less important, routine communications, such as weather channels may be assigned on the lower priority channel. Depending on a situation, the choice of assignment of a communication could be switched from lower to higher priority, or vice versa. For example, if a holster detects a weapon is drawn, a wirelessly enabled body camera's data stream could be switched to higher priority.

There can also be a variation where the installation on the vehicle is instead a standalone remote modem box, where the radios and antennas of the RMB are made to appear as multiple peripheral wireless connections (for example using the USB/IP protocol) within a connected blending-capable client (e.g., car infotainment system, police vehicle communications hub, fleet management software).

Figure 9B:
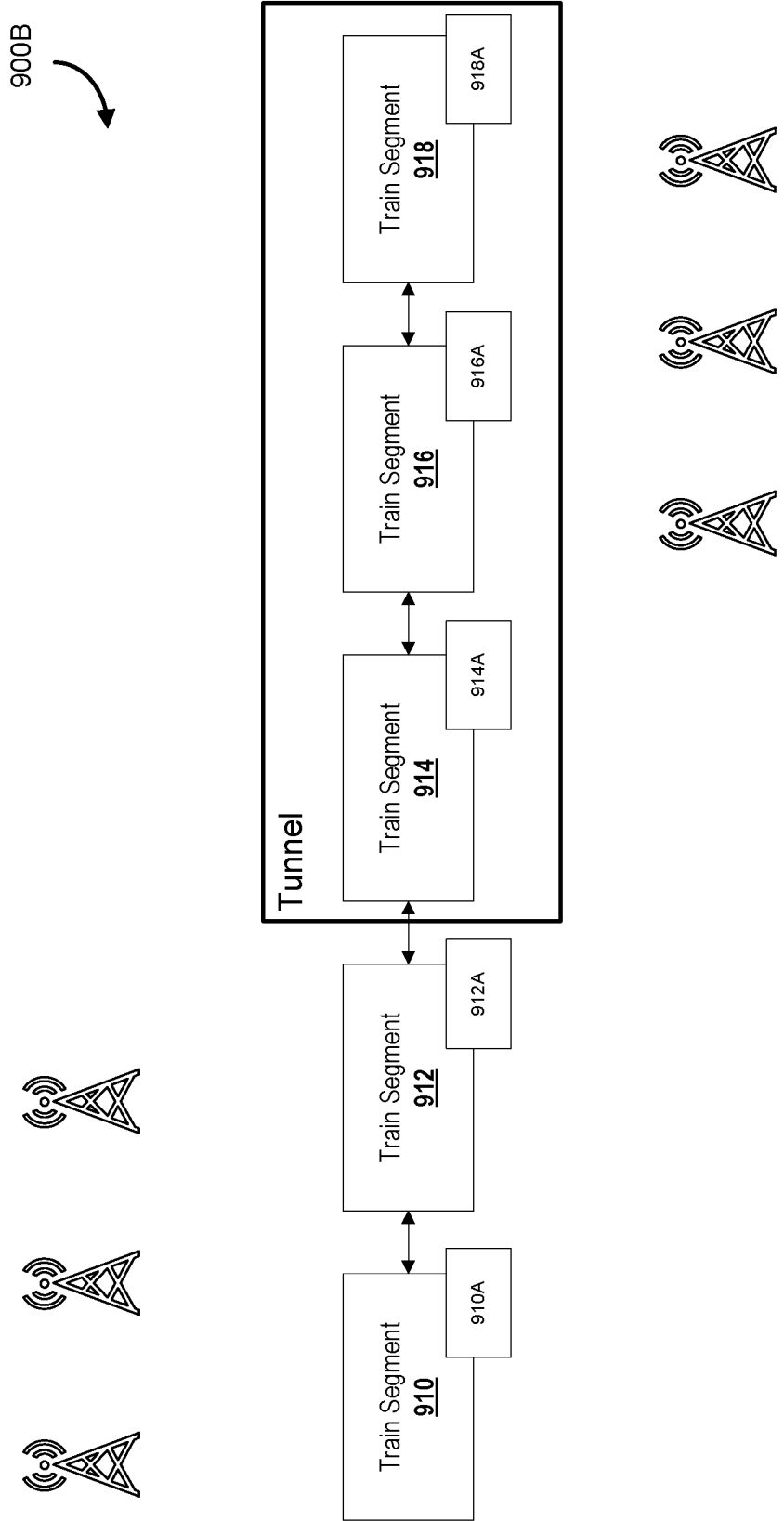
FIG. 9B is an example embodiment having an illustration where multi modem communications devices are operating on different segments of a segmented vehicle, such as a train.

FIG. 9B is an example embodiment having an illustration 900B where multi modem communications devices are operating on different segments of a segmented vehicle, such as a train. In this example, the segmented vehicle could be very long (e.g., a freight train could be miles long), having many segments. Some of the segments 910, 912, 914, 916, 918 may have coupled multi modem communications devices 910A, 912A, 914A, 916A, 918A.

While in this example, each of the segments has a corresponding multi modem communications device, this is not necessarily true in all embodiments. The segmented vehicle may have a communications system, such as an infotainment system having high network communications requirements. For example, the infotainment system may be seeking to facilitate video streaming on demand by various passengers of the segmented vehicle. However, the infotainment system requires a large amount of throughput to be able to serve all of these requests from portable devices associated with the various passengers.

Each of the multi modem communications devices 910A, 912A, 914A, 916A, 918A can be connected together with the infotainment system, and the infotainment system, in this example, operates as the master/primary device which instructs each of the multi modem communications devices 910A, 912A, 914A, 916A, 918A to provide virtual WAN connections through which the infotainment system can advantageously utilize (e.g., as remote modem connections, in one example, or in a blended set of network connections, in another embodiment).

As the segmented vehicle moves through various locations along a path, the signal characteristics can be assessed periodically such that different antennas or sets of antennas of the multi modem communications devices 910A, 912A, 914A, 916A, 918A can be utilized to take advantage of different spectral environments at different locations, and accordingly, differing signal strengths. Furthermore, the multi modem communications devices 910A, 912A, 914A, 916A, 918A can be utilized in tunnels or in situations where some of the segments are otherwise unable to communicate well with various communications base stations, such as in a station or a garage. Accordingly, connections of the multi modem communications devices 910A, 912A, 914A, 916A, 918A having the strongest signals can be blended together or simply prioritized for usage by the infotainment system, such that a combined hotspot can be established using the various multi modem communications devices 910A, 912A, 914A, 916A, 918A located at different segments along the segmented vehicle, providing enhanced service to the passengers. In some embodiments, the multi modem communications devices 910A, 912A, 914A, 916A, 918A are located strategically on segments of the segmented vehicle such that the multi modem communications devices 910A, 912A, 914A, 916A, 918A are spread out along the vehicle (e.g., on every third train car).

While the example shown in FIG. 9B is a train, other variations are possible, such as a set of linked drones (e.g., each within WiFi distance from one another) each carrying one of the multi modem communications devices 910A, 912A, 914A, 916A, 918A. The drones may maintain range within one another such that a sufficiently strong WiFi signal may be shared for the local area connection, and the multi modem communications devices 910A, 912A, 914A, 916A, 918A can be used to interrogate various available cellular signals. This may be useful, for instance, in mountainous terrain, or in areas where cellular coverage is very poor.

Although the embodiments have been described in detail, it should be understood that various changes, substitutions and alterations can be made herein without departing from the scope. Moreover, the scope of the present embodiments is not intended to be limited to the particular embodiments of the process, machine, manufacture, composition of matter, means, methods and steps described in the specification. Applicant conducts foundational and applied research into this area of technology, and Applicant notes that while various practical embodiments are described, the descriptions are examples and may not be representative of implemented products and services.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

Definitions

Crosstalk: unwanted transfer of signals between communication channels. Example: one antenna on the device is transmitting on the same frequency that another antenna on the device is attempting to receive on.

Coupling: the transfer of electrical or electromagnetic energy from one circuit segment to another. Example: an antenna on the device is transmitting and some of the power it sends is transferred to other (co-located) antennas on the device.

Load (loading): a portion of a circuit that consumes electric or electromagnetic power. Example: a measure of the reduction in output power that results from coupling to other local antennas Counterpoise: A counterpoise is a conductive region used as a substitute for an earth (ground) connection in a radio system. Example: the metal kernel of some embodiments is a counterpoise for the MIMO antennas mounted to the kernel.

What is claimed is:

1. A multi modem communications device providing electronic communication across a plurality of radios, the device comprising:
    a central housing chassis adapted to provide an electrical counterpoise for the electronic communication, the central housing chassis comprising material that provides radio frequency shielding; and
    a plurality of wide-band antennas, each coupled to the central housing chassis, each corresponding to a modem of a plurality of modems provided by the multi modem communications device, and each operating on similar frequency bands;
    wherein each of the wide-band antennas that correspond to a modem of the plurality of modems are positioned on the central housing chassis or configured on the central housing chassis to physically block, using a horizon established by a shape of the central housing chassis as a radio frequency shield, line of sight between other wide-band antennas of the plurality of wide-band antennas positioned in a near field region and coupled to the central housing chassis being used for the modem of the plurality of modems, reducing cross-coupling loading or energy loss as between the plurality of wide-band antennas.

2. The multi modem communications device of claim 1, wherein each wide-band antenna of the plurality of wide-band antennas is a folded wide-band antenna having a folding orientation, and each adjacent wide-band antenna of the plurality of wide-band antennas relative to their coupling to the central housing chassis is folded in a different orientation relative to other adjacent wide-band antennas.

3. The multi modem communications device of claim 2, wherein the folding in the different orientation includes adjacent wide-band antennas having mirror image folding relative to one another to reduce interference between the adjacent wide-band antennas.

4. The multi modem communications device of claim 1, wherein each modem of the plurality of modems utilizes a first corresponding wide-band antenna and a second corresponding wide-band antenna of the plurality of wide-band antennas, and wherein the first corresponding wide-band antenna is coupled in a geometrically opposite position on the central housing chassis relative to the second corresponding wide-band antenna, and
    wherein physical geometric features of the central housing chassis block line of sight between the first corresponding wide-band antenna and the second corresponding wide-band antenna.

5. The multi modem communications device of claim 1, wherein the plurality of modems include a first, a second, and a third modem, each having a pair of corresponding wide-band antennas, the corresponding pair for the first modem and second modem coupled diagonally across the central housing chassis, and the corresponding pair for the third modem coupled opposite one another across a center of the central housing chassis.

6. The multi modem communications device of claim 1, wherein the plurality of modems operate on frequency bands residing between about 600 MHz to about 6000 MHz, and each modem of the plurality of modems operates on a frequency band within the frequency bands.

7. The multi modem communications device of claim 6, wherein a communications controller submodule is configured to periodically or continuously measure one or more performance parameters of communications of each modem of the plurality of modems, and utilize the one or more performance parameters in controlling the electronic communication across one or more modems of the plurality of modems.

8. The multi modem communications device of claim 7, wherein each connection provided by each modem of the plurality of modems is bonded to provide an aggregated data communication pipeline for data communications, and the one or more performance parameters utilized to determine assignments of the plurality of modems to specific carriers.

9. The multi modem communications device of claim 7, wherein a highest performing carrier is selected based on the one or more performance parameters for assignment to each modem of the plurality of modems.

10. The multi modem communications device of claim 1, wherein the plurality of modems each operate using a different frequency band, a different subscriber identity module (SIM), or connect to different carrier networks.

11. A method for operating a multi modem communications device providing electronic communication across a plurality of radios having a central housing chassis adapted to provide an electrical counterpoise for the electronic communication, the central housing chassis comprising material that provides radio frequency shielding; and a plurality of wide-band antennas, each coupled to the central housing chassis, each corresponding to a modem of a plurality of modems provided by the multi modem communications device, and each operating on similar frequency bands; each of the wide-band antennas that correspond to a modem of the plurality of modems are positioned on the central housing chassis or configured on the central housing chassis to physically block, using a horizon established by a shape of the central housing chassis as a radio frequency shield line of sight between other wide-band antennas of the plurality of wide-band antennas positioned in a near field region and coupled to the central housing chassis being used for the modem of the plurality of modems, reducing cross-coupling loading or energy loss as between the plurality of wide-band antennas, the method comprising:
- establishing a local area data connection to a master data communications device in a local area network;
- interoperating with, by the master data communications device, the multi modem communications device to establish wide area data communications using the plurality of wide-band antennas and the plurality of modems to connect to cellular networks.

12. The method of claim 11, wherein the wide area data connections are mapped as virtual modem connections available to the master data communications device and the master data communications device controls the multi modem communications device to use the wide area data connections.

13. The method of claim 12, wherein the virtual modem connections available to the master data communications device replace existing modem connections of the master data communications device.

14. The method of claim 12, wherein the virtual modem connections available to the master data communications device augment existing modem connections of the master data communications device such that a subset or all of the virtual modem connections and the existing modem connections are blended together to form aggregated or bonded network connections.

15. The method of claim 14, wherein a first subset of the of the virtual modem connections and the existing modem connections is utilized to or assigned to communicate a first flow classification of packets, the first subset having a lower latency relative to other connections of the virtual modem connections and the existing modem connections.

16. The method of claim 15, wherein a remaining subset of the virtual modem connections and the existing modem connections is utilized to or assigned to handle bulk data communications.

17. The method of claim 14, wherein the multi modem communications device is further configured to control blending of connections of the wide area data connections to communicate data packets to or from the master data communications device.

18. The method of claim 14, wherein the virtual modem connections are assigned spillover connectivity in an event of a request for data communications resources exceeding the communications capabilities of the existing modem connections.

19. The method of claim 12, wherein the virtual modem connections available to the master data communications device are periodically interrogated using test data probe packets to assess communications characteristics of each of the virtual modem connections using different carriers, and are each assigned a carrier based on the carrier having the highest assessed communication characteristics.

20. A non-transitory computer readable medium storing machine interpretable instructions, which when executed by a processor, cause the processor to perform a method for operating a multi modem communications device providing electronic communication across a plurality of radios having a central housing chassis adapted to provide an electrical counterpoise for the electronic communication, the central housing chassis comprising material that provides radio frequency shielding;
- and a plurality of wide-band antennas, each coupled to the central housing chassis, each corresponding to a modem of a plurality of modems provided by the multi modem communications device, and each operating on similar frequency bands; each of the wide-band antennas that correspond to a modem of the plurality of modems are positioned on the central housing chassis or configured on the central housing chassis to physically block, using a horizon established by a shape of the central housing chassis as a radio frequency shield line of sight between other wide-band antennas of the plurality of wide-band antennas positioned in a near field region and coupled to the central housing chassis being used for the modem of the plurality of modems of the plurality of wide-band antennas coupled to the central housing chassis, reducing cross-coupling loading or energy loss as between the plurality of wide-band antennas, the method comprising:
- establishing a local area data connection to a master data communications device in a local area network;
- interoperating with, by the master data communications device, the multi modem communications device to establish wide area data communications using the plurality of wide-band antennas or the plurality of modems to connect to cellular networks.

* * * * *